(12) United States Patent
Feng et al.

(10) Patent No.: US 12,354,238 B2
(45) Date of Patent: Jul. 8, 2025

(54) IMAGE FUSION

(71) Applicant: QUALCOMM Incorporated, San Diego, CA (US)

(72) Inventors: Wen-Chun Feng, New Taipei (TW); Yu-Chen Hsu, Beitou (TW); Mian Li, Shenzhen (CN); Hsuan-Ming Liu, New Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 17/756,241

(22) PCT Filed: May 1, 2020

(86) PCT No.: PCT/CN2020/088536
§ 371 (c)(1),
(2) Date: May 19, 2022

(87) PCT Pub. No.: WO2021/120498
PCT Pub. Date: Jun. 24, 2021

(65) Prior Publication Data
US 2022/0392036 A1  Dec. 8, 2022

(30) Foreign Application Priority Data

Dec. 20, 2019  (WO) ................ PCT/CN2019/127082

(51) Int. Cl.
*G06T 5/50* (2006.01)
*G06T 3/4038* (2024.01)
(Continued)

(52) U.S. Cl.
CPC .............. *G06T 5/50* (2013.01); *G06T 3/4038* (2013.01); *G06T 7/50* (2017.01); *H04N 23/67* (2023.01);
(Continued)

(58) Field of Classification Search
CPC ........... G06T 5/50; G06T 3/4038; G06T 7/50; G06T 2207/20024; G06T 2207/20212;
(Continued)

(56) References Cited

U.S. PATENT DOCUMENTS 9,344,619 B2 *  5/2016  Shroff .................. H04N 5/2226
10,297,034 B2 *  5/2019  Nash ......................... G06T 7/11
(Continued)

FOREIGN PATENT DOCUMENTS

CN    102957871 A    3/2013
CN    105516594 A    4/2016
(Continued)

OTHER PUBLICATIONS

Jacobs D.E., et al., "Focal Stack Compositing for Depth of Field Control", Stanford Computer Graphics Laboratory, Technical Report, Technical Report 2012-1, Jan. 31, 2013, XP055654614, pp. 1-10, abstract, figures 1, 2, 5, 11, 12, p. 1-p. 9.
(Continued)

*Primary Examiner* — Michael S Osinski
(74) *Attorney, Agent, or Firm* — QUALCOMM Incorporated; Scott Barker

(57) ABSTRACT

In general, techniques are described regarding fusing or combining frames of image data to generate composite frames of image data. Cameras comprising camera processors configured to perform the techniques are also disclosed. A camera processor may capture multiple frames at various focal lengths. The frames of image data may have various regions of the respective frame in focus, whereas other regions of the respective frame may not be in focus, due to particular configurations of lens and sensor combinations used. The camera processor may combine the frames to
(Continued)

achieve a single composite frame having both a first region (e.g., a center region) and a second region (e.g., an outer region) in focus.

31 Claims, 26 Drawing Sheets

(51) Int. Cl.
  *G06T 7/50* (2017.01)
  *H04N 23/67* (2023.01)
(52) U.S. Cl.
  CPC ............... *G06T 2207/20024* (2013.01); *G06T 2207/20212* (2013.01)
(58) Field of Classification Search
  CPC . G06T 2207/10148; G06T 2207/20221; G06T 1/0007; H04N 23/67; H04N 5/2226; H04N 5/265; H04N 23/69; H04N 23/698; H04N 23/81; H04N 23/951; H04N 23/958; H04N 23/959; G06V 10/147; G06V 10/25; G06V 10/44
  See application file for complete search history.

(56) References Cited

U.S. PATENT DOCUMENTS

| | | | |
|---|---|---|---|
| 10,425,577 B2* | 9/2019 | Abe | H04N 23/64 |
| 10,638,030 B1* | 4/2020 | Sinharoy | H04N 23/67 |
| 11,070,744 B2* | 7/2021 | Du | H04N 23/951 |
| 11,924,549 B2* | 3/2024 | Shibuno | H04N 23/60 |
| 2008/0019602 A1 | 1/2008 | Hillis et al. | |
| 2009/0059057 A1* | 3/2009 | Long | H04N 23/951 348/343 |
| 2012/0069219 A1* | 3/2012 | Ono | H04N 25/611 348/E9.053 |
| 2013/0215251 A1* | 8/2013 | Yamamoto | G02B 21/36 348/79 |
| 2013/0279799 A1* | 10/2013 | Shimura | G06T 5/73 382/154 |
| 2014/0160319 A1* | 6/2014 | Nestares | H04N 5/262 382/284 |
| 2015/0009366 A1 | 1/2015 | Yamada | |
| 2015/0062370 A1 | 3/2015 | Shroff et al. | |
| 2015/0085179 A1* | 3/2015 | Van Heugten | H04N 23/673 348/349 |
| 2015/0116547 A1* | 4/2015 | Laroia | G02B 5/005 348/240.1 |
| 2015/0185585 A1* | 7/2015 | Kawai | G03B 13/28 348/333.11 |
| 2015/0279012 A1* | 10/2015 | Brown | G06T 5/50 382/284 |
| 2015/0312469 A1* | 10/2015 | Chang | H04N 23/676 348/349 |
| 2016/0028948 A1* | 1/2016 | Omori | H04N 23/80 348/239 |
| 2016/0292837 A1* | 10/2016 | Lakemond | G06T 11/60 |
| 2017/0118393 A1* | 4/2017 | Dayana | H04N 13/239 |
| 2017/0201674 A1* | 7/2017 | Yamamoto | H04N 5/272 |
| 2017/0244883 A1* | 8/2017 | Abe | H04N 23/675 |
| 2018/0041697 A1* | 2/2018 | Abe | H04N 23/673 |
| 2018/0096487 A1* | 4/2018 | Nash | G06T 3/4038 |
| 2018/0321464 A1* | 11/2018 | Kogo | H04N 23/673 |
| 2019/0297275 A1* | 9/2019 | Lee | H04N 5/265 |
| 2019/0306405 A1* | 10/2019 | Shin | H04N 23/675 |

FOREIGN PATENT DOCUMENTS

| | | |
|---|---|---|
| CN | 105608667 A | 5/2016 |
| CN | 107945101 A | 4/2018 |
| CN | 109379522 A | 2/2019 |
| CN | 110581957 A | 12/2019 |
| JP | 2014027605 A | 2/2014 |
| WO | 2017069902 A1 | 4/2017 |
| WO | 2018063482 A1 | 4/2018 |

OTHER PUBLICATIONS

Supplementary European Search Report—EP20901256—Search Authority—Munich—Jan. 19, 2024.

International Search Report and Written Opinion—PCT/CN2019/127082—ISA/EPO—Sep. 15, 2020, 11 pages.

International Search Report and Written Opinion—PCT/CN2020/088536—ISA/EPO—Aug. 28, 2020, 9 pages.

* cited by examiner

IMAGE FUSION

This application claims the benefit of International Application No. PCT/CN2019/127082, filed Dec. 20, 2019, and International Application No. PCT/CN2020/088536, filed May 1, 2020, the entire content of which is hereby incorporated by reference.

TECHNICAL FIELD

The disclosure relates to image capture and processing.

BACKGROUND

Image capture devices are commonly incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets, such as mobile telephones having one or more cameras, cellular or satellite radio telephones, camera-equipped personal digital assistants (PDAs), panels or tablets, gaming devices, computer devices that include cameras, such as so-called "web-cams," or any devices with digital imaging or video capabilities.

In addition, certain image capture devices may include multiple image sensors and/or multiple lenses that may be used in conjunction with one another, or otherwise, may be used to perform autofocus techniques. For example, a lens may be actuated to allow capture of image data at different focal lengths. In another example, a focal length of one or more image capture devices may be effectively adjusted using various light diversion techniques (e.g., moving prisms, etc.). Example lens types include wide-angle lenses, ultra-wide-angle lenses, telephoto lenses, telescope lenses, periscope-style zoom lenses, fisheye lenses, macro lenses, prime lenses, or various combinations thereof. For example, a dual camera configuration may include both a wide lens and a telephoto lens. Similarly, a triple camera configuration may include an ultra-wide lens, in addition to a wide lens and a telephoto lens. By using multiple lenses and/or image sensors, image capture devices are able to capture images with different field of views (FOV)s and/or focus levels.

SUMMARY

In general, this disclosure describes camera processing techniques involving digital cameras having image sensors and camera processors. The camera processors may be configured to receive image data, such as frames of video data and/or still image shots, from an image sensor capturing image data through one or more lenses. In some instances, a digital camera may include a relatively large image sensor for capturing frames of image data. For example, large image sensors may be used in order to include a greater number of pixels in order to maximize resolution of the image data. In another example, large image sensors may be used in order to maximize the size of the pixels themselves in an effort to improve image quality (e.g., signal-to-noise ratio (SNR) in low light environments, etc.). In any case, large image sensors may be paired with relatively large lenses that are configured to receive enough light to take advantage of the full potential of the large image sensor.

Using such large lenses, however, can result in a mismatch in ground truth position between the center of the lens and the periphery of the lens. Ground truth position generally refers to how closely the image of an object in the FOV of a lens, including the relative proportions of the object, would match the image of an object as imaged from an ideal or otherwise perfect lens imaging the same object. In some examples, certain form factor considerations in various applications (e.g., mobile device applications) may result in large lenses being relatively thin (e.g., having flatter curvatures), thereby contributing to the mismatch in ground truth lens position. Moreover, certain form factor or other considerations may cause relatively flat image sensors, as well. In any case, large image sensors and large lenses may result in the capture of a frame of image data that is not uniformly focused across the entire frame.

Even when performing an autofocus technique, the image capture device may not be able to automatically capture any one frame of image data that exhibits a uniform focus level for the entire frame. For example, a frame of image data captured at a particular focal length may result in a center region of the frame being in focus at a first focus level, whereas an outer region of the frame (e.g., edges, periphery, etc.) may be out-of-focus at a second focus level. In such instances, a second region of the frame, such as an outer region of the frame, may appear more blurred (e.g., less sharp) compared to a first region of the frame, such as a center region of the frame, or vice versa. As used herein, a "focus level" may generally refer to a measure as to how much a region of a frame is in focus (e.g., a sharpness level, resolution level, acutance level, etc.). A single frame may have varying focus levels in different regions, such as out-of-focus or blurry regions captured having certain defocus levels, whereas other regions may be captured having certain in-focus or sharper regions at other focus levels. In some instances, focus levels may correspond to measured focus values as described herein, where focus values may be based on sharpness levels or other focus metrics. In some instances, a focus level may include a total focus level for the frame as a whole, such as an average of focus values for various regions of a frame.

In accordance with techniques of this disclosure, a camera processor may receive a frame of image data captured at a first focal length and a second frame of image data captured at a second focal length and combine regions from each frame to generate a composite frame having a higher level of uniform focus for the composite frame. For example, the camera processor may cause a lens to adjust from one focal length to a second focal length, and in this way, move the focal length of the lens. In some examples, the camera processor may perform focal length adjustments as part of an autofocus technique. In any event, the first frame of image data may have a first region (e.g., a center region of the frame) in focus when captured at a particular focus level and a second region (e.g., an outer region of the frame surrounding the center region of the frame), out-of-focus at another focus level, or vice versa. Likewise, at the second focal length, the second frame of image data may have an outer region in focus at a particular focus level and a center region in focus at another focus level, or vice versa. The camera processor may then combine the two frames to generate a composite frame. As such, the composite frame may have regions taken from each of the two frames that have a comparatively similar focus level (e.g., an inner region from one frame and an outer region from another frame).

In some examples, the regions from different frames may be blended together using one or more weighting tables. For example, the frames of image data may be combined via a weighting table, such that areas of a frame having a higher amount of detail may receive a higher weight during the combination and blending process. In such instances, the other frame having a lower amount of detail may receive a lower weight for the combination.

In accordance with techniques of this disclosure, a camera processor is configured to output a frame of image data having the entire frame in focus, even though the camera processor receives frames of image data that have certain regions that are less in focus than other regions due to the size of the sensor and/or lens. For example, certain mobile device applications may use large sensors and/or large lenses to capture frames of image data without receiving frames having non-uniform focus levels. In addition, regions that are combined using certain blending techniques of this disclosure may achieve a seamless transition between regions of multiple frames in a composite frame, such that the focus level of the composite frame has higher uniformity and to where the human eye may not be able to detect where the combined regions intersect.

In addition, in accordance with techniques of this disclosure, the camera processor may determine whether frames of image data are to be combined to generate a composite frame having the entire composite frame in focus. For example, the camera processor may determine how much depth is present in a captured frame before determining whether multiple frames of varying focus amounts should be captured and/or combined. When the camera processor determines that the depth of a frame exceeds a threshold (i.e., the frame is a relatively high depth scene), the camera processor may determine the first frame may be adequately focused and the frame combining techniques of the is disclosure are not performed. That is, although the first frame may only have certain regions of the frame in focus, because the scene has elements of depth that exceed a threshold, the out of focus regions may be desirable and/or expected for the final output frame. On the other hand, when the camera processor determines the depth of a frame does not exceed a threshold (i.e., the frame is a relatively flat scene), the camera processor may cause an image sensor to capture a first frame of the scene at a first focal length having a center region in focus at a particular focus level and an outer region not in focus. In addition, the camera processor may determine a second focal length that would cause a second frame to be captured that has the outer region in focus at a particular focus level. As such, the camera processor may combine certain regions from each frame to generate a composite frame of the scene having improved focus level uniformity across the composite frame as desired for the particular scene.

In one example, the techniques of the disclosure are directed to an apparatus configured for camera processing, the apparatus comprising: a memory configured to store a plurality of frames of image data, wherein each frame includes a first region that comprises a first set of pixels, and a second region that is outside the first region and comprises a second set of pixels; and one or more processors in communication with the memory, the one or more processors configured to: receive a first frame of the image data captured at a first focal length, wherein the first frame is captured via a lens, wherein, due to a characteristic of the lens, the first frame is captured to include a first focus level corresponding to the first region of the first frame, and a second focus level corresponding to the second region of the first frame, wherein the first focus level differs from the second focus level; receive a second frame of the image data captured at a second focal length, wherein the second frame is captured via the lens, wherein, due to the characteristic of the lens, the second frame is captured to include a third focus level corresponding to the first region of the second frame, and a fourth focus level corresponding to the second region of the second frame, wherein the third focus level differs from the fourth focus level and the first focus level; and combine the first frame with the second frame to generate a composite frame, the composite frame comprising a transition area corresponding to an outer boundary of the first region of the first frame and an inner boundary of the second region of the second frame, wherein the transition area represents pixels from the first set of pixels of the first frame, pixels from the second set of pixels of the second frame, or pixels from both the first set of pixels of the first frame and pixels from the second set of pixels of the second frame.

In another example, the techniques of the disclosure are directed to a method of camera processing, the method comprising: receiving a first frame of the image data captured at a first focal length, wherein the first frame is captured via a lens, wherein, due to a characteristic of the lens, the first frame is captured to include a first focus level corresponding to a first region of the first frame that comprises a first set of pixels, and a second focus level corresponding to a second region of the first frame that is outside the first region and comprises a second set of pixels, wherein the first focus level differs from the second focus level; receiving a second frame of the image data captured at a second focal length, wherein the second frame is captured via the lens, wherein, due to the characteristic of the lens, the second frame is captured to include a third focus level corresponding to a third region of the second frame that comprises a third set of pixels, and a fourth focus level corresponding to a fourth region of the second frame that is outside the third region and comprises a third set of pixels, wherein the third focus level differs from the fourth focus level and the first focus level; and combining the first frame with the second frame to generate a composite frame, the composite frame comprising a transition area corresponding to an outer boundary of the first region of the first frame and an inner boundary of the fourth region of the second frame, wherein the transition area represents pixels from the first frame, pixels from the second frame, or pixels from both the first frame and the second frame.

In another example, the techniques of the disclosure are directed to an apparatus configured for camera processing, the apparatus comprising: means for receiving a first frame of image data captured at a first focal length, wherein the first frame is captured via a lens, wherein, due to a characteristic of the lens, the first frame is captured to include a first focus level corresponding to a first region of the first frame comprising a central region of the first frame, and a second focus level corresponding to a second region of the first frame comprising an outer region of the first frame that is outside the first region relative to one or more sides of the first frame and the center of the first frame, wherein the first focus level differs from the second focus level; means for receiving a second frame of image data captured at a second focal length, wherein the second frame is captured via the lens, wherein, due to the characteristic of the lens, the second frame is captured to include a third focus level corresponding to a third region of the second frame comprising a central region of the second frame, and a fourth focus level corresponding to a fourth region of the second frame, wherein the third region comprises an inner region of the second frame that is inside the fourth region relative to one or more sides of the second frame and the center of the second frame, wherein the third focus level differs from the fourth focus level and the first focus level; and means for combining the first frame with the second frame to generate a composite frame, the composite frame comprising a transition area corresponding to an outer boundary of the first region of the first frame and an inner boundary of the fourth region of the second frame.

In another example, the techniques of the disclosure are directed to a non-transitory computer-readable storage medium having stored thereon instructions that, when executed, cause one or more processors to: receive a first frame of image data captured at a first focal length, wherein the first frame includes a first region comprising a center of the first frame, and a second region comprising an outer region of the first frame relative to the center of the first frame and the first region of the second frame, wherein the first frame is captured via a lens, that, due to a characteristic of the lens, results in a capture of the first region and the second region to include different focus levels; receive a second frame of image data captured at a second focal length, wherein the second frame includes a third region comprising a center of the second frame, and a fourth region comprising an outer region of the second frame relative to the center of the second frame and the third region of the second frame, wherein the second frame is captured via the lens, wherein, due to the characteristic of the lens, the second frame is captured to include different focus levels relative to the third region and the fourth region of the second frame; and combine the first frame with the second frame to generate a composite frame, the composite frame comprising a transition area corresponding to an outer boundary of the first region of the first frame and an inner boundary of the fourth region of the second frame.

In another example, the techniques of the disclosure are directed to an apparatus configured for camera processing, the apparatus comprising: a memory configured to store image data, and one or more processors in communication with the memory, the one or more processors configured to: receive a first frame of the image data captured at a first focal length, wherein a first region of the first frame is in focus; receive a second frame of the image data captured at a second focal length, wherein a second region of the second frame is in focus; and combine the first frame with the second frame to generate a composite frame.

In another example, the techniques of the disclosure are directed to a method of capturing image data, the method comprising: receiving a first frame of the image data captured at a first focal length, wherein a first region of the first frame is in focus; receiving a second frame of the image data captured at a second focal length, wherein a second region of the second frame is in focus; and combining the first frame with the second frame to generate a composite frame.

In another example, the techniques of the disclosure are directed to an apparatus for camera processing, the apparatus comprising: means for receiving a first frame of image data captured at a first focal length, wherein a first region of the first frame is in focus; means for receiving a second frame of image data captured at a second focal length, wherein a second region of the second frame is in focus; and means for combining the first frame with the second frame to generate a composite frame.

In another example, the techniques of the disclosure are directed to a non-transitory computer-readable storage medium having stored thereon instructions that, when executed, cause one or more processors to: receive a first frame of image data captured at a first focal length, wherein a first region of the first frame is in focus; receive a second frame of image data captured at a second focal length, wherein a second region of the second frame is in focus; and combine the first frame with the second frame to generate a composite frame.

The details of one or more examples are set forth in the accompanying drawings and the description below. Other features, objects, and advantages will be apparent from the description, drawings, and claims.

DETAILED DESCRIPTION

In general, techniques are described regarding fusing or combining frames of image data to generate composite frames of image data. Cameras comprising camera processors configured to perform the techniques are also disclosed. A camera processor may capture multiple frames at various focal lengths. The frames of image data may have various regions of the respective frame in focus, whereas other regions of the respective frame may not be in focus, due to particular configurations of the lens and sensor combination used. For example, a mismatch in ground truth position for particular lens sensor combinations may cause frames of image data to have various regions of the frame in focus while other regions are out of focus. In one example, image sensors of a certain size and thickness may experience defocusing at outer regions or in other instances, defocusing at center regions.

The aforementioned problems, among others, may be addressed by the disclosed image fusion for defocusing lens techniques by providing cameras configured to leverage frames captured at various focal lengths and where various regions of a frame may have non-uniform focus levels across the frame to generate composite frames. The camera processor may combine the frames to achieve a single composite frame having a first region and a second region of the composite frame in focus (e.g., both center and outer regions of the composite frame in focus).

Figure 1:
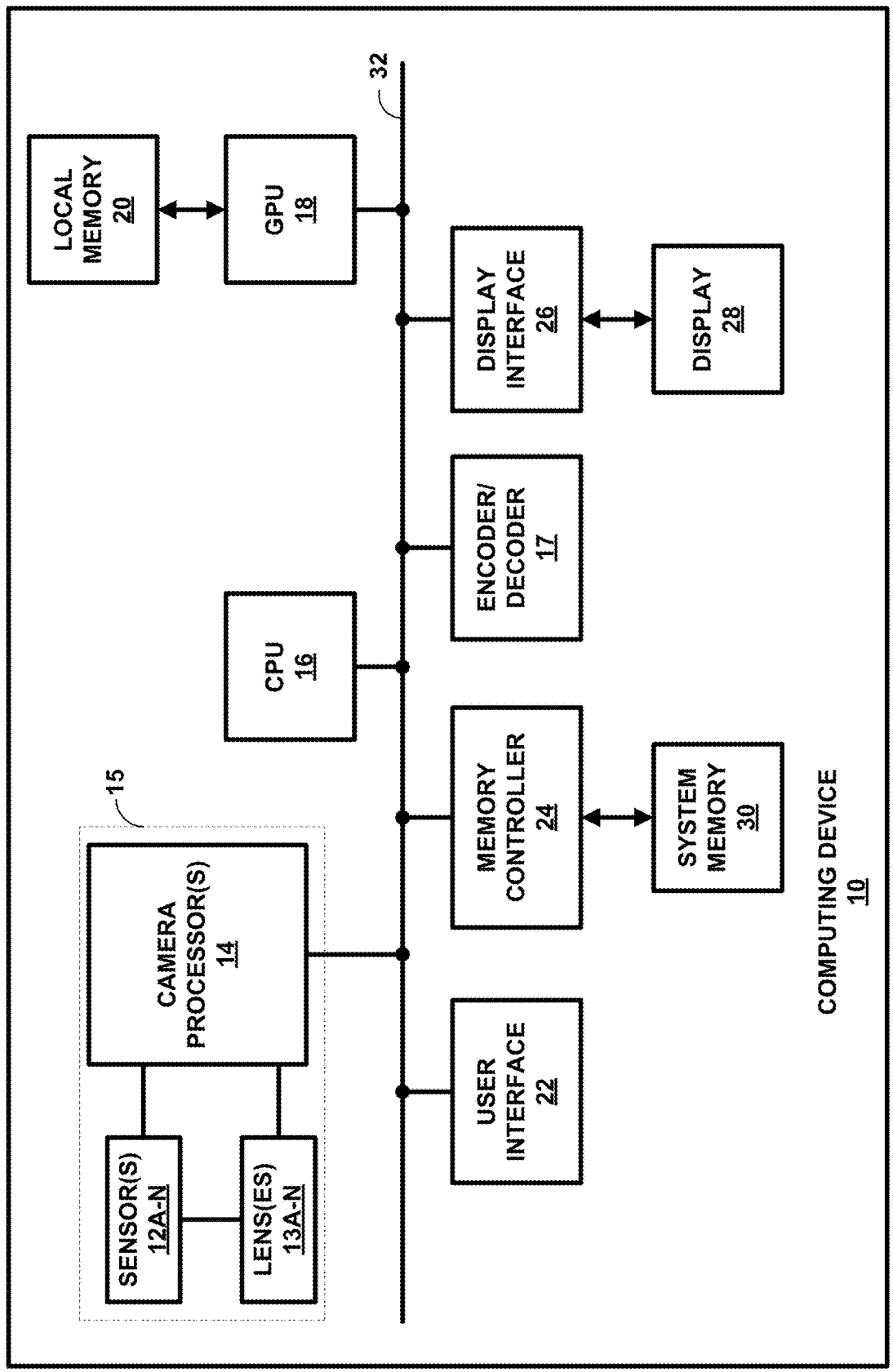
FIG. 1 is a block diagram of a device configured to perform one or more of the example techniques described in this disclosure.

FIG. 1 is a block diagram of a device configured to perform one or more of the example techniques described in this disclosure. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device, such as a portable video game device or a personal digital assistant (PDA), a drone device, or any device that may include one or more cameras.

As illustrated in the example of FIG. 1, computing device 10 includes one or more image sensor(s) 12A-N. Image sensor(s) 12A-N may be referred to in some instances herein simply as "sensor 12," while in other instances may be referred to as a plurality of "sensors 12" where appropriate. Computing device 10 further includes one or more lens(es) 13A-N and camera processor(s) 14. Similarly, lens(es) 13A-N may be referred to in some instances herein simply as "lens 13," while in other instances may be referred to as a plurality of "lenses 13" where appropriate.

As shown in FIG. 1, a camera 15 may refer to a collective device including one or more image sensor(s) 12, one or more lens(es) 13, and at least one camera processor 14. In any event, multiple cameras 15 may be included with a single computing device 10 (e.g., a mobile phone having one or more front facing cameras and one or more rear facing cameras). In a non-limiting example, one computing device 10 may include a first camera 15 comprising a first image sensor 12, a second camera 15 comprising a second image sensor 12, a third camera 15 having a third image sensor 12, etc. It should be noted that while some example techniques herein may be discussed in reference to frames received from a single camera, the techniques of this disclosure are not so limited, and a person of skill in the art will appreciate that the techniques of this disclosure may be implemented for any type of cameras 15 and combination of cameras 15 that are included with computing device 10. For example, a composite frame of image data may be generated from frames received from multiple cameras (e.g., a so-called rear facing camera and a front facing camera).

As illustrated, computing device 10 may further include a central processing unit (CPU) 16, an encoder/decoder 17, a graphics processing unit (GPU) 18, local memory 20 of GPU 18, user interface 22, memory controller 24 that provides access to system memory 30, and display interface 26 that outputs signals that cause graphical data to be displayed on display 28.

While some example techniques are described herein with respect to a single sensor 12, the example techniques are not so limited, and may be applicable to various camera types used for capturing images/videos, including devices that include multiple image sensors and/or multiple lens types. For example, computing device 10 may include dual lens devices, triple lens devices, 360-degree camera lens devices, etc. As such, each lens 13 and image sensor 12 combination may provide various optical zoom levels, angles of view (AOV), focal lengths, FOVs, etc. In some examples, one image sensor 12 may be allocated for each lens 13. That is, multiple image sensors 12 may be each allocated to different lens types (e.g., wide lens, ultra-wide lens, telephoto lens, and/or periscope lens, etc.).

In some examples, camera processor(s) 14 may adjust a focal length of one or more lenses 13. For example, camera processor(s) 14 may initiate a lens actuator that moves lens 13 toward or away from a respective image sensor 12. In this way, camera processor(s) 14 may adjust the focal length at which a frame of image data is captured via lens 13 and image sensor 12.

In some examples, a single image sensor 12 may correspond to multiple lenses 13. In such examples, light guides may be used to direct incident light on lenses 13 to respective image sensor(s) 12. An example light guide may include a prism, a moving prism, mirrors, etc. In this way, light received from a single lens may be redirected to a particular sensor 12, such as away from one sensor 12 and toward another sensor 12. For example, camera processor 14 may cause a prism to move and redirect light incident on one of lenses 13 in order to effectively change the focal lengths for the received light. By changing the focal length, the camera processor 14 may also be changing the focal point position. In any event, computing device 10 may include multiple lenses 13 corresponding to a single image sensor 12. In addition, computing device 10 may include multiple lenses 13 corresponding to separate image sensors 12. In such instances, separate image sensors 12 may be of different sizes or in some examples, at least two of the separate image sensors 12 may be of the same size.

In addition, while camera 15 may be described as comprising one sensor 12 and one camera processor 14, camera 15 may include multiple sensors and/or multiple camera processors. In any event, computing device 10 may include multiple cameras 15 that may include one or more sensor(s) 12, one or more lens(es) 13, and/or one or more camera processor(s) 14. In some examples, camera 15 may refer to sensor(s) 12 as the camera device, such that camera 15 is a sensor 12 coupled to camera processor 14 (e.g., via a communication link) and/or lens(es) 13, for example.

Also, although the various components are illustrated as separate components, in some examples the components may be combined to form a system on chip (SoC). As an example, camera processor 14, CPU 16, GPU 18, and display interface 26 may be formed on a common integrated circuit (IC) chip. In some examples, one or more of camera processor 14, CPU 16, GPU 18, and display interface 26 may be in separate IC chips. Various other permutations and combinations are possible, and the techniques of this disclosure should not be considered limited to the examples described with reference to FIG. 1.

The various components illustrated in FIG. 1 (whether formed on one device or different devices), including sensor 12 and camera processor 14, may be formed as at least one of fixed-function or programmable circuitry, or a combination of both, such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as random-access memory (RAM), static RAM (SRAM), dynamic RAM (DRAM), erasable programmable ROM (EPROM), electrically erasable programmable ROM (EEPROM), flash memory, a magnetic data media or an optical storage media.

The various structures illustrated in FIG. 1 may be configured to communicate with each other using bus 32. Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

Camera processor 14 is configured to receive image frames (e.g., pixel data) from sensor 12, and process the image frames to generate image and/or video content. For example, image sensor 12 may be configured to capture individual frames, frame bursts, frame sequences for generating video content, photo stills captured while recording video, image previews, or motion photos from before and/or after capture of a still photograph. CPU 16, GPU 18, camera processors 14, or some other circuitry may be configured to process the image and/or video content captured by sensor 12 into images or video for display on display 28. In the context of this disclosure, image frames may generally refer to frames of data for a still image or frames of video data or combinations thereof, such as with motion photos. Camera processor 14 may receive pixel data of the image frames in any format. For example, the pixel data may include different color formats, such as RGB, YCbCr, YUV, and the like.

In some examples, camera processor 14 may comprise an image signal processor (ISP). For instance, camera processor 14 may include a camera interface that interfaces between sensor 12 and camera processor 14. Camera processor 14 may include additional circuitry to process the image content. Camera processor 14 may be configured to perform various operations on image data captured by sensor 12, including auto white balance, color correction, or other post-processing operations.

In addition, camera processor 14 may be configured to analyze pixel data and/or output the resulting images (e.g., pixel values for each of the image pixels) to system memory 30 via memory controller 24. Each of the images may be further processed for generating a final image for display. For example, GPU 18 or some other processing unit, including camera processor 14 itself, may perform color correction, white balance, blending, compositing, rotation, or other operations to generate the final image content for display.

In addition, computing device 10 may include a video encoder and/or video decoder 17, either of which may be integrated as part of a combined video encoder/decoder (CODEC). Encoder/decoder 17 may include a video coder that encodes video captured by one or more camera(s) 15 or a decoder that can decode compressed or encoded video data. In some instances, CPU 16 may be configured to encode and/or decode video data, in which case, CPU 16 may include encoder/decoder 17. In any case, encoder/decoder 17 may be configured to compress composite frames generated from multiple incoming frames.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a camera application, a graphics editing application, a media player application, a video game application, a graphical user interface application or another program. For example, a camera application may allow the user to control various settings of camera 15. The user may provide input to computing device 10 via one or more input devices (not shown) such as a keyboard, a mouse, a microphone, a touch pad or another input device that is coupled to computing device 10 via user interface 22. For example, user interface 22 may receive input from the user to adjust desired digital zoom levels, alter aspect ratios of image data, record video, take a snapshot while recording video, apply filters to the image capture, select a region-of-interest for automatic-focus operations, record slow motion video or super slow motion video, apply night shot settings, capture panoramic image data, etc.

One example software application is a camera application. CPU 16 executes the camera application, and in response, the camera application causes CPU 16 to generate content that display 28 outputs. For instance, display 28 may output information such as light intensity, whether flash is enabled, and other such information. The user of computing device 10 may interface with display 28 (e.g., via user interface 22) to configure the manner in which the images are generated (e.g., with or without flash, focus settings, exposure settings, and other parameters). The camera application also causes CPU 16 to instruct camera processor 14 to process the images captured by sensor 12 in the user-defined manner.

In some instances, camera processor(s) 14 may cause image sensor 12 to output to camera processor 14 a first region (e.g., a center region) of the image or video data or an outer region of the image or video data. For example, image sensor 12 may only output the first region to camera processor 14. In such instances, camera processor(s) 14 may nevertheless combine the first region and a second region (e.g., the outer region) of different frames received from image sensor 12. In some instances, the center region may abut against the edge of a frame, in which case, the outer region may include multiple outer regions that include the corners of the frame.

In some instances, camera processor 14 or CPU 16 may activate various lenses 13 during the capture of two or more frames. For example, one lens 13 may be used during the capture of a first frame of image data and a second lens 13 may be used during the capture of a second frame of image data.

In some examples, a first image sensor 12 corresponding to a first camera may be the same image sensor 12 that corresponds to a second camera. That is, image sensor 12 that corresponds to a second camera may be the same first image sensor that corresponds to the first camera. The first camera and the second camera may provide different effective focal lengths, for example, due to different lenses being used, the activation of moving prisms, etc.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of computing device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting images from camera processor 14, etc. System memory 30 may additionally store information for use by and/or generated by other components of computing device 10. For example, system memory 30 may act as a device memory for camera processor 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media. In addition system memory 30 may store image data (e.g., frames of image data).

In some examples, system memory 30 may include instructions that cause camera processor 14, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., camera processor 14, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor 14, CPU 16, and GPU 18 may store image data, and the like, in respective buffers that are allocated within system memory 30. Display interface 26 may retrieve the data from system memory 30 and configure display 28 to display the image represented by the generated image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Display 28 may include a monitor, a television, a projection device, a liquid crystal display (LCD), a plasma display panel, a light emitting diode (LED) array, an organic LED (OLED), a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset, a tablet computer, or a laptop. Alternatively, display 28 may be a stand-alone device coupled to computing device 10 via a wired or wireless communications link. For instance, display 28 may be a computer monitor or flat panel display connected to a personal computer via a cable or wireless link.

Sensor 12 is an image sensor that may include processing circuitry, an array of pixel sensors (e.g., pixels) for capturing representations of light, memory, an adjustable lens, and an actuator to adjust the lens. In some instances, computing device 10 may include multiple sensors and as such, sensor 12 may represent one or more sensors (and accompanying lens(es) 13, apertures, flashes, etc.), where one sensor may capture images for one lens 13 and another separate sensor 12 may capture images for another lens 13.

In examples including multiple lenses 13, CPU 16 and/or camera processor 14 may activate particular lenses 13, or combinations of lenses 13, in response to receiving user input (e.g., via user interface 22). For example, CPU 16 and/or camera processor 14 may receive user input via user interface 22 that includes user selection of a particular lens 13 (e.g., a fisheye lens camera). In some examples, CPU 16 may automatically determine which lens 13 to activate and either select an initial lens 13 to activate or transition from one lens 13 to another lens 13. For example, CPU 16 and/or camera processor 14 may determine which lens 13 to activate upon detecting an operating condition that satisfies certain lens-selection criteria (e.g., digital zoom level satisfying a predefined camera transition threshold, a change in lighting conditions, input from a user calling for a particular lens 13, etc.). In some examples, multiple cameras may be used in conjunction with one another to capture one synthetic image (e.g., panoramic image), such that camera processor 14 or CPU 16 may process one synthetic image based on the image captures from sensor 12.

Figure 2:
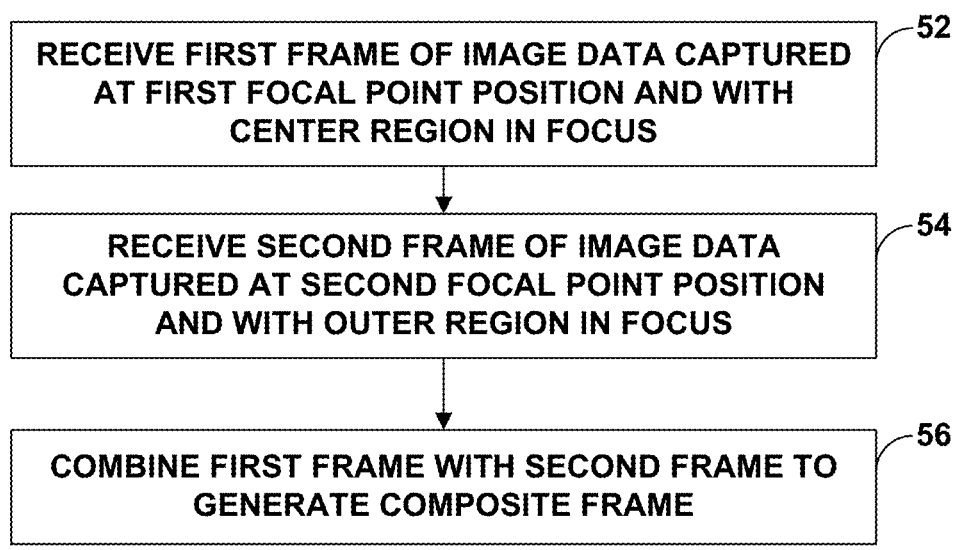
FIG. 2 is an example flow diagram illustrating example operations of the camera processor shown in FIG. 1 in accordance with various aspects of the techniques described in this disclosure.

FIG. 2 is an example flow diagram illustrating example operations of camera processor(s) 14 (e.g., camera processor(s) 2214 described with reference to FIG. 22). Although described with respect to two frames, the techniques of this disclosure are not so limited, and a person skilled in the art would understand that more frames may be used to generate one or more composite frames. For example, camera processor(s) 14 may generate a plurality of composite frames using a plurality of frames. The composite frames may be used to generate video data, such as for video coding purposes.

At the outset, camera processor(s) 14 may receive a first frame of image data (52). The first frame of image data may be captured at a first focal length. For example, the first frame may be captured using lens 13A at a first focal length. In one example, camera processor(s) 14 may cause one of image sensors 12 to capture the first frame at the first focal length. The focal length may be adjusted with lens 13A, for example, by changing the position of lens 13A or by changing the focal length of lens 13A. In some instances, the first focal length may correspond to a preset position of lens 13A. In some examples, camera processor(s) 14 may determine an adjustment of lens 13A to achieve the first focal length where a first region (e.g., the center region) of the frame is in focus at a particular focus level (e.g., a level of focus value uniformity) or alternatively, where a second region (e.g., the outer region) of the frame is in focus at a particular focus level.

The techniques described with reference to FIG. 2 may be implemented when frames of image data are captured with lens(es) 13 or image sensor(s) 12 having certain lens and/or image sensor characteristics (e.g., specifications) that result in the capture of a single frame of image data having some regions of the single frame in focus and other regions of the single frame not in focus. For example, lens(es) 13 and image sensor(s) 12 of relatively large sizes exhibit, in certain applications, such characteristics. In an illustrative and non-limiting example, such characteristics may be evident in an image sensor 12 having a dimension of at least a one-third inch image sensor. In any event, the techniques of this application may be implemented for any image sensor lens combination where large size causes defocusing on outer and/or inner regions. For example, the techniques of this application may be applicable to sensor 12 and lens 13 combinations where the ground truth positions are different for different regions (e.g., center and outer regions).

In an illustrative example, camera processor(s) 14 may receive the first frame at the first focal length, where the first frame includes some regions of the frame as being in focus and other regions of the frame being out of focus. The regions may include a first region that corresponds to a first set of pixels and an outer region corresponding to a second set of pixels and that exists outside of the first region relative to parameters of the frame (e.g., center point of the frame, edges of the frame). In one example, the first frame may include an inner region that, due to one or more characteristics of one of lens(es) 13, is captured having a first focus level (e.g., an in-focus level representing a focus level or aggregate focus level that, in the aggregate, satisfies a focus threshold) and an outer region that is at a second focus level that is less than the first focus level of the inner region. In such examples, one of lens(es) 13 through which the first frame is captured may be shaped in such a way that differences in ground truths between regions of the lens result in regions of the frame having inconsistent or non-uniform focus levels. In such instances, the differences in focus levels (e.g., focus level gradients or graduated focus levels) tend to adhere to a pattern, such as one defined (e.g., modeled) by characteristics of the lens 13 and/or image sensor 12.

In some examples, camera processor(s) 14 may receive a second frame of the image data (54). The second frame of image data may be captured at a second focal length. For example, the second frame may be captured using lens 13A at a second focal length. In some examples, the second frame may be captured using a second lens 13B set at a particular focal length. In some examples, camera processor(s) 14 may cause one of image sensors 12 to capture the second frame at the second focal length. In some instances, a second image sensor 12 (e.g., separate from the image sensor 12 used to capture the first frame) may be used to capture the second frame. In any event, camera processor(s) 14 may cause an adjustment of a first lens 13A or a second lens 13B to achieve a second focal length where an outer region of the second frame is in focus at a particular focus level. In some examples, camera processor(s) 14 may adjust one of image sensor(s) 12 relative to a lens to achieve desired focal lengths. Similarly, camera processor(s) 14 may implement various moving elements (e.g., moving prisms, moving mirrors, etc.) by causing the moving elements to engage different positions so as to effectively change the focal length for an image capture of a scene.

In an illustrative example, camera processor(s) 14 may receive the second frame at the first focal length, where the second frame includes some regions of the frame as being in focus and other regions of the frame being out of focus. The regions may include a first region that corresponds to a first set of pixels and an outer region corresponding to a second set of pixels and that exists outside of the first region relative to parameters of the frame. The regions may or may not coincide with the regions of the first frame (e.g., in terms of relative locations of structures defining the regions that correspond to each of the first and second frames). In one example, the second frame may include an outside region that, due to one or more characteristics of one of lens(es) 13, is captured having a first focus level (e.g., an in-focus level representing a focus level or aggregate focus level that, in the aggregate, satisfies a focus threshold) and an inside region that is at a second focus level that is less than the first focus level of the outer region, such as an inside region being out-of-focus, e.g., due to an astigmatic field of one of lens(es) 13. In such examples, one of lens(es) 13 through which the second frame is captured may be shaped in such a way that differences in ground truths between curvature regions of the lens, in turn, result in regions of the frame having inconsistent (e.g., non-uniform) focus levels. In such instances, the differences in focus levels (e.g., focus level gradients or graduated focus levels) tend to adhere to a pattern, such as one that defined (e.g., modeled) by characteristics of the lens 13 and/or image sensor 12.

Camera processor(s) 14 may subsequently combine the first frame with the second frame to generate a composite frame (56). In such instances, camera processor(s) 14 may generate the composite frame to have an outer region of the composite frame in focus and a first region (e.g., a center region) of the composite frame also in focus. The composite frame may also have a transition area between regions of different frames. The transition area may correspond in location to intermediate regions of individual frames. An intermediate region may be defined by one or more boundary lines (e.g., circles, area between concentric circles, amorphous shapes, area between concentric amorphous shapes, structures, etc.).

In an illustrative example, camera processor(s) 14 may combine a center region of the first frame with a corresponding or complementary region of the second frame (e.g., the outside region) to generate a composite frame including pixels from both frames and at a transition area between regions of the frames, may include pixels from one or both frames. Camera processor(s) 14 may blend, at the transition area, the regions of each frame to generate a composite frame having focus regions for both regions that correspond to at least one region that was at a lesser in focus level in the particular region of the first or second frame than was targeted for the composite frame. In one example, camera processor(s) 14 may require a frame that has one or more particular areas of the frame captured at a focus level that satisfies a particular focus level threshold (e.g., a predefined threshold). Camera processor(s) 14 may receive the first frame where the first frame does not meet the focus level threshold in at least one area of the first frame where a higher focus level was expected. In such instances, camera processor(s) 14 may implement the techniques of this disclosure to cause a capture of and receive a second frame at a second focus level, where the camera processor(s) 14 predict that at the second focus level, the second frame may have a focus level that satisfies the focus level threshold, at least at the area that was lower in the first frame. In accordance with one or more of the various techniques of this disclosure, camera processor(s) 14 may combine the two frames to generate a composite frame that has one or more focus levels (e.g., aggregate focus levels or focus levels at particular areas of the composite frame) that satisfy the focus level threshold.

In some examples, camera processor(s) 14 may move lens 13A or lens 13B according to an autofocus process. In performing the autofocus process, camera processor(s) 14 may cause lens 13A to move to achieve the first focal length so as to capture the first frame having a first region (e.g., the center region) in focus. In some examples, camera processor(s) 14 may cause lens 13A or lens 13B to move so as to capture the second frame having the outer region in focus. The autofocus process may include focusing and subsequent defocusing, or vice versa. Defocusing, as used herein, generally refers to camera 15 having in focus a region of a frame, and subsequently defocusing or focusing less on the region. In such instances, camera 15 may focus less on the previous in focus region (e.g., a first, inner region) in order to focus on another region of a subsequent frame (e.g., a second, outer region).

Figure 3:
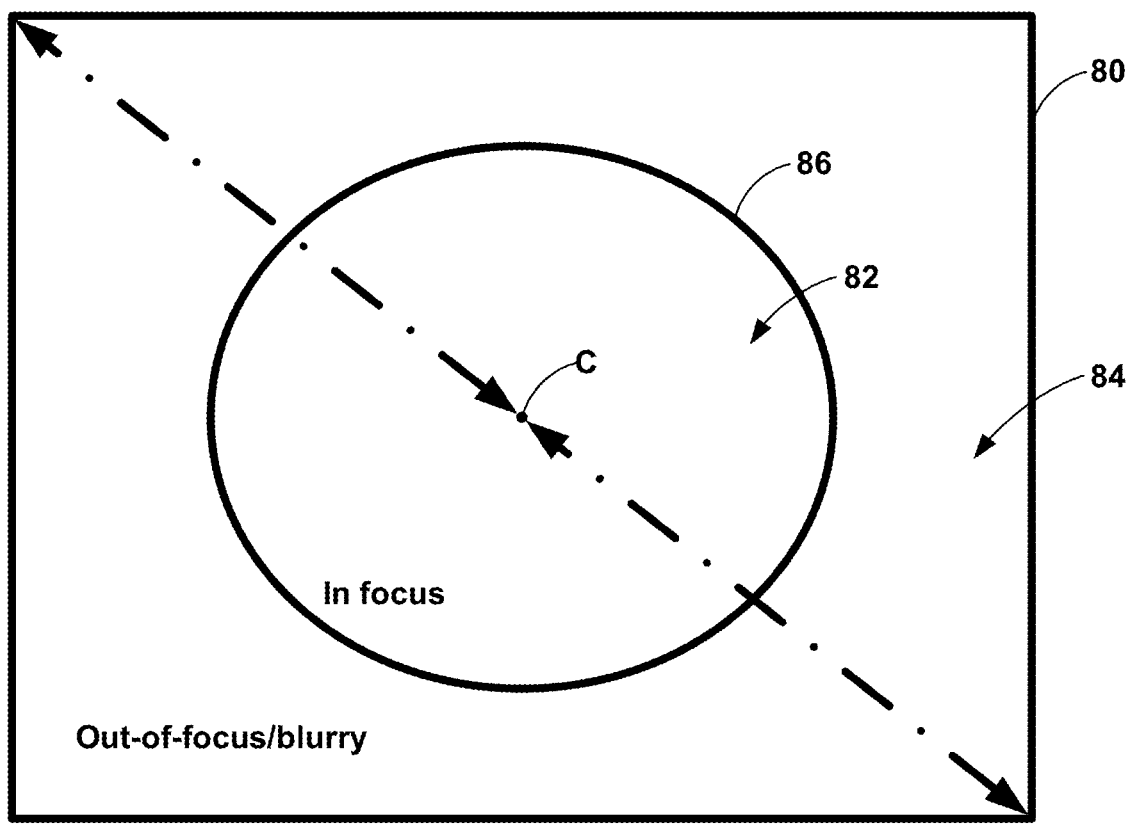
FIG. 3 is an example diagram illustrating a frame of image data received via the camera processor shown in FIG. 1 having a center region of the frame in focus in accordance with various aspects of the techniques described in this disclosure.

FIG. 3 is an example diagram illustrating a first frame 80 of image data received via camera processor(s) 14 (described with reference to FIG. 1), in accordance with various aspects of the techniques described in this disclosure. As illustrated, first frame 80 has a center region 82 (e.g., a first region of frame 80) that is in focus. In one example, center region 82 may be captured to include one or more focus levels indicating that center region 82 is in focus above a particular focus level. In some examples, the one or more focus levels may represent a single focus level (e.g., an average of the one or more focus levels corresponding to a defined region of a frame). Center region 82 may include center (C) of frame 80. In addition, frame 80 has an outer region 84 (e.g., a second region of frame 80 outside center region 82) that is not in focus.

Center region 82 and outer region 84 may be separated by a virtual boundary 86. As shown in FIG. 3, virtual boundary 86 is a circular boundary separating center region 82 and outer region 84. In some examples, center region 82 and outer region 84 abut one another or otherwise join at virtual boundary 86 (e.g., without interceding regions therebetween). In such examples, center region 82 and outer region 84 are contiguous with one another. While illustrated as being contiguous with one another, the techniques of this disclosure are not so limited, and it will be understood that virtual boundary 86 may represent one or more additional regions that effectively separate center region 82 and outer region 84, such that center region 82 and outer region 84 are adjoined with one another via the one or more additional regions (e.g., one or more interceding regions). In one example, virtual boundary 86 may have an area, such as a donut shape or other amorphous two-dimensional shape, that defines inner, outer, and in some instances, middle, portions of virtual boundary 86. In such examples, the one or more additional regions define virtual boundary 86 that, in turn, effectively separates and/or defines adjacent boundaries of center region 82 and outer region 84 (e.g., an outer boundary of center region 82 and/or an inner boundary of outer region 84).

In an illustrative example, a first region (e.g., center region 82) and a second region (e.g., outer region 84) may abut one another in a contiguous spatial relationship, or in some examples, may be spaced apart in terms of relative spatial relationships between a first structure (e.g., an outer boundary) of the first region and a second structure (e.g., an inner boundary) of the second region. In such examples, the first structure of frame 80 and/or second structure of frame 80 may be defined relative to a center of frame 80. In an example, an inner boundary of a given region may generally refer to a structure of the region that is closer to center (C) of frame 80, such as by being closer to a central region of frame 80, compared to an outer boundary of the region (e.g., outer portions of an outer region that coincide with one or more sides or edges of frame 80). Likewise, an outer boundary of a given region may generally refer to a structure that is farther from center (C) of frame 80 compared to an inner boundary of the region that is relatively closer to center (C) and that, in some instances, includes center (C), such as when referring to a region of frame 80 that includes or at least partially surrounds center (C). In some examples, frame 80 may represent a set of pixels for the frame, where center region 82 corresponds to a pixel subset and outer region 84 corresponds to another pixel subset. In such examples, outer region 84 exists as part of a region of frame 80 that is outside center region 82 in terms of relative locations of the pixel subsets. That is, pixels of the pixel subsets exist either in relative proximity to a center (C) of frame 80 or similarly, in relative to proximity to one or more edges of frame 80. In addition, pixels of the pixel subsets may exist in relative proximity to virtual structures of frame 80, such as relative to one or more structures of a transitioning structure that exists between various regions of frame 80, which in turn may further define how center region 82 may be inside outer region 84 or vice versa (e.g., outer region 84 being outside center region 82).

Figure 4:
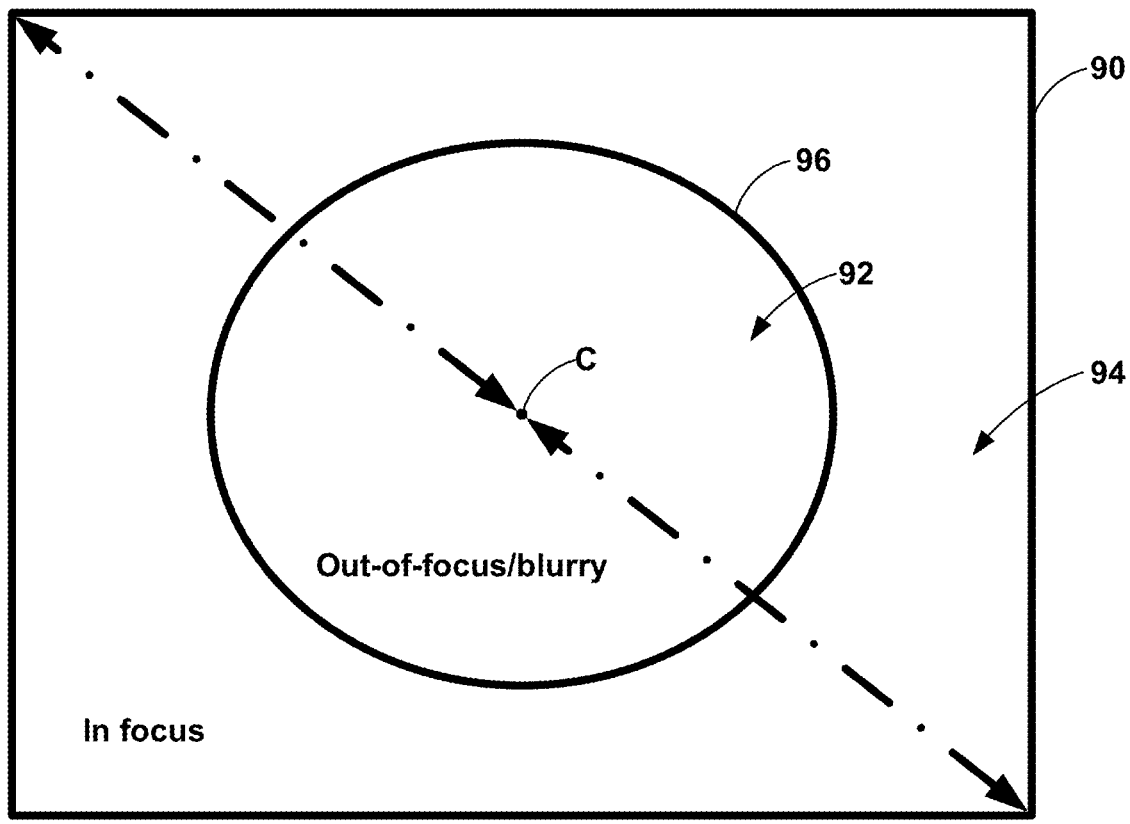
FIG. 4 is an example diagram illustrating a frame of image data received via the camera processor shown in FIG. 1 having an outer region of the frame in focus in accordance with various aspects of the techniques described in this disclosure.

FIG. 4 is an example diagram illustrating a second frame 90 of image data received via camera processor(s) 14 (described with reference to FIG. 1), in accordance with various aspects of the techniques described in this disclosure. As illustrated, second frame 90 has a center region 92 of frame 90 (e.g., a first region of frame 90) that is not in focus (e.g., at a focus level). Center region 92 may include center (C) of frame 90. In addition, frame 90 has an outer region 94 (e.g., a second region of frame 90) that is in focus (e.g., at a focus level that differs from the other level). It should be understood that camera processor(s) 14 may capture other frames of image data between second frame 90 and first frame 80. In other instances, camera processor(s) 14 may capture first frame 80 and second frame 90 in succession, where a frame delay may be used in order to actuate one of lens(es) 13 prior to capturing second frame 90.

Center region 92 and outer region 94 may be separated by a virtual boundary 96. As shown in FIG. 4, virtual boundary 96 is a circular boundary separating center region 92 and outer region 94. In some examples, center region 92 and outer region 94 abut one another or otherwise join at virtual boundary 96 (e.g., without interceding regions therebetween). In such examples, center region 92 and outer region 94 are contiguous with one another. While illustrated as being contiguous with one another, the techniques of this disclosure are not so limited, and it will be understood that virtual boundary 96 may represent one or more additional regions that effectively separate center region 92 and outer region 94, such that center region 92 and outer region 94 are adjoined with one another via the one or more additional regions (e.g., one or more interceding regions). In one example, virtual boundary 96 may have an area, such as a donut shape, that defines inner, outer, and in some instances, middle, portions of virtual boundary 96. In such examples, the one or more additional regions define virtual boundary 96 that, in turn, effectively separates and/or defines adjacent boundaries of center region 92 and outer region 94 (e.g., an outer boundary of center region 92 and/or an inner boundary of outer region 94).

In an illustrative example, a third region (e.g., center region 92) and a fourth region (e.g., outer region 94) may abut one another in a contiguous spatial relationship, or in some examples, may be spaced apart in terms of relative spatial relationships between a first structure (e.g., an outer boundary) of the first region and a second structure (e.g., an inner boundary) of the second region. In such examples, the first structure and second structure of frame 90 may be defined relative to a center of frame 90. In an example, an inner boundary of a given region may generally refer to a structure of the region that is closer to center (C) of frame 80, such as by being closer to a central region of frame 90, compared to an outer boundary of the region (e.g., outer portions of an outer region that coincide with one or more sides or edges of frame 90). Likewise, an outer boundary of a given region may generally refer to a structure that is farther from center (C) of frame 90 compared to an inner boundary of the region that is relatively closer to center (C) and that, in some instances, includes center (C), such as when referring to a region of frame 90 that includes or at least partially surrounds center (C) (e.g., a center point of frame 90, a central region of frame 90, etc.).

In some examples, frame 90 may represent a set of pixels for the frame, where center region 92 corresponds to a pixel subset and outer region 94 corresponds to another pixel subset. In such examples, outer region 94 exists as part of a region of frame 90 that is outside center region 92 in terms of relative locations of the pixel subsets. That is, pixels of the pixel subsets exist either in relative proximity to center (C) of frame 90 or similarly, in relative to proximity to one or more edges of frame 90. In addition, pixels of the pixel subsets may exist in relative proximity to virtual structures of frame 90, such as relative to one or more structures of a transition structure that exists between various regions of frame 90, which in turn may further define how center region 92 may be inside outer region 94 or vice versa (e.g., outer region 94 being outside center region 92). In some examples, one or more respective regions of frame 80 and frame 90 may coincide with one another, such as in terms of the spatial relationships between regions each frame and in terms of overlapping regions between frames as outlined by such spatial relationships.

While described in some instances as including corresponding regions that coincide between two frames, the techniques of this disclosure are not so limited, and it should be understood that some regions between consecutive frames may not coincide temporally or spatially so to coincide relative to structures of each frame. In any case, camera processor(s) 14, CPU 16, and/or GPU 18 may determine transition structures between region of each frame and combine frames to generate a composite frame, in accordance with one or more of the various techniques of this disclosure, where the composite frame may include a transition area that coincides with one or more of the transition structures. In this way, the one or more processors may then blend regions of the respective frames (e.g., pixel representations of the respective frames) at the one or more transition structures (e.g., a virtual boundary or multiple spatial boundaries) so as to generate a composite frame that includes a transition area representing pixels of the first frame, pixels of the second frame, and/or pixels from both frames as in a pixel blending area of the transition area. As described herein, the one or more processors may determine portions of the transition area, if not an entire transition area, that may include pixel-blending areas and portions, if not an entire transition area, that may include non-pixel-blending areas, based on values of weighting tables and/or via an analysis of filtered pixel values, such as those pixel values or weighting-table values that coincide with respective transition structures and/or that coincide with a transition area of a composite frame that coincides with at least one transition structure from each of frame 80 and frame 90.

Figure 5:
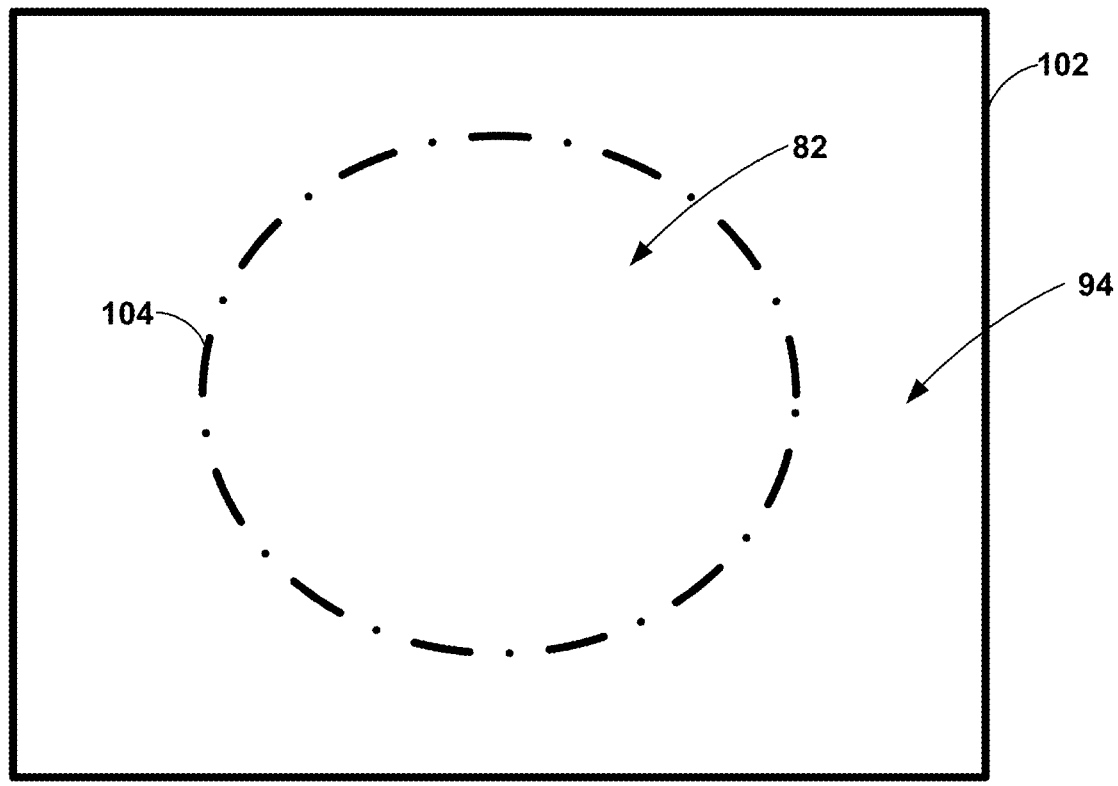
FIG. 5 is an example diagram illustrating a composite frame of image data having a center region of the frame in focus and an outer region of the frame in focus in accordance with various aspects of the techniques described in this disclosure.

FIG. 5 is an example diagram illustrating a composite frame 102 of image data having center region 82 in focus from FIG. 3 and an outer region 94 in focus from FIG. 4 in accordance with various aspects of the techniques described in this disclosure. Composite frame 102 may have a uniform focus level that is higher (e.g., more uniform) relative to either first frame 80 or second frame 90. Center region 82 and outer region 94 may intersect at a boundary 104 (e.g., a one-dimensional boundary, a two-dimensional boundary defining a space therebetween, etc.). Boundary 104 may correspond to a transition area or region of composite frame 102 where camera processor(s) 14 may blend center region 82 and outer region 94 to generate composite frame 102. For example, camera processor(s) 14 may combine center region 82 of first frame 80 with outer region 94 of second frame 90.

Camera processor(s) 14 may not use the outer region 84 of first frame 80 or center region 92 of second frame 90 because such regions are not in focus. Camera processor(s) 14 may subsequently perform a blending process. In performing the blending process, camera processor(s) 14 may blend center region 82 of first frame 80 with outer region 94 of second frame 90. In some examples, camera processor(s) 14 may use weighting tables to perform the blending process as described herein. In some examples, camera processor(s) 14 may combine frame 80 with frame 90 to generate composite frame 102, where a first set of pixels of frame 80 blend with a second set of pixels of second frame 90 (e.g., within composite frame 102).

In some examples, center region 82 may be contiguous with outer region 94 as part of composite frame 102, such as prior to a blending process or after the blending process. In another example, center region 82 of first frame 80 may be separated from outer region 94, at least prior to the blending process, such that a space exists between portions of each corresponding regional structure. In either case, similarly to the discussion for individual frames (e.g., singular or single frames), outer region 94 may at least partially surround center region 82, and in some instances, may fully surround center region 82 so as to envelope center region 82. In some examples, the one or more processors (e.g., camera processor(s) 14) may interpolate between pixel values to generate composite frame 102, such as by blending adjacent or neighboring pixels values relative to a space of boundary 104 that exists between regions. In an example, camera processor(s) 14 may determine a prediction of pixel values between regions, where the prediction may provide, in some instances, a higher resolution at the transition area compared to a resolution achieved via certain pixel combination techniques (e.g., certain lower-resolution pixel weighting implementations). In some instances, the pixel weighting table may include prediction values, in addition to or in lieu of weighting values that define an extent to which pixels from each frame may contribute to composite frame 102 (e.g., a blending level or relative scaling level). In one example, the extent to which pixels contribute to a frame may represent an allocation amount, whereby camera processor(s) 14 may, in accordance with one or more of the various techniques disclosed herein, allocate a particular amount of pixels from a frame to a composite frame, scale pixel values, discard pixels from certain frames altogether, and/or may substitute pixels (e.g., via predicted pixel values in certain instances, such as when creating a motion photo or in other instances). In any case, camera processor(s) 14 may allocate pixels to represent composite frame 102 in accordance with the blending process (e.g., pixel weighting, high-pass filtering, prediction values, or combinations thereof). It should be understood that prediction values may be based on previously generated composite frames, previously received frames, and/or by using other techniques, such as those described herein, for determining pixel values for a transition area of a composite frame.

In some instances, outer region 94 and/or center region 82 may not center around center (C). In such cases, outer region 94 may at least partially surround center region 82, such that outer region 94 subsists outside an outer boundary (e.g., structure) of center region 82, where center region 82 includes a center (C) portion of a frame, even if not centering around the center (C), where. It should be noted that a spatial location for center (C) of a given frame may, in some instances, depend on one or more characteristics of lens(es) 13, such as where one or more axis of lens(es) 13 coincide, that due, to the one or more lens characteristics, cause various regions of individual frames to be captured with non-uniform focus levels across regions. In addition, as described herein, focus levels (e.g., particularly excessive gradients between focus levels) may define such structures between various regions (e.g., regions of the composite frame or regions of individual frames). In such examples, a single frame may include two or more regions that each include pixel subsets and focus level gradients between pixels subsets that provide for combinations between a plurality of neighboring pixel regions in order to generate a composite frame that is more uniformly focus compare to any one or more of the individual frames of the image data. In another example, a single frame may include two or more regions that are predefined, such as by predefined percentages of a frame that are allocated particular regions of the frame. In some instances, camera processor(s) 14 may determine such region allocations based on one or more characteristics of a lens (e.g., a lens set or a plurality of lenses) through which image data is captured (e.g., one or more astigmatic fields of lenses 13A-13N, a single representation or an equivalent combination of the one or more astigmatic fields of lenses 13A-13N, etc.).

While described with reference to particular region and/or region structures (e.g., circles, concentric circles, etc.), the techniques of this disclosure are not so limited. In some examples, a frame may include a center region that includes a center point and that abuts an edge of one or more sides of a frame and an outer region that is outside of the center region, such as a by being above and/or below the center region so as to abut an edge or edges of an upper side of the frame and/or a lower side of the frame. In some examples, an outer region may partially surround a center region, such as to include a top edge of a frame and a bottom edge of a frame and where the center region is surrounded by the outer region on the top and bottom of the center region. In such examples, camera processor(s) 14 may create panoramic images, 360° images, etc., from frames captured advantageously at different focus levels so that a focus level of the ultimate image may transcend the focus level of each individual frame in a particular manner. These techniques, in turn, facilitate capture of such frames and images using particular lens configurations, such as relatively large lenses that, due to a particular form factors, may result in potentially unavoidable ground truth discrepancies, but that are otherwise capable of facilitating the capture of larger frames of image data and providing higher resolution for image captures.

Figure 6:
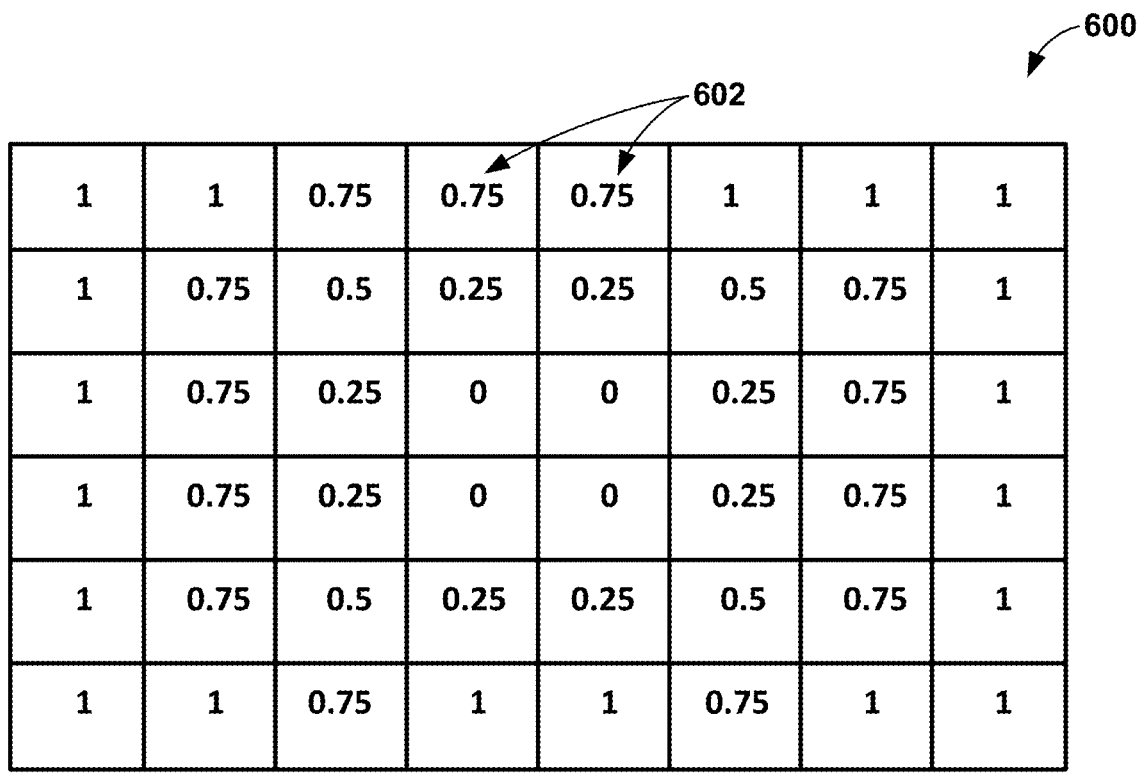
FIG. 6 is an example weighting table used to combine the frames of image data in accordance with various aspects of the techniques described in this disclosure.

FIG. 6 is an example weighting table 600 used to combine frames of image data in accordance with various aspects of the techniques described in this disclosure. For example, camera processor(s) 14 may determine and/or access a pixel weighting table that indicates an extent to which pixels corresponding to first frame 80 are to contribute to composite frame 102 relative to an extent to which pixels corresponding to second frame 90 are to contribute to the composite frame 102. In some examples, weighting table 600 is a detail weighting table, a distance weighting table, or a combination of both a detail weighting table and a distance weighting table, and may in some instances be referred to herein as a pixel weighting table. For example, weighting table 600 may be a pixel weighting table, in which contribution values 602 define an extent to which pixels from each of multiple frames are to contribute to a composite frame. Contribution values 602 may be on a scale of 0 to 1 (e.g., 0 to 100%). In some instances, camera processor(s) 14 may determine contribution values 602 of weighting table 600 based at least in part on one or more characteristics of one or more lens(es) 13. In addition, camera processor(s) 14 may determine contribution values 602 of weighting table 600 based at least in part on one or more measurements performed during a calibration process, wherein camera processor(s) 14 are configured to cause the one or more measurements to be performed with respect to different object distances.

In some examples, camera processor(s) 14 may determine values of weighting table 600 by applying a high pass filter to intermediate regions between a first region and a second region (e.g., center and outer regions) of each frame. In some examples, camera processor(s) 14 may determine values of weighting table 600 by applying a high pass filter to the transition area of a composite frame. In such examples, the transition area may correspond to an outer boundary of the center region of the first frame and an inner boundary of the outer region of the second frame. In any case, camera processor(s) 14 may determine values of a weighting table 600 based at least in part on application of the high pass filter. In some examples, weighting table 600 used to blend the regions of different frames together may be a combination of a detail weighting table and distance weighting table, as described below.

Camera processor(s) 14 may combine first frame 80 (e.g., center region focused) and second frame 90 (e.g., outer region focused) according to the following equation: composite frame 102=first frame 80\*(1−contribution value 602)+second frame 90\*(contribution value 602). Camera processor(s) 14 may perform the calculation for each pixel of composite frame 102 using corresponding contribution values 602. For example, with this equation, it can be seen that first frame 80 may contribute having a higher pixel weight to the composite frame in some instances (e.g., 1 minus a 0.25 contribution value=0.75 or 75%), whereas second frame 90 may contribute at a higher pixel weight in other instances (e.g., contribution value=0.75 or 75%). In such instances, camera processor(s) 14 may average or combine pixel values from each frame in accordance with the respective contribution values 602 (e.g., pixel weights) of weight table 600.

Figure 7:
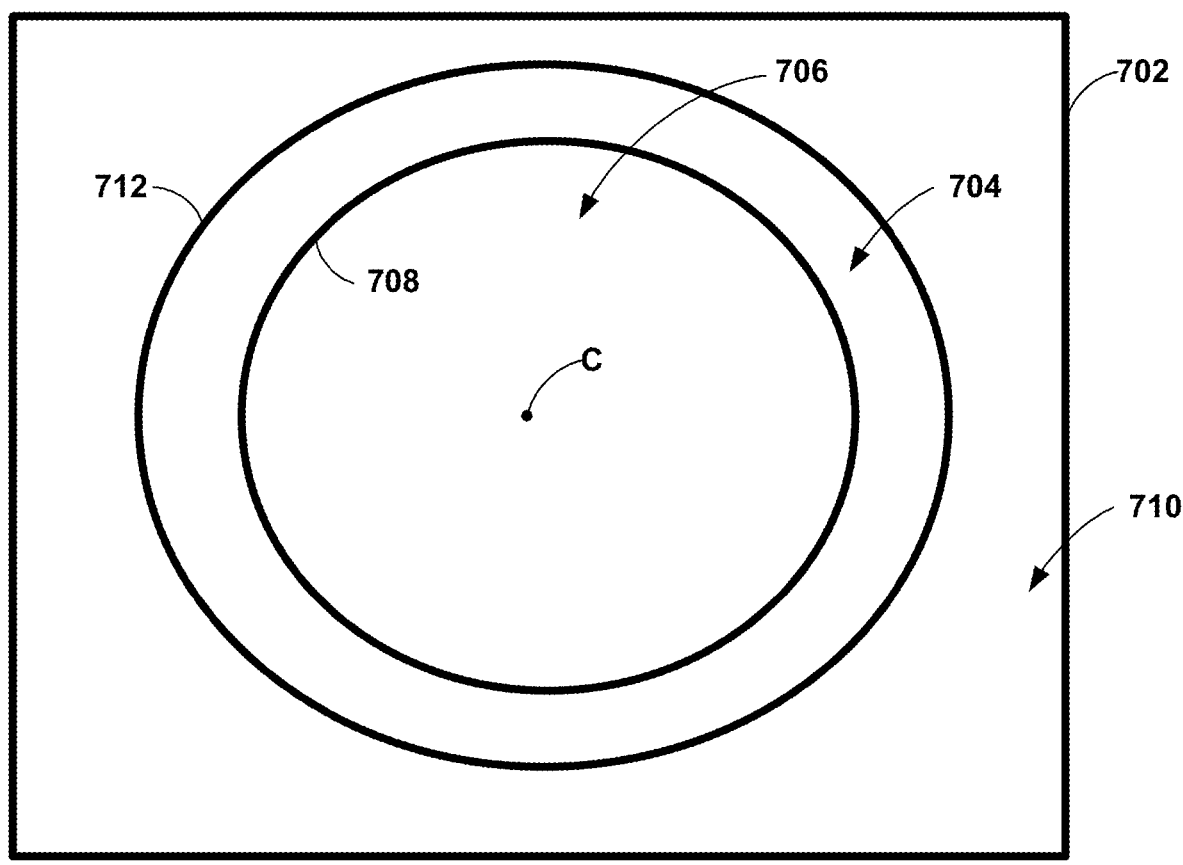
FIG. 7 illustrates an example intermediate region between two regions of a first frame having a center region in focus in accordance with various aspects of the techniques described in this disclosure.

In some instances, camera processor(s) 14 may determine an intermediate region between regions of a frame. FIG. 7 illustrates an example intermediate region 704 between two regions of a first frame 702 having a center region 706 in focus in accordance with various aspects of the techniques described in this disclosure. Intermediate region 704 may be between an inner boundary 712 of outer region 710 and an outer boundary 708 of center region 706 (e.g., defined by the area between concentric circles). In an example, intermediate region 704 may the same width relative to inner boundary 712 (e.g., uniform width). In some examples, inner boundary 712 of outer region 710 and an outer boundary 708 of center region 706 may be selected based on focus levels (e.g., focus values, sharpness values) of frame 702. For example, intermediate region 704 may be determined so as to include a transition area where focus levels exceed a predefined transition threshold. In addition, camera processor(s) 14 may determine intermediate region 704 so as to include margins around the transition area that may define inner boundary 712 and outer boundary 708. The margins in some instances may be predefined. In some instances, camera processor(s) 14 may determine the width of inner and outer margins around the transition area based on conditions of the image capture, such as the distance of a detected object in frame 702. Other examples of region detection are discussed further with reference to FIG. 18.

Figure 8:
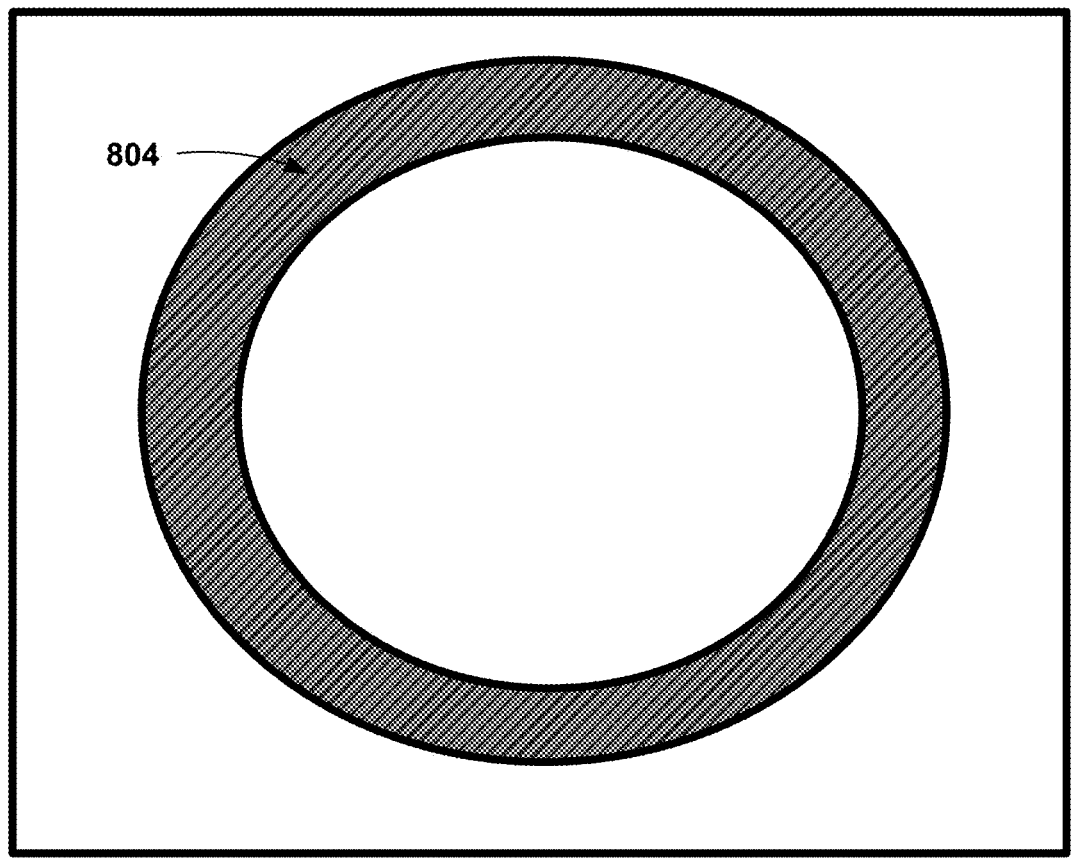
FIG. 8 illustrates an example visual representation of a detail map generated from a filter being applied to the first frame of FIG. 7 in accordance with various aspects of the techniques described in this disclosure.

Camera processor(s) 14 may then generate a detail map for first frame 702. In particular, camera processor(s) 14 may generate the detail map by applying a filter to the intermediate region 704. FIG. 8 illustrates an example visual representation of a detail map 804 generated from a filter being applied to the first frame of FIG. 7 in accordance with various aspects of the techniques described in this disclosure. In some instances, the filter is a high pass filter configured to output pixel values representing an amount of detail in a frame of image data. In some examples, the process of applying a high pass may include locating a gradient image in the x-direction and/or the y-direction relative to first frame 702 and/or second frame 902. In some examples, the filter may include a convolution filter (e.g., a Sobel filter, Laplace filter, convolution masks, etc.) configured to extract detail values from first frame 702 and/or second frame 902 in order to create a detail map, such as a feature map, activation map, etc. In some examples, the filter may be applied to the entire frame of image data. The filter, in some instances, however, may be applied to the first intermediate region 704 of first frame 702. That is, camera processor(s) 14 may determine intermediate region 704 as being a region between center region 706 and outer region 710. In some examples, camera processor(s) 14 may determine intermediate region 704 as including one or more of center region 706 of the second frame 702 or outer region 710 of second frame 702. For example, intermediate region 704 may include both portions of center region 706 and outer region 710 (e.g., where both regions meet).

Camera processor(s) 14 may automatically determine parameters of intermediate region 804 as comprising a boundary between a center region and an outer region of second frame 802. As described herein, camera processor(s) 14 may determine the various regions and boundary regions of a frame using lens and/or image sensor characteristics, target distances, etc. Likewise, the size of intermediate region 804 may be automatically determined, may be predefined, or in some instances, both (e.g., automatically tailored from predefined parameters). In this way, camera processor(s) 14 may determine detail map 804 for use in determining W_detail, as described with reference to FIGS. 11 and 12.

Figure 9:
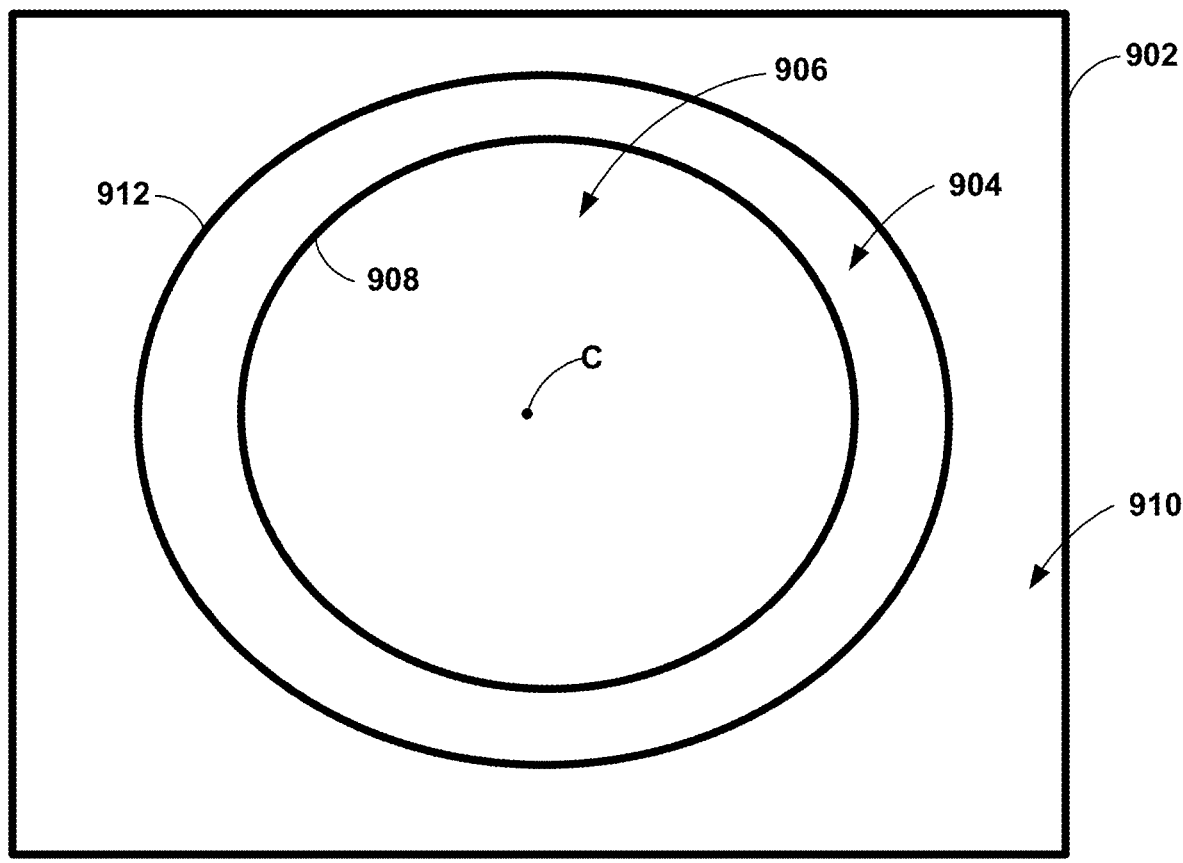
FIG. 9 illustrates an example intermediate region between two regions of a second frame having an outer region in focus in accordance with various aspects of the techniques described in this disclosure.

In some instances, camera processor(s) 14 may determine an intermediate region between regions of a second frame. FIG. 9 illustrates an example intermediate region 904 between two regions of a second frame 902 having an outer region 910 in focus in accordance with various aspects of the techniques described in this disclosure. The transition area may be between an inner boundary 912 of outer region 910 and an outer boundary 908 of center region 906 (e.g., defined by the area between concentric circles). In an example, intermediate region 904 may the same width relative to inner boundary 912 (e.g., uniform width). In some examples, inner boundary 912 of outer region 910 and an outer boundary 908 of center region 906 may be selected based on focus levels (e.g., focus values, sharpness values) of frame 902. For example, intermediate region 904 may be determined so as to include a transition area where focus levels exceed a predefined transition threshold. In addition, camera processor(s) 14 may determine intermediate region 904 so as to include margins around the transition area that may define inner boundary 912 and outer boundary 708. The margins in some instances may be predefined. In some instances, camera processor(s) 14 may determine the width of inner and outer margins around the transition area based on conditions of the image capture, such as the distance of a detected object in frame 902. Other examples of region detection are discussed further with reference to FIG. 18. In some examples, camera processor(s) 14 may determine intermediate regions 704 and 904 together as corresponding to outer boundary 708 of center region 706 of first frame 702 and inner boundary 912 of outer region 910 of second frame 902. In this way, intermediate regions 704 and 904 may be of the same dimensions (e.g., size, shape, location, etc.).

Figure 10:
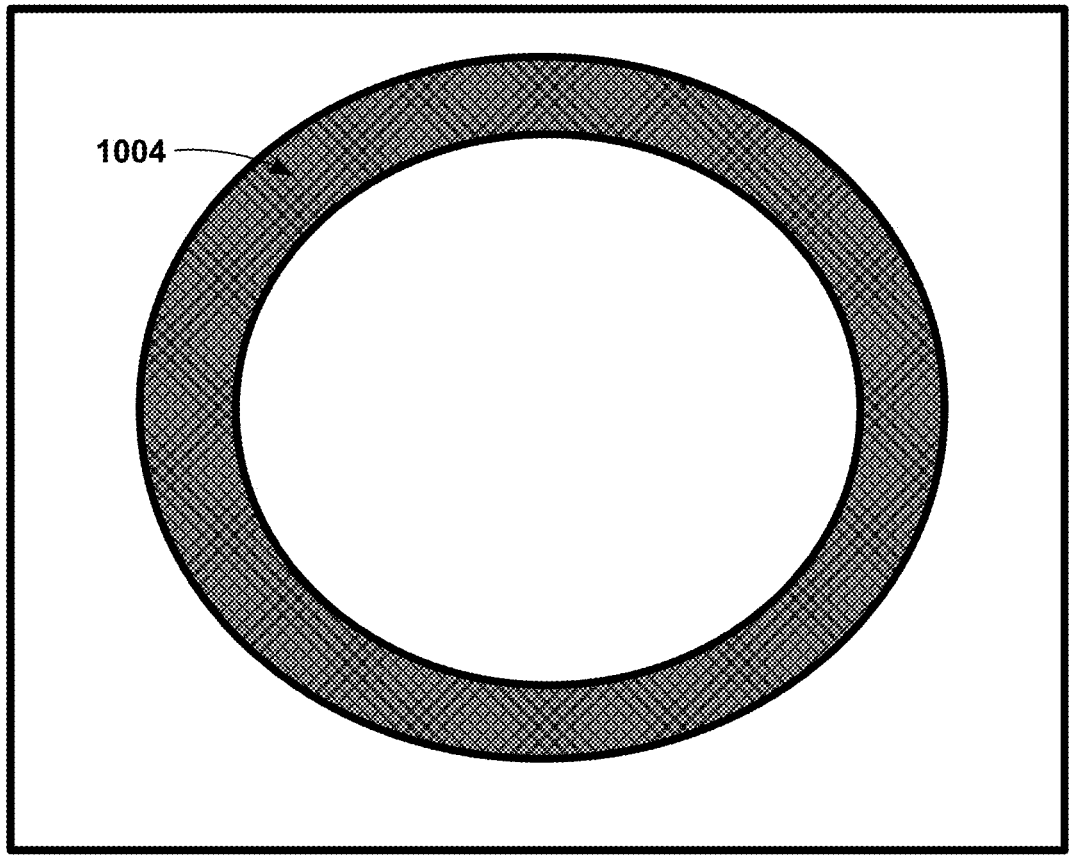
FIG. 10 illustrates an example visual representation of a detail map generated from a filter being applied to the second frame of FIG. 9 in accordance with various aspects of the techniques described in this disclosure.

Camera processor(s) 14 may then generate a detail map for second frame 902. In particular, camera processor(s) 14 may generate the detail map by applying a filter to the intermediate region 904. FIG. 10 illustrates an example visual representation of a detail map 1004 generated from a filter being applied to the second frame of FIG. 9 in accordance with various aspects of the techniques described in this disclosure. In some instances, the filter is a high pass filter configured to output pixel values representing an amount of detail in a frame of image data. In some examples, the filter may be applied to the entire frame of image data. The filter, in some instances, however, may be applied to the second intermediate region 904 of second frame 902. That is, camera processor(s) 14 may determine second intermediate region 904 as being a region between center region 906 and outer region 910. In some examples, camera processor(s) 14 may determine intermediate region 904 as including one or more of center region 906 of the second frame 902 or outer region 910 of second frame 902. For example, intermediate region 904 may include both portions of center region 906 and outer region 910 (e.g., where both regions meet).

Camera processor(s) 14 may automatically determine parameters of intermediate region 904 as comprising a boundary between a center region and an outer region of second frame 902. As described herein, camera processor(s) 14 may determine the various regions of a frame using lens and/or image sensor characteristics, target distances, etc. Likewise, the size of intermediate region 904 may be automatically determined, may be predefined, or in some instances, both (e.g., automatically tailored from predefined parameters). In any event, camera processor(s) 14 may apply the high pass filter to pixel values corresponding to intermediate region 904. In this way, camera processor(s) 14 may determine detail map 1004 for use in determining W_detail, as described with reference to FIGS. 11 and 12.

Figure 11:
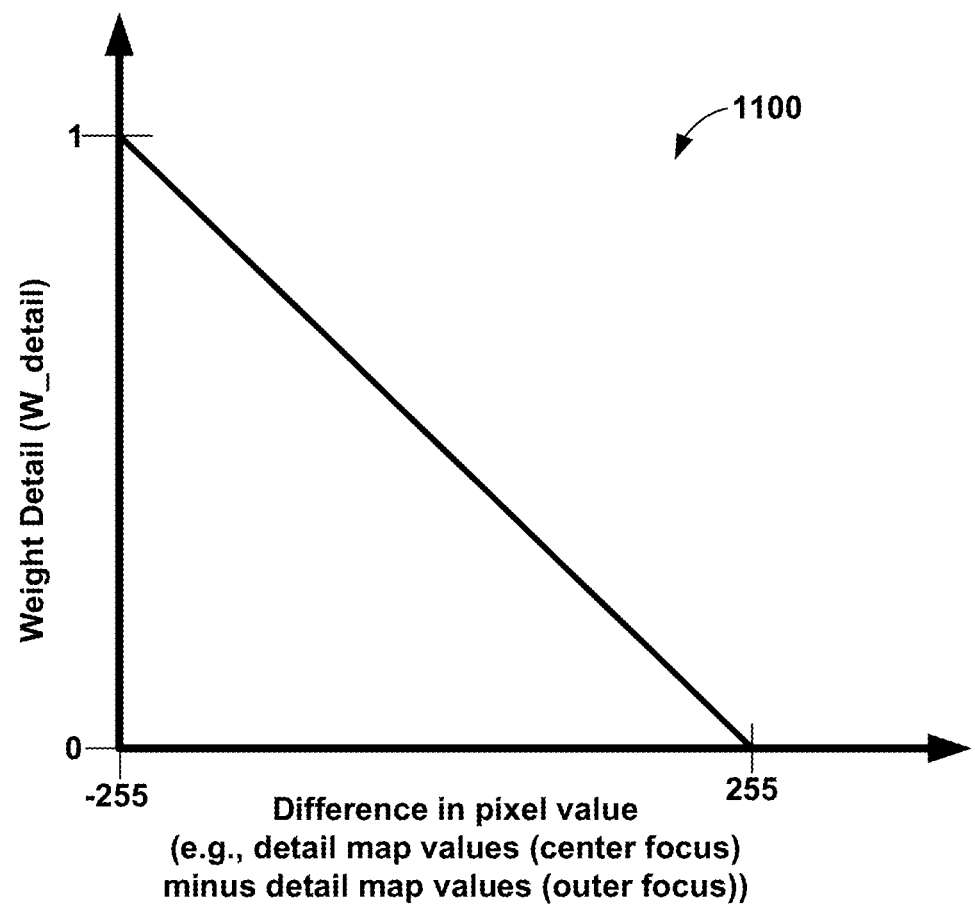
FIG. 11 is a graph illustrating example detail weighting value correlations using values of the example detail maps of FIGS. 8 and 10 in accordance with various aspects of the techniques described in this disclosure.
Figure 12:
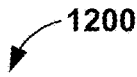
FIG. 12 is an example detail weighting table used to combine frames of image data in accordance with various aspects of the techniques described in this disclosure.

FIG. 11 is a graph illustrating example detail weighting value correlations using values of the example detail maps of FIGS. 8 and 10 in accordance with various aspects of the techniques described in this disclosure. Camera processor(s) 14 may, at either intermediate region 704 or 904, determine values of a pixel weighting table based at least in part on application of the high pass filter. In such examples, the pixel weighting table may be a detail weighting table 1200. FIG. 12 is an example detail weighting table 1200 used to combine frames of image data in accordance with various aspects of the techniques described in this disclosure.

In some examples, camera processor(s) 14 may use detail maps 804 and 1004 to determine a pixel difference value. The pixel difference values, as in the x-axis of FIG. 11, are determined by subtracting the detail map values of detail map 1004 from the detail map values of detail map 804, or in some cases, vice versa. The difference value may be determined for each area of the detail map corresponding in location between frames 702 and 902. The difference in pixel difference value may then map to a particular weight detail (W_detail). The weight value correlations may be linear, as illustrated in the example of FIG. 11, or in some instances, non-linear. For example, a look-up-table may be used to determine correlating W_detail values based on the difference in pixel values from the detail maps 804 and 1004. As shown in FIG. 11, W_detail may take on a value between 0 and 1. Camera processor(s) 14 may generate detail weighting table 1200 based on the W_detail values determined from the detail mapping. That is, camera processor(s) 14 may determine values of detail weighting table 1200 based at least in part on first detail map 804 and second detail map 1004. Camera processor(s) 14 may then utilize the detail weighting table when blending one or more regions of a first frame, such as focused center regions, intermediate regions, etc., with one or more regions of a second frame, such as focused outer regions, intermediate regions, etc., for example, by scaling pixel values from each respective frame when generating the blended, composite frame according to values of the detail weighting table 1200.

In some examples, camera processor(s) 14 may compare filtered pixel values from first detail map 804 to filtered pixel values from second detail map 1004. Camera processor(s) 14 may perform the comparison of filtered pixel values for each filtered pixel value from each of detail maps 804 and 1004 according to corresponding pixel locations between first frame 702 and second frame 902. For example, camera processor(s) 14 may subtract, in the intermediate region, pixel values of detail map 804 from detail map 1004. That is, camera processor(s) 14 may subtract filtered pixel values from the frame having a first region (e.g., the center region) in focus from corresponding filtered pixel values from the frame having a second region (e.g., an outer region) in focus. In such examples, camera processor(s) 14 may determine the values of the detail weighting table 1200 based at least in part on the comparison. For example, a difference value of −255 may correlate to a W_detail value of 1 for detail weighting table 1200 and a difference value of 255 may correlate to a W_detail value of 0 for detail weighting table 1200, as illustrated for illustrative and non-limiting purposes in FIG. 11. In some examples, detail weighting table 1200 may be used as weighting table 600 for performing the blending process.

In general terms, a detail weighting table is a type of pixel weighting table that defines a difference in detail between two or more frames as determined from respective detail maps or otherwise, a difference between filtered pixel values. Camera processor(s) 14 may utilize detail weighting tables in order to facilitate an appropriate level of pixel scaling with respect to high and low level detail in various regions of a frame (e.g., details found in a capture scene). That is, an output frame having regions of a capture scene including more blurriness (e.g., lower focus level) in lower detail areas may be acceptable because the human eye may not perceive such blurriness in lower detail areas of a frame. The human eye, however, may perceive blurriness as the level of detail increases. As such, the detail weighting table is configured to scale pixel values to decrease the amount of blurriness in higher detail areas.

In some examples, camera processor(s) 14 may determine a distance weighting table. In such examples, a distance weighting table may be used as weighting table 600 for performing the blending process. As described herein, however, a distance weighting table may be combined with detail weighting table 1200 to create a pixel weighting table that may be used as weighting table 600 for performing the blending process. A distance weighting table may be determined by first determining a transition area between regions of the composite frame. As described herein, the composite frame is a combination of a first frame and a second frame in accordance with various aspects of the techniques described in this disclosure. The distance weighting table may then be used in the blending of the frames together as part of the composite frame to ensure a smooth transition at the composite frame transition area. A distance weighting table is a type of pixel weighting table that defines distance values from a defined center point of a frame. That is, the distance weighting table assigns weight values based on how far a pixel location is from a predefined reference point or reference location of a frame.

Figure 13:
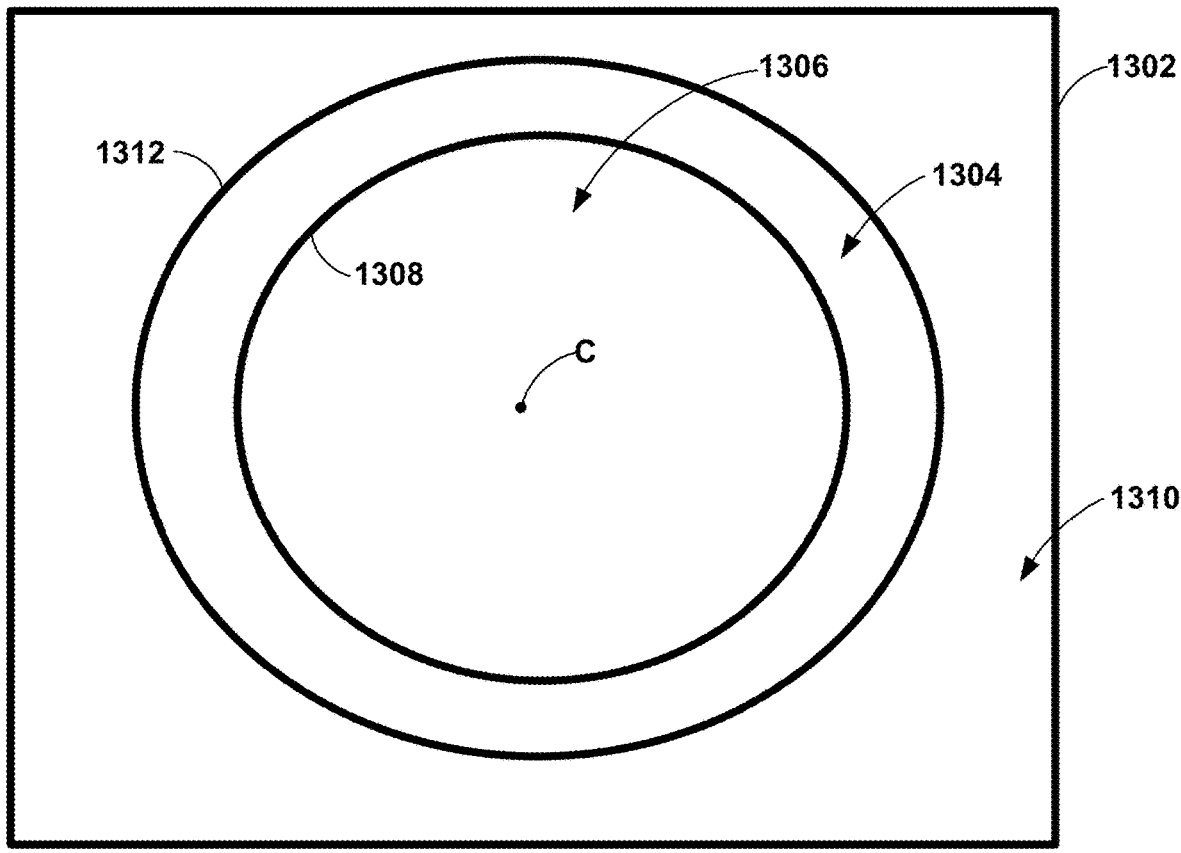
FIG. 13 illustrates an example transition area between two regions of a composite frame having a center region in focus and an outer region in focus in accordance with various aspects of the techniques described in this disclosure.

FIG. 13 illustrates an example transition area 1304 between two regions of a composite frame 1302 having a center region 1306 (e.g., a first region of composite frame 1302) in focus and an outer region 1310 (e.g., a second region of composite frame 1302) in focus in accordance with various aspects of the techniques described in this disclosure. Transition area 1304 may be bound by an inner boundary 1312 of outer region 1310 and an outer boundary 1308 of center region 1306. Camera processor(s) 14 may use a center region from a first frame to determine inner region 1306 and may use an outer region from a second frame to determine outer region 1310. Boundary and region determinations are discussed in further detail with reference to FIG. 18. Transition area 1304 may correspond to a similar or the same relative location in composite frame 102 or composite frame 1302 as that of the relative locations of first intermediate region 704 in first frame 80 or first frame 702 and/or second intermediate region 904 in second frame 90 or second frame 902.

With transition area 1304 of composite frame 1302 defined, camera processor(s) 14 may then determine values of a distance weighting table (e.g., W_dist values). In some examples, camera processor(s) 14 may determine, for each pixel of the transition area, a pixel distance value from a center of the composite frame to a location of a respective pixel location. Camera processor(s) 14 may also determine a diagonal length (L) of a composite frame 2002 (e.g., composite frame 102). Diagonal length (L) may be the length between center (C) of composite frame 2002 and the corner of composite frame 2002 (as shown). Composite frame 2002 is an example of composite frames 102 or 1302.

Figure 14:
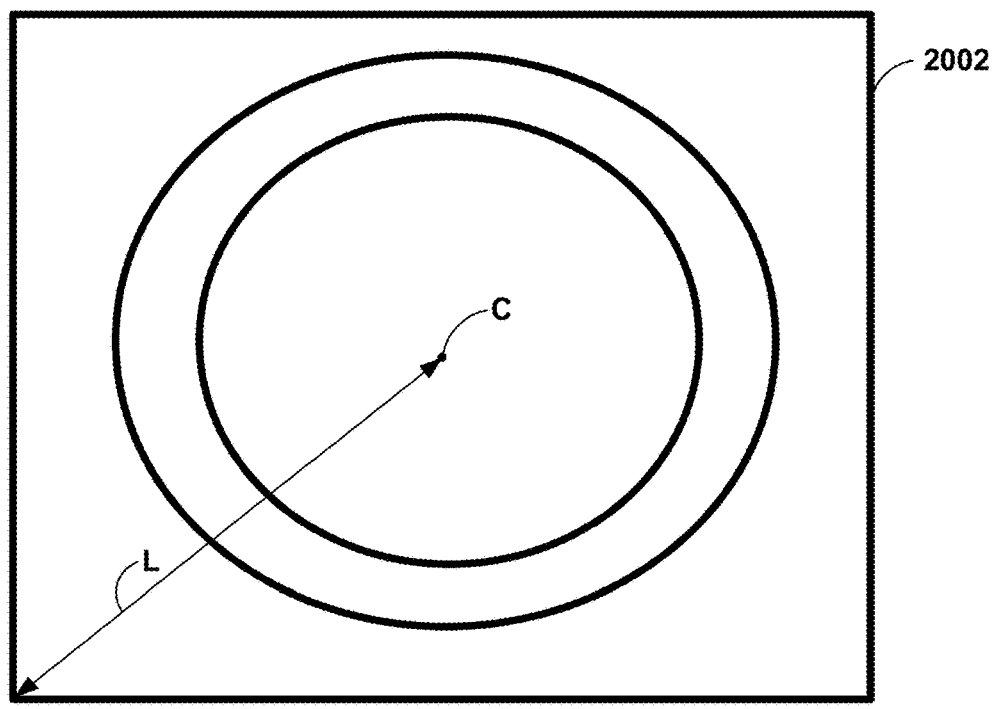
FIG. 14 is a graph illustrating example distance weighting value correlations in accordance with various aspects of the techniques described in this disclosure.
Figure 14:
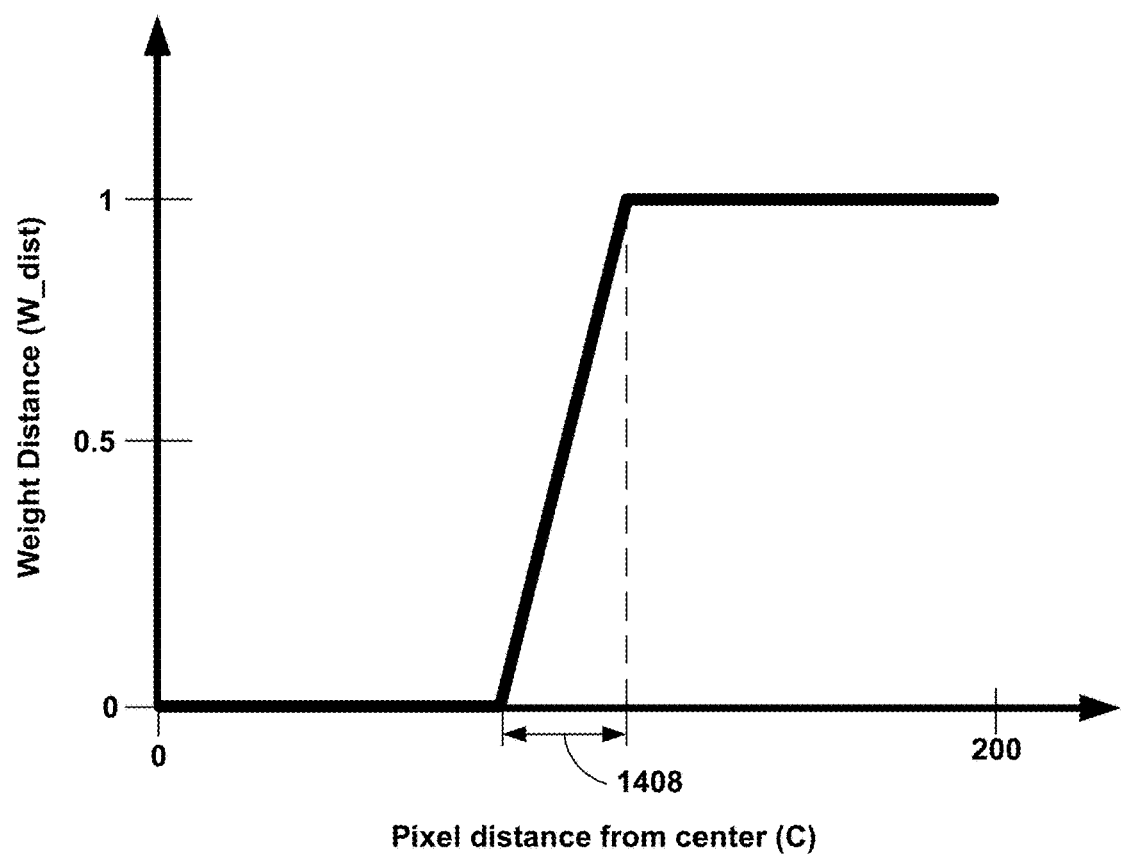
Figure 15:
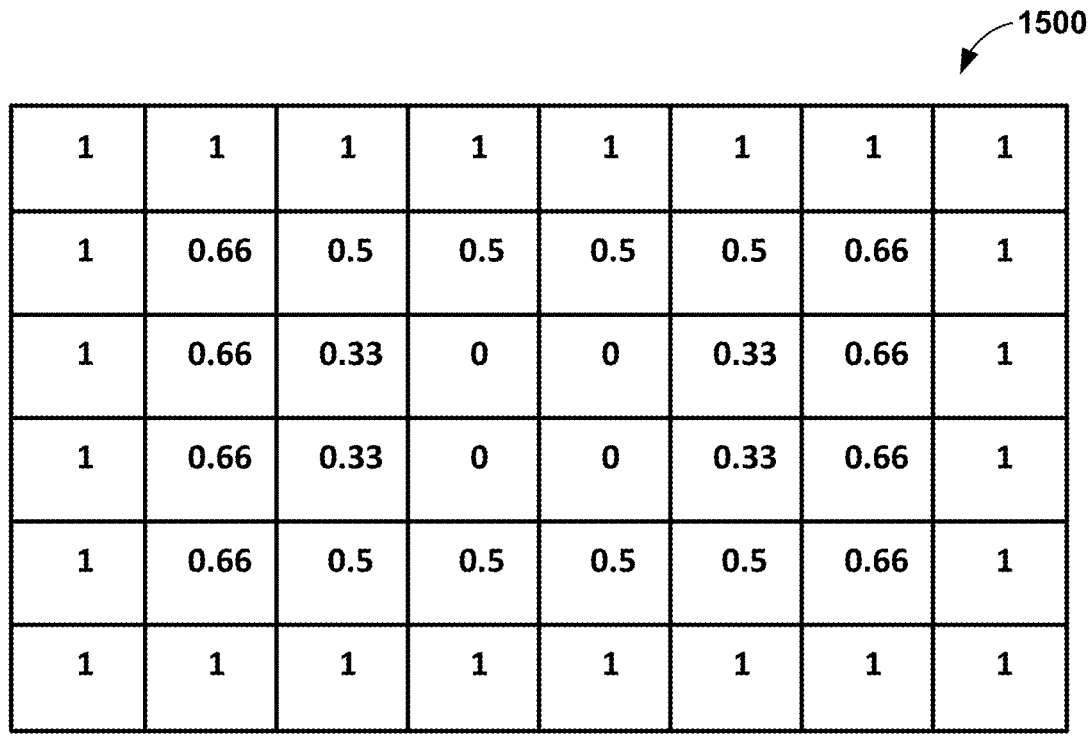
FIG. 15 is an example distance weighting table used to combine frames of image data in accordance with various aspects of the techniques described in this disclosure.

In addition, camera processor(s) 14 may determine the values of the distance weighting table based at least in part on the diagonal length and pixel distance values. For example, camera processor(s) 14 may determine pixel distance values from the center (C) of composite frame 2002 (e.g., pixel_distance). Camera processor(s) 14 may, for each pixel location, determine W_dist values by dividing pixel_distance by half of the diagonal length (L) to determine W_dist values for a distance weighting table. FIG. 14 is a graph illustrating example distance weighting value correlations in accordance with various aspects of the techniques described in this disclosure. In the graph of FIG. 14, the transition area of composite frame 2002 corresponds to the region shown by ramp region 1408. The weight value correlations may be linear, as illustrated in the example of FIG. 14, or in some instances, non-linear. FIG. 15 is an example distance weighting table 1500 used to combine frames of image data in accordance with various aspects of the techniques described in this disclosure. FIG. 15 shows values determined from the equation above involving diagonal length (L), as illustrated visually with the graph of FIG. 14.

As described herein, camera processor(s) 14 may, in some instances, combine distance weighting table 1500 and detail weighting table 1200 to determine values of the weighting table 600. For example, camera processor(s) 14 may combine the distance and detail weighting tables as follows:

weighting table 600=W_dist multiplied by ('*') (weight_of_weightTable)+W_detail*(1−weight_of_weightTable), performed by camera processor(s) 14 for each cell of the tables to determine weighting table 600. Camera processor(s) 14 may then use weighting table 600 may then be used to blend the transition area. For example, camera processor(s) 14 may blend outer boundary 86 of center region 92 of first frame 80 and inner boundary 96 of outer region 94 of second frame 90 based at least in part on the values of weighting table 600, where weighting table 600 is created by combining distance weighting table 1500 and detail weighting table 1200. As described herein, camera processor(s) 14 may combine both frames to generate the composite frame by scaling pixel values from each frame as follows: composite frame=first frame*(1−weighting table 600)+second frame*(weighting table 600). A pixel weighting table, such as a pixel weighting table formed from a combination of a detail weighting table and a distance weighting table, defines relative contribution values for how much weight a first pixel value from a first location of a first frame should have relative to a second pixel value from a second location of a second frame, where the second location corresponds to the first location.

In some examples, camera processor(s) 14 may predefine a value for weight_of_weightTable above. The value of weight_of_weightTable may be predefined by a user. For example, weight_of_weightTable may be defined such that the combination of weighting tables is based only on one pixel map (e.g., detail map only, distance map only). For example, camera processor(s) 14 may define weight_of_weightTable to have a value of either 0 and 1 (e.g., 100%), which in the particular example equation used by camera processor(s) 14 may result in the nullification of any one or more particular weighting tables. In other instances, camera processor(s) 14 may define weight_of_weightTable as having a value between 0 and 1 in order to combine weighting tables and effectively use multiple pixel maps to blend the frames. In addition, camera processor(s) 14 may adjust weight_of_weightTable as necessary. As such, weight_of_weightTable may serve as a first scaling value and 1−weight_of_weightTable may serve as a second scaling value. In such examples, camera processor(s) 14 may scale the values of the distance weighting table using a first scaling factor and camera processor(s) 14 may scale the values of the detail weighting table using a second scaling factor. In this way, camera processor(s) 14 may then combine the scaled values of distance weighting table 1500 and the scaled values of detail weighting table 1200 to determine values of weighting table 600, as illustrated in the example equation above.

In some examples, camera processor(s) 14 may determine the first scaling value and/or the second scaling value based at least in part on one or more characteristics of one or more lens(es) 13. In addition, camera processor(s) 14 may determine the first scaling value and/or the second scaling value based at least in part on one or more measurements performed during a calibration process. In such instances, camera processor(s) 14 may be configured to cause the one or more measurements to be performed with respect to different object distances.

In an illustrative example, camera processor(s) 14 may apply weighting tables 600, 1200, or 1500 to first frame 80 to scale a contribution of pixel values corresponding to first frame 80. For example, camera processor(s) 14 may reduce how much weight various pixel values of particular regions of first frame 80 will have when being combined with second frame 90. That is, the pixel value will have a reduced weight, such as a weight below 50% (e.g., less than 0.5). In addition, camera processor(s) 14 may apply weighting table 600, 1200, or 1500 to second frame 90 to scale a contribution of pixel values corresponding to second frame 90. For example, camera processor(s) 14 may reduce how much weight various pixel values of particular regions of second frame 90 will have when being combined with first frame 80. In this way, camera processor(s) 14 may combine corresponding pixels from each frame, such as from the intermediate regions of each of a first frame and a second frame. In one example, camera processor(s) 14 may combine pixels from each frame by determining a weighted average of pixel values, where the weighted amounts may correspond to the scaling values of weighting table 600.

In some examples, camera processor(s) 14 may apply weighting tables 600, 1200, or 1500 in order to blend outer boundary 86 of center region 82 of first frame 80 and inner boundary 96 of outer region 94 of second frame 90. In an example, camera processor(s) 14 may combine pixels from each frame by determining a weighted summation of pixel values, where the weighted amounts may correspond to the scaling values of weighting table 600. For example, camera processor(s) 14 may combine both frames to generate the composite frame by scaling pixel values from each frame as follows: composite frame=first frame*(1−weighting table 600)+second frame*(weighting table 600). In the example illustration of weighting table 600 of FIG. 6, the outer region of the first frame is multiplied by 0 (i.e., 1 minus 1) according to weighting table 600, whereas the center region of the first frame is multiplied by 1 (i.e., 1 minus 0). Similarly, the second frame is scaled, such that the outer region pixels of the second frame are multiplied by 1 and the center region pixels are multiplied by 0 according to the example weighting table 600 values of FIG. 6. In some examples, camera processor(s) 14 may apply weighting tables 1200 or 1500 separately or as combined weighting table 600 to combine frames of image data.

In some examples, camera processor(s) 14 may receive a third frame of the image data at the second focal length. In addition, camera processor(s) 14 may receive a fourth frame of the image data at a third focal length. Camera processor(s) 14 may combine the third frame with the fourth frame to generate a second composite frame in a similar manner to which camera processor(s) 14 combine first frame and second frame to generate the first composite frame. Camera processor(s) 14 may output the second composite frame to encoder/decoder 17. In such examples, a second region (e.g., an outer region) of the third frame is in focus at the second focal length, whereas a center region of the fourth frame is in focus at the third focal length. In some examples, the first focal length and the third focal length may be set at the same or effectively the same focal length. In some examples, camera processor(s) 14 combine the second frame with the fourth frame to generate a third composite frame. As such, camera processor(s) 14 may output the third composite frame to encoder/decoder 17.

Figure 16:
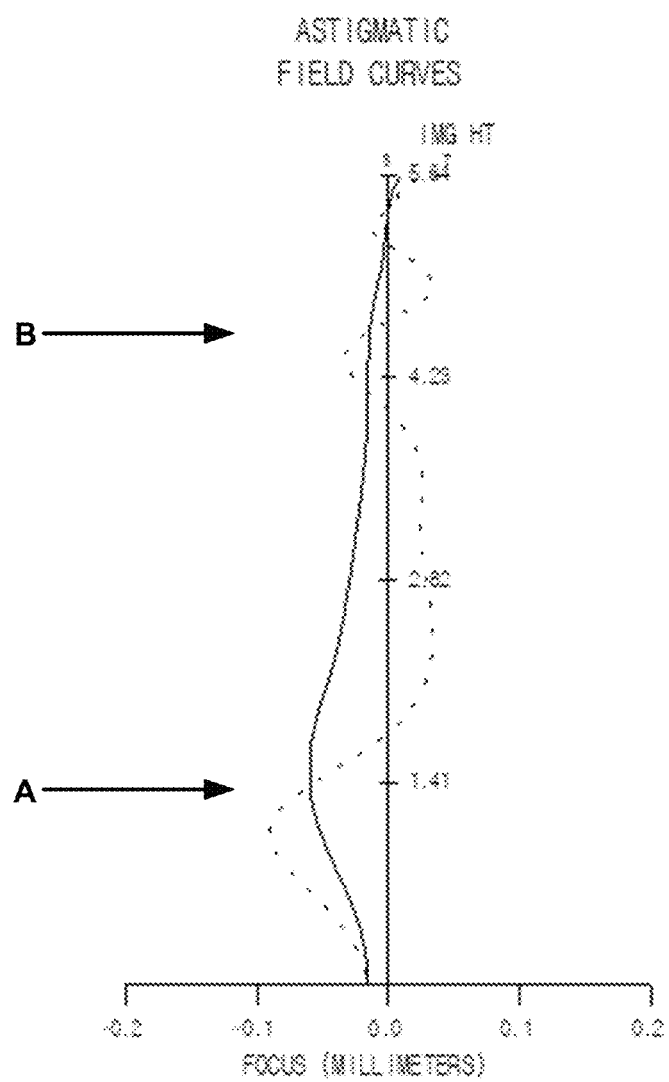
FIG. 16 is an example astigmatic field curve illustrating an example difference between focus levels for frames of image data in accordance with various aspects of the techniques described in this disclosure.

FIG. 16 is an example astigmatic field curve illustrating an example difference between focus levels for frames of image data in accordance with various aspects of the techniques described in this disclosure. For example, camera processor(s) 14 may perform an autofocus process to focus on point A (e.g., center region), which may cause a relatively large difference in defocus with respect to point B (e.g., corner or outer region). This is because the nature of optical astigmatic elements tends to, in some instances, result in the capture of frames of image data having non-uniform focus and defocus levels. In the illustrative example of FIG. 16, camera processor(s) 14 may perform defocusing algorithms that decrease the defocus level with respect to point B (e.g., increasing the focus level of point B) by causing a focal length of lens 13 to change or by causing an effective change in the focal length of lens 13.

Figure 17:
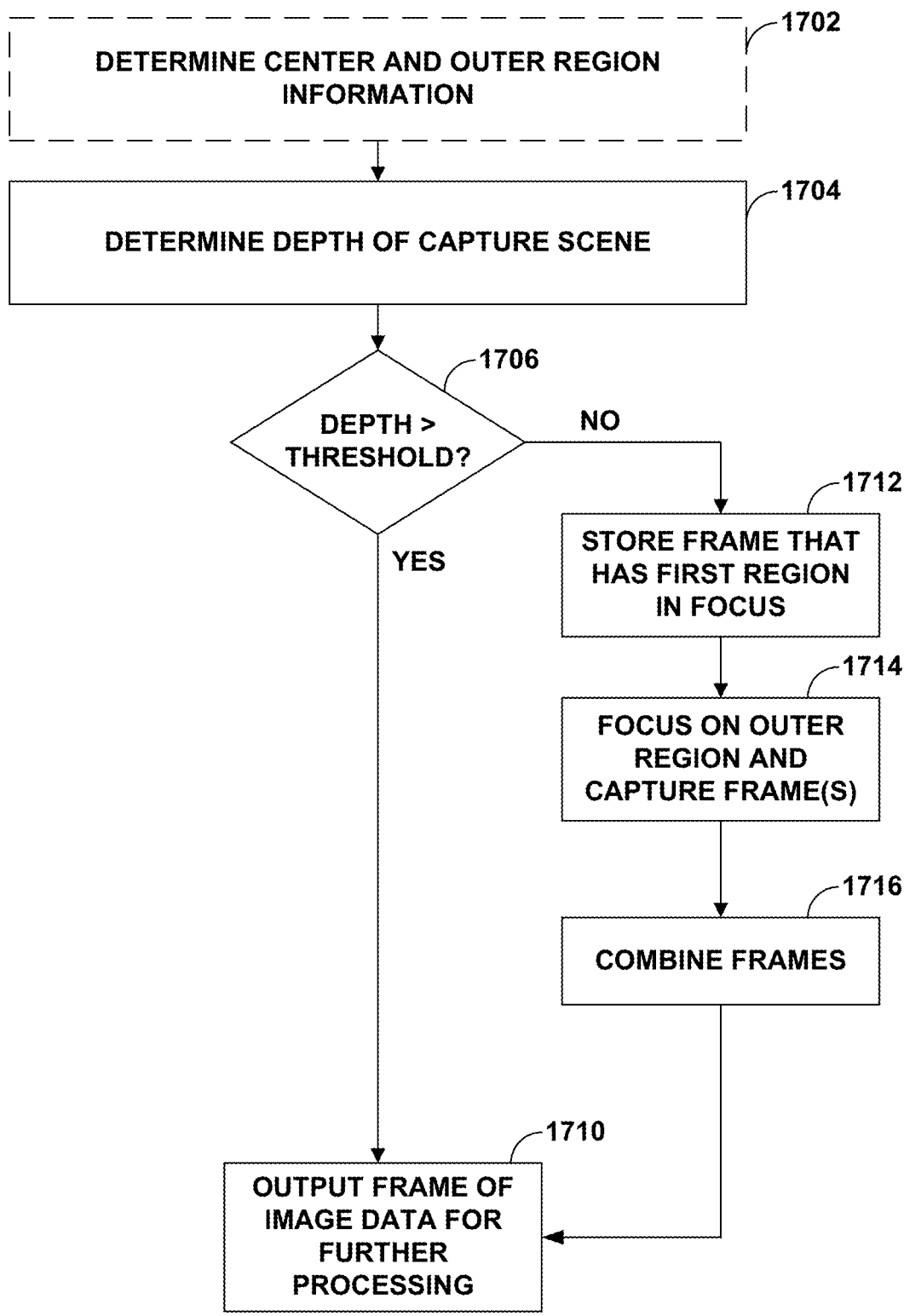
FIG. 17 is an example flow diagram illustrating example operations of the camera processor shown in FIG. 1 in accordance with various aspects of the techniques described in this disclosure.

FIG. 17 is an example flow diagram illustrating example operations of camera processor(s) 14 (camera processor(s) 2214 described with reference to FIG. 22), in accordance with various aspects of the techniques described in this disclosure. In some examples, camera processor(s) 14 may optionally determine first region and second region (e.g., center region and outer region) information for a first frame of image data (1702). That is, in some instances, camera processor(s) 14 may access predefined region information, such as from system memory 30 or local memory 20. In some instances, however, camera processor(s) 14 may determine such region information anew. For example, camera processor(s) 14 may determine such region information based on circumstances of an image capture (e.g., object distance, lens characteristics, etc.). In any case, camera processor(s) 14 may determine depth information before determining region information, or in lieu of determining region information. In other instances, camera processor(s) 14 may determine region information or depth information in parallel with each other or with other portions of the various techniques described with reference to FIG. 17 (e.g., at substantially the same time as storing of the first frame, etc.).

In some examples, camera processor(s) 14 may determine the depth (e.g., depth field) of a frame (1704). In one example, camera processor(s) 14 may determine the depth of a capture scene as part of a flat scene detection process to determine whether the frame capture includes a flat scene, a multi-depth scene (e.g., not flat), or a combination thereof. For example, camera processor(s) 14 may determine an image depth metric based at least in part on the image data corresponding to the first frame of the image data. Camera processor(s) 14 may compare the depth metric to a threshold (1706). In the case of camera processor(s) 14 determining a capture scene has both multi-depth and flat elements, camera processor(s) 14 may perform a hybrid of single focal length focusing and multi-focal length focusing (e.g., multi lens position focusing). That is, camera processor(s) 14 may generate a composite frame non-uniformly when some regions of a capture scene have multi-depth elements and when other regions of the capture scene having non-multi-depth elements (e.g., flat scene elements).

When the capture scene has a depth metric that exceeds the threshold, camera processor(s) 14 may output the first frame of the image data as an output frame for further processing (the YES branch from 1706). For example, camera processor(s) 14 may effectively perform single focal length focusing by outputting the first frame as the output frame. That is, camera processor(s) 14 may determine that the first frame, having the center region in focus, is adequate for output based on the multi-depth elements of the scene. When the depth metric is less than or equal to the threshold, however, camera processor(s) 14 may determine to create a composite frame by capturing a second frame at a different focal length. In such instances, camera processor(s) 14 may cause lens 13A or 13B to automatically adjust to the second focal length to subsequently capture second frame 90 at the second focal length.

In some examples, camera processor(s) 14 may store (e.g., to system memory 30 or local memory 20) the first frame having the center (or outer) region in focus (1712) (following the NO branch from 1706). In one example, camera processor(s) 14 may only store the region that is in focus to memory. Camera processor(s) 14 may also store the transition region to memory, where the transition region may or may not necessarily be included as part of the center region. In some examples, camera processor(s) 14 may store the entire first frame, such as to system memory 30 or local memory 20. In addition, camera processor(s) 14 may store region information for the first frame, such as an indication as to which region or regions of the first frame are in focus and which region or regions are not in focus. For example, camera processor(s) 14 may determine which regions have focus values or focus levels exceeding a predefined focus threshold or which regions have aggregated focus values or focus levels exceeding the predefined focus threshold. In one example, the predefined focus threshold may include a sharpness level threshold, in instances where the focus levels include sharpness levels. In any case, a focus threshold may be defined at the threshold of where portions of an image exhibit blurriness or changing sharpness levels.

In an illustrative example, camera processor(s) 14 may determine a gradient (e.g., a rate of change) of fluctuations or degradations in focus values within a frame that tend to result from one or more lens characteristics (e.g., flat lenses, thin lenses, lenses having particular geometries, astigmatic geometries, curvature centers, optical axes configurations, lens shape, or combinations of such lens characteristics, etc.). The particular lens characteristic may be such that the lens shape results in different focusing at the same focal depth or along the same focal plane. The one or more lens characteristics in some instances refers to a first shape of a first lens and a second shape of a second lens, where the lens shapes may, in some instances, differ from one another or otherwise, may be the same. In some examples, the gradient may coincide with an astigmatic field curve of a particular lens through which image data for the frame is being captured. Camera processor(s) 14 may determine that the gradient at a particular region of the frame, such as at virtual boundary 86 or virtual boundary 96, satisfies a predefined threshold indicative of a transition from a focus region of the frame to a defocused region of the frame. In some instances, camera processor(s) 14 may determine the gradient of focus values upon applying a filter, such as a high pass filter, to pixels of the frame and/or determining focus values therefrom. In such examples, camera processor(s) 14 may determine focus and defocus regions of the frame based on pixel values of a frame that have been filtered, so as to, for example, improve SNR in low light environments, and thereby allow camera processor(s) 14 to more accurately determine the various regions of the frame to support one or more of the various fusion techniques of this disclosure.

Camera processor(s) 14 may then focus on an outer region by adjusting to a second focal length (1714). Camera processor(s) 14 may then capture one or more frames (e.g., a second frame) at the second focal length and combine the frames (e.g., the first frame and the second frame) in accordance with various techniques described in this disclosure (1716). For example, camera processor(s) 14 may combine a first frame captured at the first focal length and a second frame captured at the second focal length to generate a composite frame, such as a composite frame having both an inner and outer region of the composite frame in focus, where the first frame and/or the second frame may only have one region in focus or one region out of focus as a result of a particular lens shape for a lens used in capturing one or both frames. Camera processor(s) 14 may then output the composite frame for further processing (e.g., video encoding, blending, etc.) (1710). For example, camera processor(s) 14 may output the composite frame to a video encoder.

As described herein, when camera processor(s) 14 determine to perform single focal length focusing, such as by using the first frame as the output frame without combining with a second frame, camera processor(s) 14 may output the first frame as the output frame of image data for further processing. In addition, camera processor(s) 14 may output a hybrid of frames where some regions of the capture scene are flat, but where other regions have depth (e.g., multi-depth elements). That is, camera processor(s) 14 may not perform the multi-focal length focusing (e.g., combining certain regions of two or more frames) for multi-depth regions of the capture scene, but may perform multi-focal length focusing for other regions of the capture scene, such as flat or non-multi-depth regions of the capture scene. In any case, the output frame may not be a uniformly generated composite frame, necessarily, and camera processor(s) 14 may instead generate the composite frame non-uniformly (e.g., in a hybrid fashion) based on some regions of a capture scene having multi-depth elements and other regions of the capture scene having non-multi-depth elements (e.g., flat scene elements).

Figure 18:
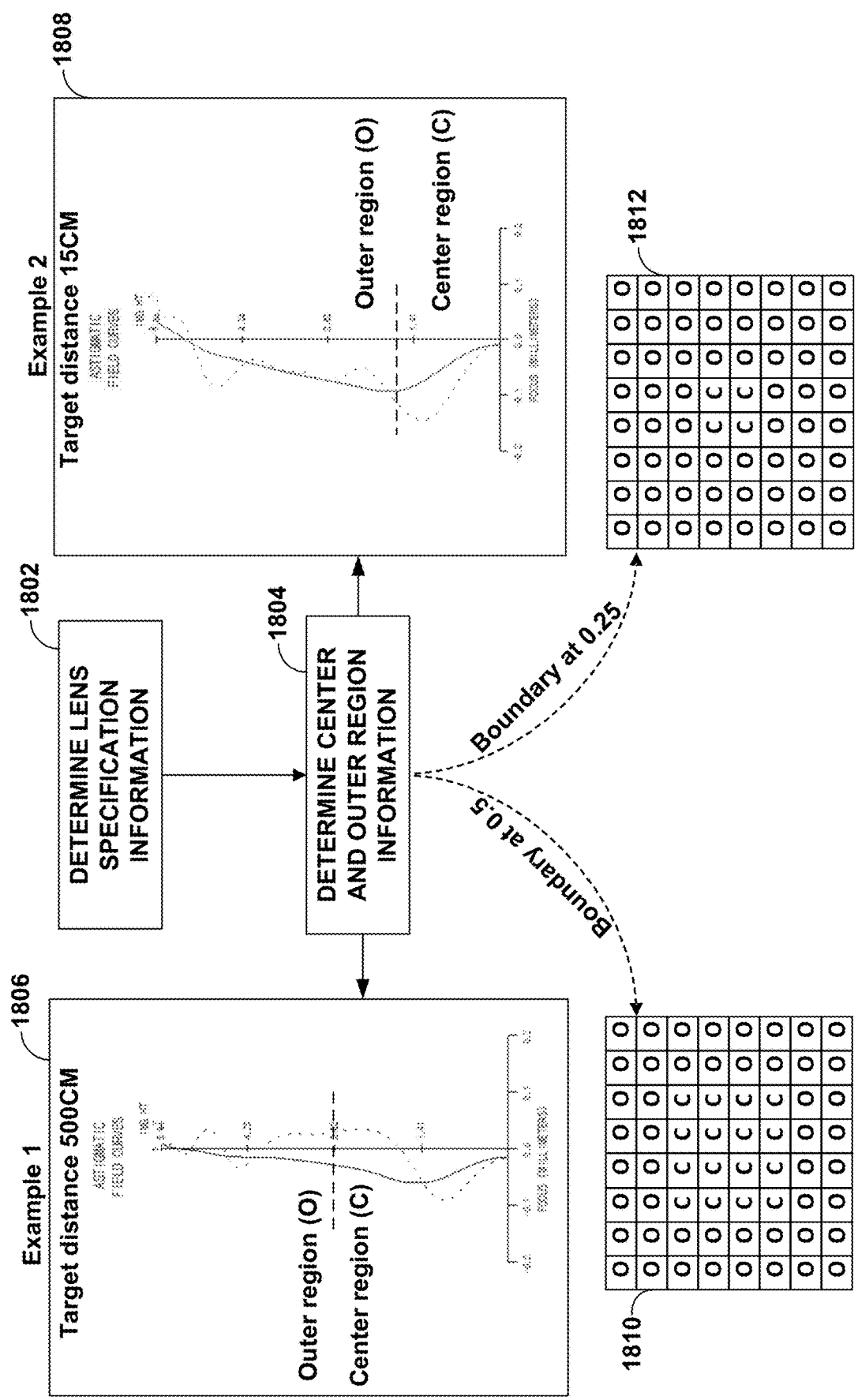
FIG. 18 is an example flow diagram illustrating region boundary determinations in accordance with various aspects of the techniques described in this disclosure.

FIG. 18 is an example flow diagram illustrating region boundary determinations in accordance with various aspects of the techniques described in this disclosure. In some examples, camera processor(s) 14 may optionally determine specifications or characteristics of one or more lenses 13 or image sensors 12 used to capture the image data (1802). In one example, camera processor(s) may access such information from memory. In some examples, camera processor(s) 14 may determine, based at least in part on the specifications or characteristics, frame region information comprising center region boundary information (e.g., first region boundary information) and outer region boundary information (e.g., second region boundary information) (1804). For example, camera processor(s) 14 may use target distance information to at least in part determine center and outer region information as illustrated by Example 1 (1806) and Example 2 (1808). In another example, center region and outer region information may be predefined (e.g., not dynamic) and stored in memory for subsequent access by camera processor(s) 14. In one example, camera processor(s) 14 may determine first region boundary information and second region boundary information for a first frame (e.g., frame 80, frame 702). In addition, camera processor(s) 14 may determine first region boundary information and second region boundary information for a subsequent second frame (e.g., frame 90, frame 902).

As shown, the circumstances of the capture may allow camera processor(s) 14 to determine center and outer regions of the frame (e.g., first and second regions of the frame). For example, Example 1 yields frame 1810 having a boundary at 0.5 (e.g., larger center region), whereas Example 2 yields frame 1812 having a boundary at 0.25 (e.g., smaller center region). Camera processor(s) 14 may determine first focus values for the image data corresponding to the center region boundary information. In addition, camera processor(s) 14 may determine first focus values for the image data corresponding to the outer region boundary information. In some examples, camera processor(s) 14 may use such information to determine focus levels and defocus levels of a captured frame, such that the captured frames may be capable of being combined to generate a composite frame in accordance with various aspects of the techniques described in this disclosure.

Figure 19:
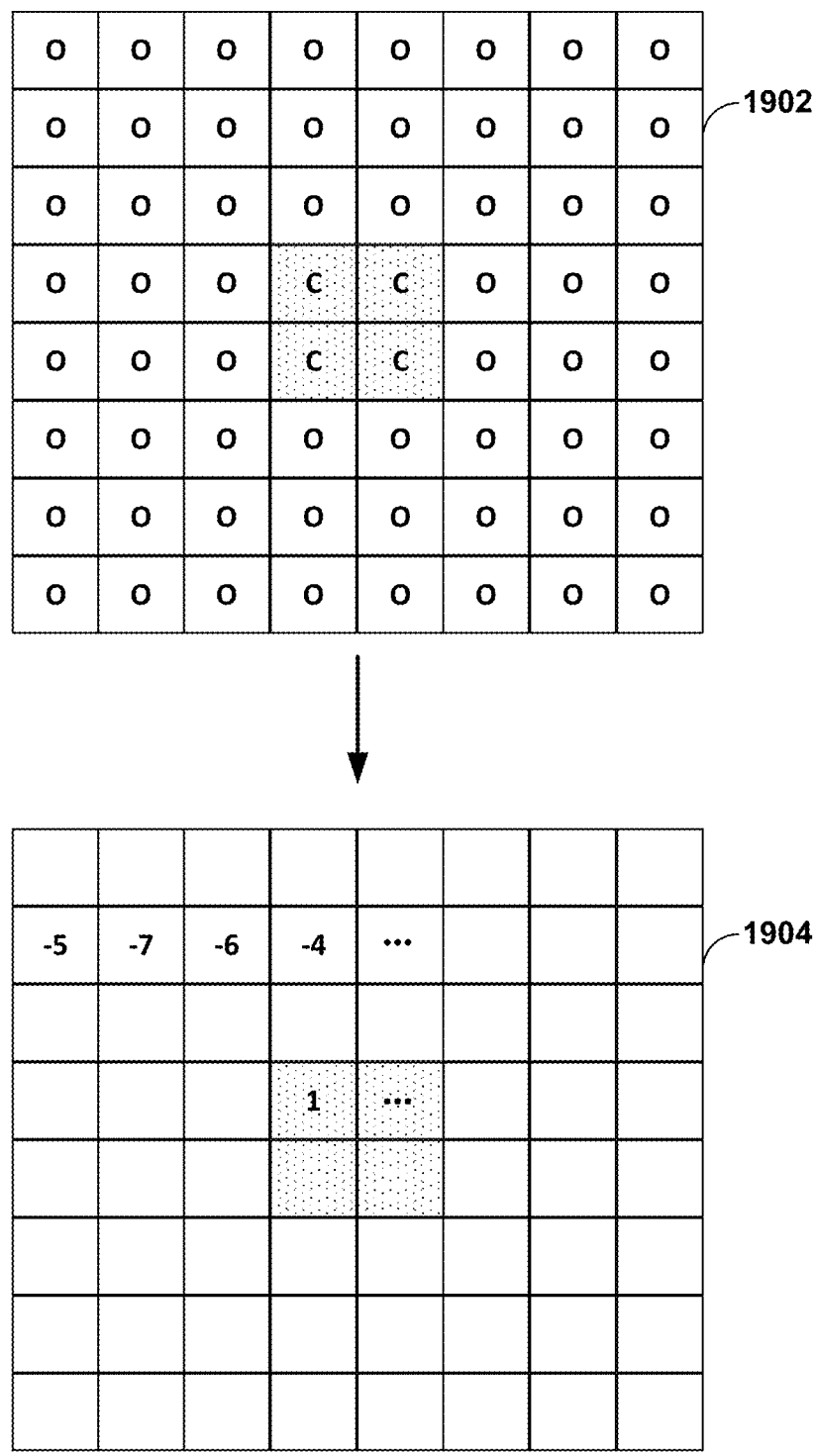
FIG. 19 is an example illustration of depth metrics for a scene in accordance with various aspects of the techniques described in this disclosure.

As described herein, prior to adjusting to a second focal length, camera processor(s) 14 may determine a depth of a scene. FIG. 19 is an example illustration of depth metrics for a scene in accordance with various aspects of the techniques described in this disclosure. In the examples described with reference to FIG. 19, camera processor(s) 14 determine the depth metrics for the center region and outer region of frame 1902 do not exceed as a threshold (contrast with the examples described with reference to FIG. 20). The depth metrics are shown, for example, as grid 1904 of example focus levels corresponding to various regions of frame 1902. Camera processor(s) 14 may reach such determinations by determining a difference value between center region focus values and outer region focus values. In one example, camera processor(s) 14 may determine an outer region focus value of −5 and a center region focus value of 1, as shown in FIG. 19. Camera processor(s) 14 may determine a difference of 6, which in the illustrated example, does not exceed the threshold for a multi-depth scene.

In general, camera processor(s) 14 may perform a calibration techniques for each image sensor 12 and lens 13 combination by collecting focus values at different distances while targeting flat scenes (e.g., not multi-depth scenes). From the collected data, camera processor(s) 14 may use numerical methods (e.g., arithmetic mean, weighed average, etc.) to define the threshold between a non-multi-depth scene (e.g., a flat scene) and a multi-depth scene. In run-time, focus values from center and outer regions are calculated live, but only when the difference is smaller than the threshold may camera processor(s) 14 deem the capture scene as being available for frame combination techniques discussed in this disclosure.

Figure 20:
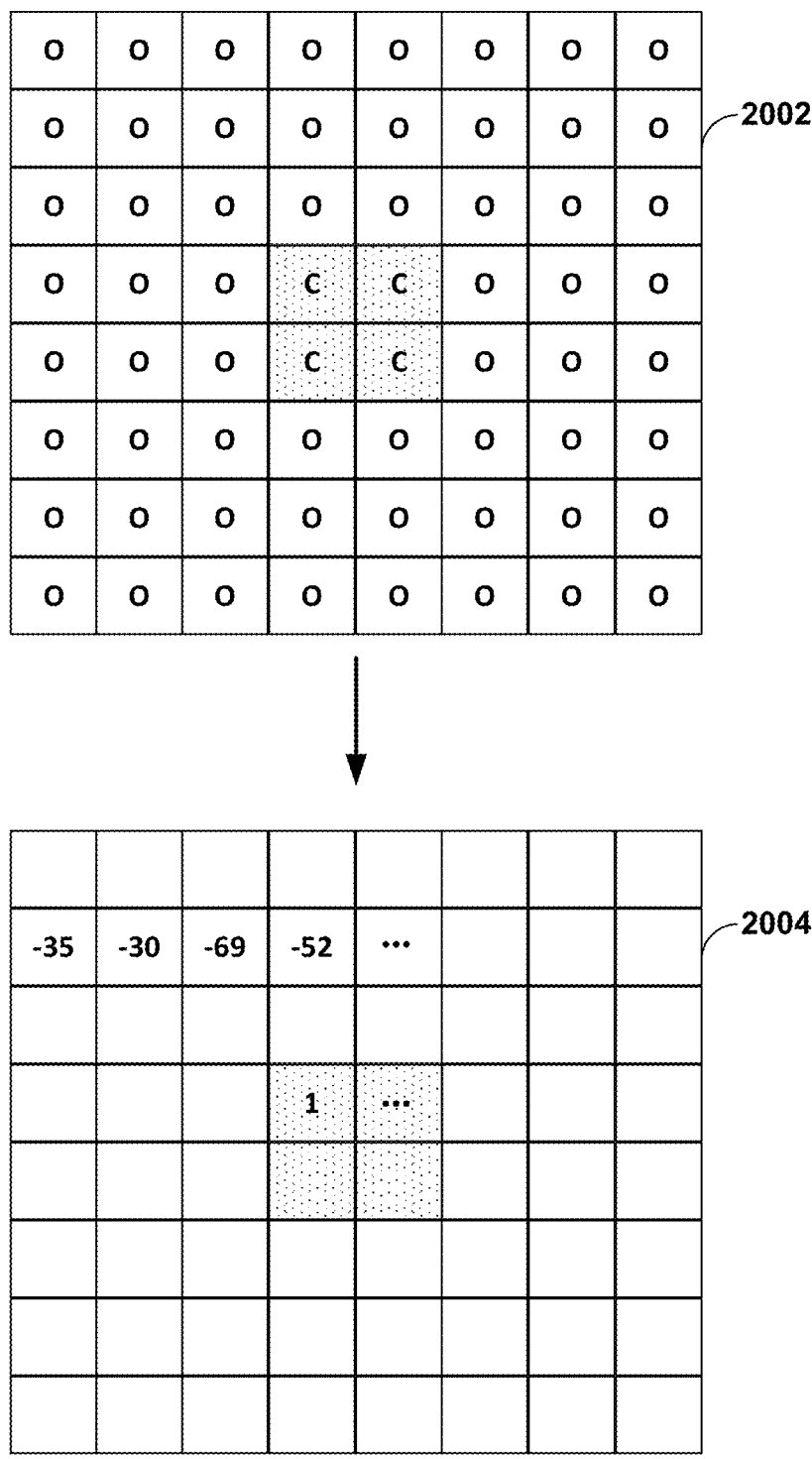
FIG. 20 is an example illustration of depth metrics for a scene in accordance with various aspects of the techniques described in this disclosure.

FIG. 20 is an example illustration of depth metrics for a scene in accordance with various aspects of the techniques described in this disclosure. In the examples described with reference to FIG. 20, camera processor(s) 14 would determine the depth metrics for the center region and outer region of frame 2002 exceeds a threshold (contrast with the examples described with reference to FIG. 19). The depth metrics are shown, for example, as grid 2004 of example focus levels corresponding to various regions of frame 2002. To illustrate, camera processor(s) 14 may determine the difference value in the examples described with reference to FIG. 20 as a 36 difference value when comparing the −35 grid block (e.g., outer region focus value) to the 1 grid block (center region focus value). In any case, camera processor(s) 14 may use a sharpness map to determine such focus values. For example, camera processor(s) 14 may sum sharpness values in order to determine focus values (e.g., focus levels).

Figure 21:
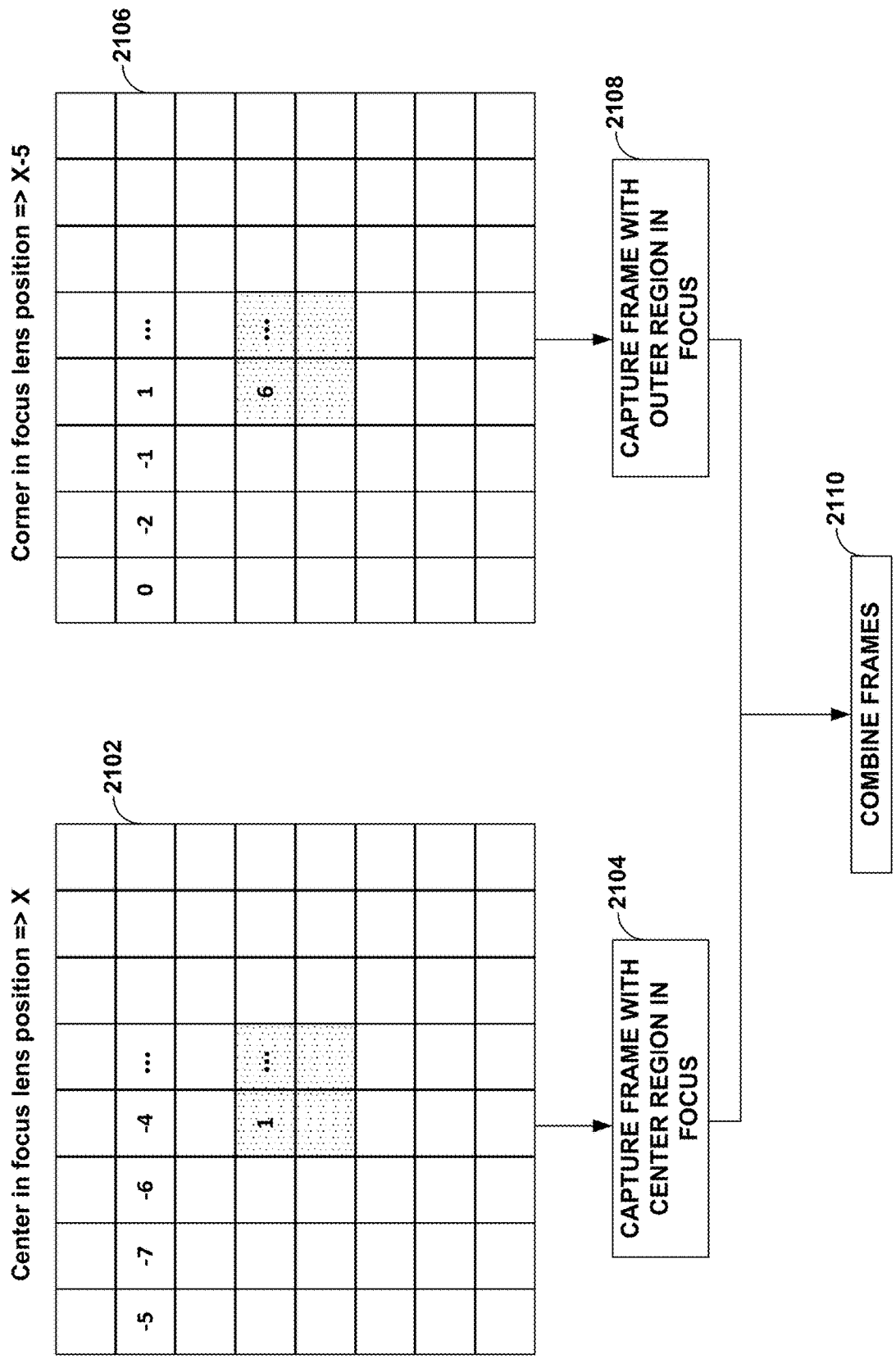
FIG. 21 is an example illustration of combining focus regions of frames in accordance with various aspects of the techniques described in this disclosure.

FIG. 21 is an example illustration of combining focus regions of frames in accordance with various aspects of the techniques described in this disclosure. As shown in FIG. 21, camera processor(s) 14 may capture frame 2102 at lens position X (e.g., first focal length) (2104). The first frame has either the center region in focus or the outer region in focus, and the second frame has the complementary opposite. In the illustrated example, frame 2102 has the center region 2104 in focus. Once camera processor(s) 14 determine the depth of the capture scene indicates the scene is eligible for frame combination techniques, camera processor(s) 14 may capture frame 2106 at the second focal length, which in this case equals X minus a position value (e.g., 5) (2108). Camera processor(s) 14 may determine the position value X, such that capture of the second frame at the second focal length produces the complementary region in focus (e.g., the outer region in focus). In an illustrative example, the values of the complementary region having a focus level of −7 in frame 2102 and the values of the complementary region having a focus level of −2 have a difference value equal to the change in position value, which had a value of 5 in this example. Likewise the center regions have a similar difference value (e.g., 6 minus 1). Camera processor(s) 14 may then combine frames 2102 and 2106 to generate a composite frame. In accordance with one or more of the various techniques of the disclosure, camera processor(s) 14 may perform a blending process of the composite frame using one or more weighting tables (e.g., distance weighting tables, detail weighting tables, combined weighting tables, etc.).

Figure 22:
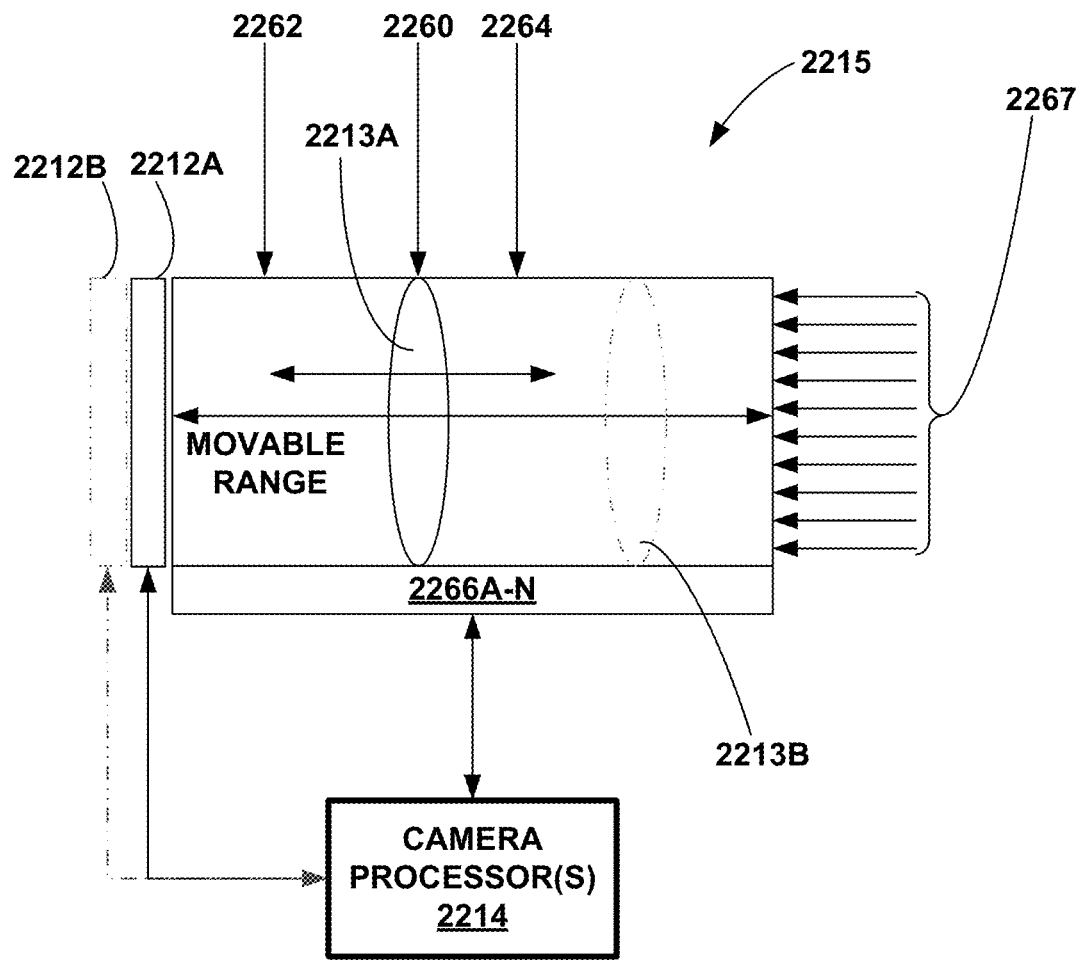
FIG. 22 is a block diagram of an example device that includes at least one actuatable lens configured to be utilized with respect to one or more of the example techniques described in this disclosure.

FIG. 22 is a block diagram of an example camera 2215 that includes one or more actuatable lenses 2213A-B (e.g., a set of lenses or a lens set) and one or more image sensors 2212A-2212B (e.g., an image sensor set). Camera 2215 may utilize at least one of actuatable lenses 2213 in order to perform one or more of the example techniques described in this disclosure (e.g., the lens set may include a first lens 2213A or in some examples, may include a plurality of actuatable lenses 2213A-B). In some instances, the placement of one or more of lenses 2213 may be fixed, such as for a non-actuatable lens. For example, lens 2213B may, in some examples, be a non-actuatable lens. For example, camera 2215 and lens 2213A may be configured to capture frames at different focal lengths and combine the frames to generate a composite frame. Camera 2215 is an example of camera 15 of FIG. 1, lenses 2213 are examples of lenses 13 of FIG. 1, image sensors 2212 are examples of image sensors 12 of FIG. 1, and camera processor(s) 2214 are examples of camera processor(s) 14 of FIG. 1. That is, computing device 10 of FIG. 1 may include one or more components of camera 2215, in certain example camera systems.

Camera 2215 may further include one or more actuators 2266A-N. One example way in which actuators 2266A-N moves one of lenses 2213 is via a voice-coil motor (VCM). For instance, actuator 2266A may include a spring attached to lens 2213A, such as in VCM devices that include spring return functionality. It should be understood that actuators 2266A-N are illustrated to assist with understanding, and need not be sized or positioned in the manner illustrated in FIG. 22.

In some instances, camera processor(s) 2214 may include a sensor chip. In another example, camera 2215 may include a sensor chip (not shown) that is separate from camera processor(s) 2214. In such examples, the sensor chip may interface between camera processor(s) 2214 and another component of camera 2215, such as between camera processor(s) 2214 and lens actuators 2266A-N. In an example, camera processor(s) 2214 may generate and send a signal to the separate sensor chip, in which the signal may cause the sensor chip to cause one or more of actuators 2266A-N to actuate one of lenses 2213 to a second position. For example, lens 2213A may have a first position 2260, such as a default or position from which to actuate, or a position that is the result of a previous actuation process. In any case, camera processor(s) 2214 may cause actuators 2266A-N to actuate lens 2213A or lens 2213B. In addition, camera 2215 may include additional light diversion mechanisms, such as prisms that direct light through one of lenses 2213 to a particular image sensor 2212. For example, camera processor(s) 2214 may cause actuation of a moving prism that directs light through one of lenses 2213 from a first image sensor 2212A to a second image sensor 2212B. While image sensors 2212A and 2212B are shown as having a particular positional relationship to one another for illustration purposes, the techniques of this disclosure are not so limited, and it should be understood that image sensors 2212A and 2212B may be in different configurations, such as by being arranged on a single plane that is perpendicular to incident or incoming light, as in a side-by-side configuration.

In some examples, camera processor(s) 2214 may cause actuators 2266 to actuate lens 2213A or lens 2213B to a second position 2262 that is nearer image sensor(s) 2212 or to another position 2264 that is away from image sensor(s) 2212. For example, actuators 2266 may actuate lens 2213A or lens 2213B toward the scene to be captured (e.g., toward a macro position away from image sensors 2212). Actuators 2266 may perform such actuations within the movable range defined for the particular lens 2213 or for the particular actuator 2266. In some examples, camera 2215 may include an autofocus and defocusing component that direct how camera processor(s) 2214 are to command actuators 2266.

In FIG. 22, the scene to be captured is conceptually shown as being to the right of camera 2215. That is, camera 2215 receives incoming image data 2267, such as in the form of electromagnetic waves), as shown by camera 2215 intercepting those arrows originating from the right of FIG. 22. Image data 2267 may pass through one or more of lenses 2213 and may be directed to one or more of image sensors 2212B. In some examples, image sensor 2212B may capture image data 2267 with respect to lens 2213A at a first position. In addition, image sensor 2212A may capture image data 2267 with respect to lens 2213A or 2213B at a second position. In examples involving second lens 2213B, the second position for second lens 2213B may be the same as the first position of first lens 2213A. In any case, frames of image data 2267 may be captured at various combinations of lens positions and image sensors 2212 as governed by commands generated by camera processor(s) 2214. It will be understood that the various techniques described in this disclosure may be implemented using the components of FIG. 22 and may be implemented using a combination of the components described with reference to FIGS. 1 and 22. For brevity, the techniques of this disclosure may be described with reference to components of FIG. 1, but it will be understood that the techniques of this disclosure may, in some examples, be implemented in the context of the various examples described with reference to FIG. 22.

In some examples, camera 2215 (e.g., camera 15 comprising one or more components of camera 2215) may advantageously perform the various frame composition techniques of this disclosure, as described herein. In one illustrative example, camera processor(s) 2214 (e.g., camera processor(s) 14 of FIG. 1) may receive a first frame captured at a first focal length, where one region (e.g., an outer region) is in-focus and another region of the first frame is out-of-focus (e.g., as may be indicated by various focus values or other focus metrics). Camera processor(s) 2214 may receive a second frame captured at a second focal length, where similar to the first frame, one region (e.g., a central or inner region) is out-of-focus and another region of the second frame is in-focus. In such instances, camera processor(s) 2214 may combine the first frame with the second frame to generate a composite frame. In some examples, between image sensor(s) 2212 (e.g., image sensor(s) 12 of FIG. 1) capturing the first frame and second frame, camera processor(s) 2214 may actuate one or more of lens(es) 2213 (e.g., lens(es) 13 of FIG. 1) and/or may control various light-diversion mechanisms (e.g., prisms) in order to receive the first and second frames at various focal lengths or effectively different focal lengths (e.g., different focal points, lens positions, etc.). In some examples, camera processor(s) 2214 may output the composite frame to a video encoder (e.g., encoder/decoder 17 of FIG. 1. The video encoder may, in some examples, compress the composite frame with other frames (e.g., additional composite frames) in order to generate a video file, where the video file represents frames of video data at particular focus values that result from camera processor(s) 2214 combining various frames to generate composite frames.

Generally speaking, a first region of a frame may have a higher focus level relative to a second region of the same frame, such that camera processor(s) 2214 (e.g., camera processor(s) 14 of FIG. 1) may identify the first region as being more in-focus relative to the second region, which camera processor(s) 2214 (e.g., camera processor(s) 14 of FIG. 1) may identify the second region as being out-of-focus or at least less in-focus relative to the first region. In addition, an outer region of a frame may generally refer to the region of the frame that includes an outer edge of the frame and an inner border that corresponds to an outside border of an inner region of the frame. That is, the outer region comprises the outer pixels of the frame relative to inner pixels that comprise the inner region (e.g., central or center area) of the frame. In some examples, an inner region (e.g., a first region) comprises 60-80% of the inner pixels output from any one of image sensor(s) 12 (e.g., image sensors 2212). In another example, the inner region comprises 40-70% of the inner pixels output from any one of image sensor(s) 12. In another example, the inner area comprises 30-90% of the inner pixels output from any one of image sensor(s) 12. In another example, the inner region comprises 10-90% of the inner pixels output from any one of image sensor(s) 12. In any case, an outer region (e.g., a second region) of the frame may comprise a counterpart percentage of the output pixels that, with the inner region percentage equals 100% of the output pixels. In some examples, the outer region may comprise a percentage that is less than the counterpart percentage. The inner region may comprise more or less than any of the above ranges, so long as the outer region comprises, as an example, 1% or more of pixels output received from image sensor(s) 12.

In some instances, image sensor(s) 12 may output all pixels of image sensor(s) 12 full potential FOV (e.g., 100% of the FOV). In some instances, however, camera processor(s) 14 may cause image sensor(s) 12 to output a reduced number of pixels relative to image sensor(s) 12 full potential FOV (e.g., center 33%, center 25%, etc.). In other words, the term "output pixels" as used herein generally refers to the actual number of pixels output from image sensor(s) 12 to camera processor(s) 14 (e.g., 100%, center 25%, etc.). In any case, as described herein, camera processor(s) 14 may determine the outer and inner regions (e.g., percentages, boundaries, transition areas or regions, etc.) anew for each frame, each combination of frames, each scene, each camera session, etc., based on a number of different factors.

In an illustrative and non-limiting example, camera processor(s) 14 may determine outer and inner region boundary information for a set of frame(s) based on an analysis and/or comparison of, for example, focus values, filtered pixels values, detail maps, distance maps, weighting tables, etc., or any other mechanisms described herein as allowing camera processor(s) 14 to discern and/or determine regions within one or more frames. In some examples, camera processor(s) 14 may deploy one or more AI engine(s) and/or ML model(s) to determine regions of one or more frames, where the one or more AI engine(s) and/or ML model(s) may be trained, such as by camera processor(s) 14 or by another system, on region training sets, such as data sets that enforce, within the AI and/or ML training system, region demarcation guidance for generating composite frames in accordance with one or more of the various techniques of this disclosure. The data sets may be libraries of frames that include, for example, information regarding details about a scene (depth, lighting, etc.), focus values of frames prior to a fusion event, focus values of composite frames, region boundary information (e.g., inner region comprises 25% of central pixels proximate a center of the frame, inner region comprises 25% of center pixels, etc.), etc., such that camera processor(s) 14 or by another system may train the one or more AI engine(s) and/or ML model(s) to determine region information for subsequent frames in a manner in which a composite frame, composed of one or more regions from a first frame and one or more regions from a second frame, has an optimal focus value for all pixels of the frame.

It should be noted that while focus values are used as an example, the techniques of this disclosure are not so limited, and another metric for optimization purposes may include detail values (e.g., high pass filter values) of the composite frame at the blend point (e.g., fusion boundary for the regions) as compared to detail values proximate the blend point. In addition, where another device performs the training of the one or more AI engine(s) and/or ML model(s) of this disclosure, it will be understood that those AI engine(s) and/or ML model(s) may be sent to computing device 10 for execution (e.g., by camera processor(s) 14, CPU 16, etc.). Alternatively, or in addition, computing device 10 may receive, via communication circuitry (not shown), training sets (e.g., training libraries) from another device, such that camera processor(s) 14 and/or CPU 16 may train and/or deploy the AI engine(s) and/or ML model(s) to perform various techniques of this disclosure, with or without the assistance of a separate computing device, such as an AI or ML device in communication with computing device 10 via a network.

Figure 23:
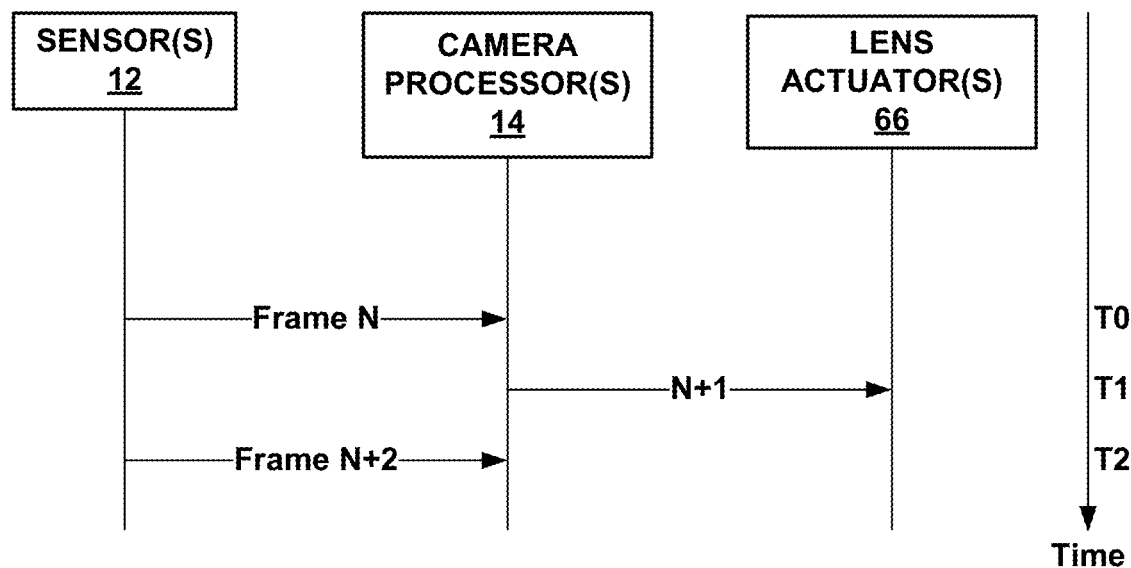
FIG. 23 is a timing diagram that illustrates frame capture techniques in accordance with various aspects of the techniques described in this disclosure.

FIG. 23 is a timing diagram that illustrates frame capture techniques in accordance with various aspects of the techniques described in this disclosure. In some examples, at time T0, sensor(s) 12 may capture Frame N and transfer Frame N to camera processor(s) 14. For example, sensor(s) 12 may transfer pixel values corresponding to Frame N to camera processor(s) 14. In some instances, sensor(s) 12 may transfer, to camera processor(s) 14, a number of pixels that correspond to the total number of pixels available from a respective image sensor 12 (e.g., 12 million pixels from a 12 MP (megapixel) image sensor 12). In some instances, however, sensor(s) 12 may transfer a reduced number of pixels relative to the total number of available pixels from the respective image sensor 12. For example, image sensor 12 may combine multiple pixels together into a reduced number of pixels (e.g., pixel binning) and/or may otherwise transfer, to camera processor(s) 14, only a portion of the total number of available pixels.

At time T1, as shown in FIG. 23, camera processor(s) 14 may send a command to lens actuator(s) 66 that causes one or more lens actuator(s) 66 to move one or more lenses 13. As such, during Frame N+1, a particular lens may move from a first position to a second position. For example, in the context of FIG. 22, lens 2213A and/or lens 2213B may move to position 2264 or other positions, such as position 2262 for lens 2213A and position 2264 for lens 2213B. At time T2, sensor(s) 12 may capture a second frame (e.g., Frame N+2) that corresponds to an adjusted lens position. Camera processor(s) 14 may combine the Frame N and Frame N+2 to generate a composite frame in accordance with one or more of the techniques described in this disclosure. In one example, camera processor(s) 14 may receive Frame N (e.g., a first frame), where Frame N is captured at a first focal length (e.g., an effective focal length) as a result of a position of a respective one of lens(es) 2213, where a region of Frame N is in-focus. Similarly, camera processor(s) 14 may receive Frame N+2 at a second focal length with a region of Frame N+2 being in-focus, where the regions may be opposite or alternating for each frame between lens-position adjustments.

Figure 24:
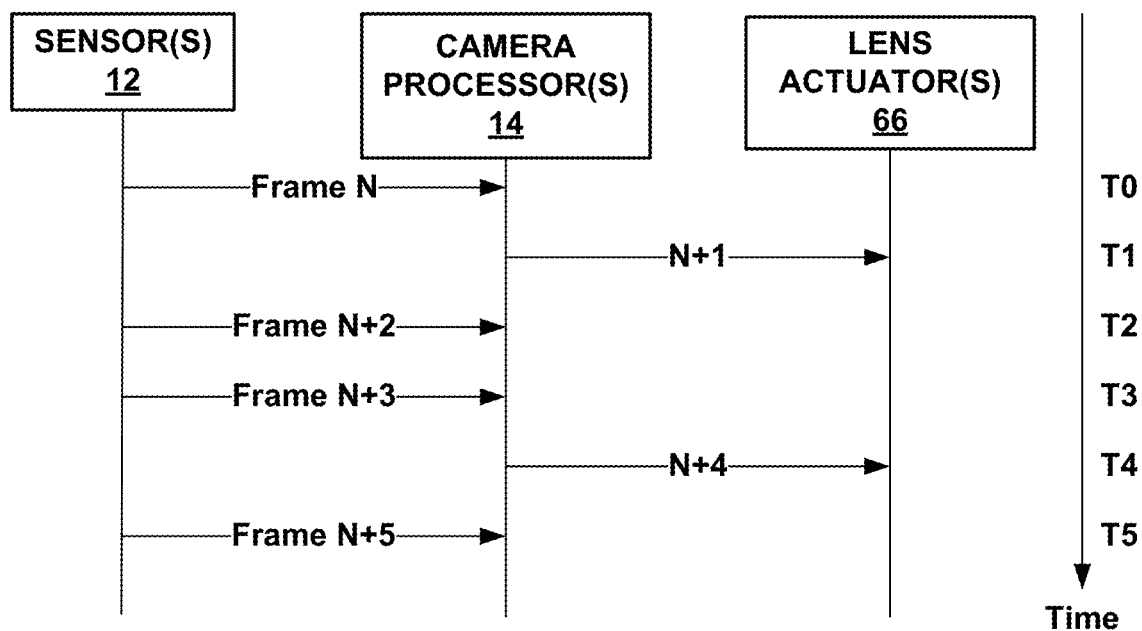
FIG. 24 is a timing diagram that illustrates various frame capture techniques in accordance with various aspects of the techniques described in this disclosure.

FIG. 24 is a timing diagram that illustrates various frame capture techniques in accordance with various aspects of the techniques described in this disclosure. At time T0, sensor(s) 12 capture Frame N and transfer Frame N to camera processor(s) 14 (e.g., camera processor(s) 2214). At time T1, camera processor(s) 14 may cause lens actuator(s) 66 to actuate one or more lenses 13. At time T2, sensor(s) 12 may capture Frame N+2. At time T3, sensor(s) 12 may capture Frame N+3. At time T4, camera processor(s) 14 may cause lens actuator(s) 66 to actuate one or more lenses 13. At time T5, sensor(s) 12 may capture Frame N+5.

In such examples, camera processor(s) 14 may combine Frame N and Frame N+2 to generate a first composite frame, similar to the description of FIG. 23. Similarly, camera processor(s) 14 may combine Frame N+3 and Frame N+5 to generate a second composite frame. In some examples, camera processor(s) 14 or encoder/decoder 17 may combine the first composite frame and the second composite frame to form video data.

In some examples, camera processor(s) 14 may combine Frame N and Frame N+3 to generate a first composite frame. In another example, camera processor(s) 14 may combine Frame N+2 and Frame N+5 to generate a second composite frame. In some examples, camera processor(s) 14 may combine Frame N and Frame N+5 to generate a composite frame. In any case, camera processor(s) 14 may combine composite frames to form video data.

Figure 25:
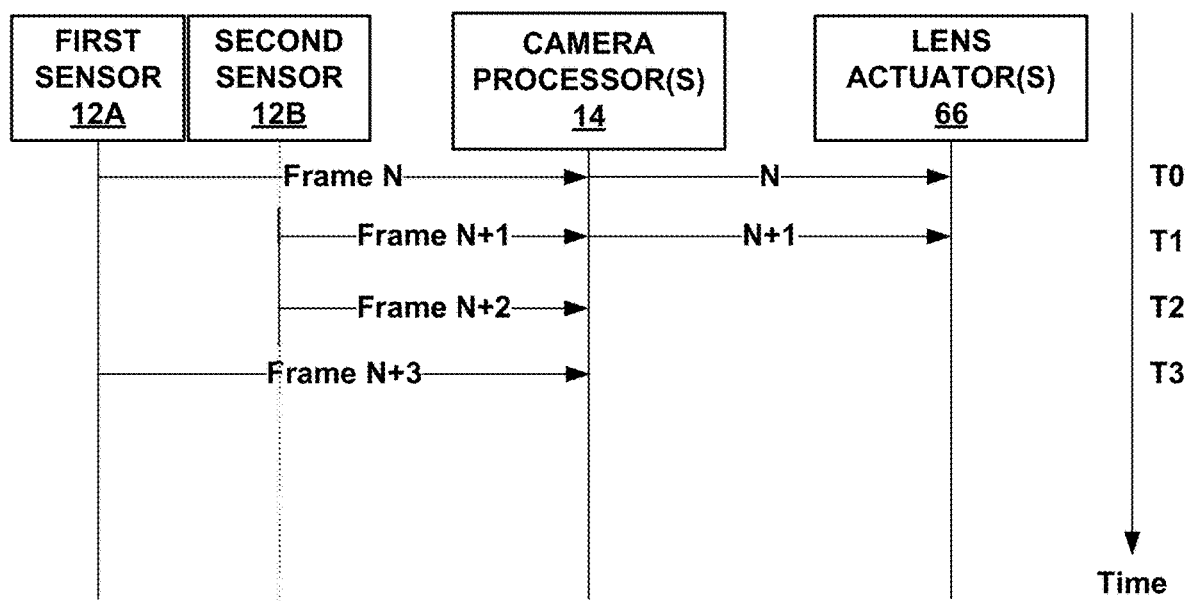
FIG. 25 is a timing diagram that illustrates various frame capture techniques in accordance with various aspects of the techniques described in this disclosure.

FIG. 25 is a timing diagram that illustrates various frame capture techniques in accordance with various aspects of the techniques described in this disclosure. At time T0, a first image sensor 12A may capture, via a first lens 13A, Frame N and transfer Frame N to camera processor(s) 14. At time T0, camera processor(s) 14 may cause lens actuator(s) 66 to actuate a second lens 13B. For example, camera processor(s) 14 may cause lens actuator(s) 66 to actuate a second lens 13B to a position that is predicted to result in particular areas of a frame being in-focus or particular areas of a frame being out-of-focus. As such, at time T1, second image sensor 12B may capture Frame N+1 via second lens 13B and transfer Frame N+1 to camera processor(s) 14. Camera processor(s) 14 may combine Frame N and Frame N+1 to generate a composite frame.

In some examples, camera processor(s) 14 may, at time T0, transmit a command to a moving prism or other light diversion mechanism that causes light incident on first lens 13A to be diverted to second sensor 12B. That is, camera processor(s) may, instead of or in addition to actuating a lens, may transmit a command that causes other adjustments, such as the activation of a moving prism. In such examples, at time T1, second image sensor 12B may capture Frame N+1 via first lens 13A and transfer Frame N+1 to camera processor(s) 14. Camera processor(s) 14 may combine Frame N and Frame N+1 to generate a composite frame.

At time T2, second sensor 12B may capture Frame N+2 and transfer Frames N+2 to camera processor(s) 14. At time T3, first sensor 12A may capture Frame N+3. In such examples, Frame N+2 may include a frame having a first region in focus (e.g., a center region) and a second region out-of-focus (e.g., outer region). In addition, Frame N+3 may include a frame having a first region out-of-focus (e.g., center region) and a second region in-focus (e.g., peripheral region). As such, camera processor(s) 14 may combine Frame N+2 and Frame N+3 to generate a composite frame. That is, camera processor(s) 14 may combine frames without a lens actuation between the capture of the to-be-combined frames. In such examples, camera processor(s) 14 may combine a plurality of frames to generate a composite frame, where the composite frame has a higher overall focus level relative to a focus level of each constituent frames of the plurality of frames.

Figure 26:
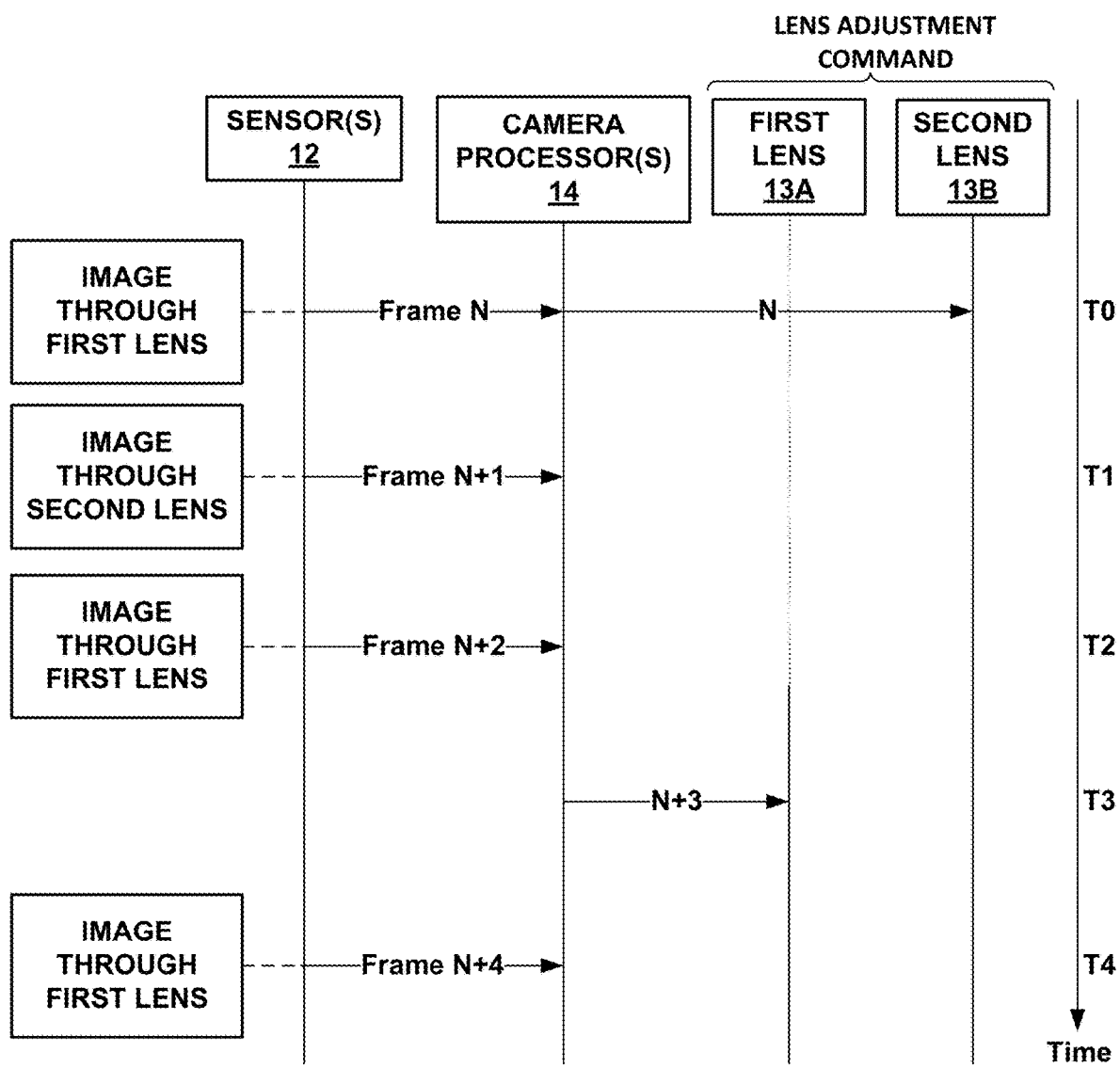
FIG. 26 is a timing diagram that illustrates various frame capture techniques in accordance with various aspects of the techniques described in this disclosure.

FIG. 26 is a timing diagram that illustrates various frame capture techniques in accordance with various aspects of the techniques described in this disclosure. At time T0, one of sensor(s) 12 may capture Frame N through a first lens 13A and transfer Frame N to camera processor(s) 14. Camera processor(s) 14 may transmit a lens adjustment command that causes an adjustment to second lens 13B. At time T1, one of sensor(s) 12 may capture Frame N+1 through second lens 13B. In some instances, a frame of image data may be captured through multiple lenses, such as a combination of first lens 13A and second lens 13B. As such, a lens 13 as described herein may include a lens subsystem that includes multiple actuatable and/or fixed lenses 13.

In such examples, one of sensor(s) 12 may capture Frame N+2 through first lens 13A. At time T3, camera processor(s) 14 may transmit a lens adjustment command that causes an adjustment to first lens 13A. As such, one of sensor(s) 12 may capture Frame N+4 through first lens 13A. Accordingly, camera processor(s) 14 may combine Frame N and Frame N+1 to generate a first composite frame. In some examples, camera processor(s) 14 may combine Frame N+1 and Frame N+2 to generate another composite frame. Camera processor(s) 14 may also combine Frame N, Frame N+1, or Frame N+2 with Frame N+4 to generate another composite frame. For example, sensor(s) 12 may capture Frame N, Frame N+1, or Frame N+2 having a first region in-focus (e.g., inner region), whereas Frame N+4 may have a counterpart region that is in-focus (e.g., outer region), such that the composite frame may have both the first region and the counterpart region of the frame in-focus as a result of the composite frame generation.

In the examples described with reference to FIG. 26, sensor(s) 12 may represent a single image sensor 12 shared between across multiple lenses 13 or may represent multiple image sensors 12. It will be understood that the real time between time intervals discussed with reference to FIGS. 23-26 may be on the order of microseconds, milliseconds, etc. depending on the frame rate, and the time between time intervals may be uniformly spaced therebetween. It will be further understood that the amount of time between a first Frame N and a next Frame N+1 may be such that a number of additional frames could be captured therebetween even though those frames may not be shown or described. For example, a first incoming Frame N at time T0 and a second incoming frame at time T1 (e.g., frame N+1) may be separated by no other frames, whereas in other instances, may be separated by another frame (e.g., Frame N+X, Frame N+0.5) although that other frame may not be shown and/or referenced.

Illustrative examples of the disclosure include:

Example 1: An apparatus configured for camera processing, the apparatus comprising: a memory configured to store image data; and one or more processors in communication with the memory, the one or more processors configured to: receive a first frame of the image data captured at a first focal length, wherein a first region of the first frame is in focus; receive a second frame of the image data captured at a second focal length, wherein a second region of the second frame is in focus; and combine the first frame with the second frame to generate a composite frame.

Example 2: An apparatus according to Example 1, wherein the one or more processors are configured to: prior to receiving the second frame of the image data captured at the second focal length, determine an image depth metric based at least in part on the image data corresponding to the first frame of the image data; compare the depth metric to a threshold; and when the depth metric is less than or equal to the threshold, cause a lens to automatically adjust to the second focal length to subsequently capture the second frame at the second focal length.

Example 3: An apparatus according to any of Examples 1 or 2, wherein the one or more processors are further configured to: cause an image sensor to capture the first frame at the first focal length; and cause the image sensor to capture the second frame at the second focal length.

Example 4: An apparatus according to Example 3, wherein to cause the image sensor to capture the second frame at the second focal length, the one or more processors are configured to: cause a lens adjustment in order to achieve the second focal length where the second region of the second frame is in focus.

Example 5: An apparatus according to any of Examples 1 through 3, wherein the one or more processors are further configured to: perform an autofocus process, wherein to perform the autofocus process, the one or more processors are configured to: cause a lens adjustment to achieve the first focal length so as to capture the first frame having the first region in focus; or cause the lens adjustment so as to capture the second frame having the second region in focus.

Example 6: An apparatus according to any of Examples 1 through 5, wherein a first region of the composite frame is in focus and a second region of the composite frame is in focus.

Example 7: An apparatus according to any of Examples 4 through 6, wherein the lens or image sensor comprises a characteristic that results in the capture of a single frame of the image data to have some regions of the single frame in focus and other regions of the single frame not in focus.

Example 8: An apparatus according to any of Examples 4 through 7, wherein a dimension of the lens is such that a mismatch in ground truth position at various points of the lens occurs.

Example 9: An apparatus according to any of Examples 1 through 8, wherein to combine the first frame with the second frame to generate the composite frame, the one or more processors are configured to: combine the first region of the first frame with the second region of the second frame, and perform a blending process wherein the first region of the first frame blends with the second region of the second frame.

Example 10: An apparatus according to any of Examples 1 through 9, wherein to combine the first frame with the second frame to generate the composite frame, the one or more processors are configured to: determine values of a pixel weighting table that indicates an extent to which pixels corresponding to the first frame are to contribute to the composite frame relative to an extent to which pixels corresponding to the second frame are to contribute to the composite frame; and blend the first region of the first frame and the second region of the second frame based at least in part on the values of the pixel weighting table.

Example 11: An apparatus according to Example 10, wherein to determine values of the pixel weighting table, the one or more processors are configured to: determine a transition area corresponding to an outer boundary of the first region of the first frame and an inner boundary of the second region of the second frame; apply, to each of the first and second frames, a high pass filter to a plurality of pixel values corresponding to the transition area; and determine, at the transition area, values of the pixel weighting table based at least in part on application of the high pass filter.

Example 12: An apparatus according to any of Examples 10 or 11, wherein the pixel weighting table comprises a detail weighting table, a distance weighting table, or a combination of both the detail weighting table and the distance weighting table.

Example 13: An apparatus according to any of Examples 10 through 12, wherein the pixel weighting table is based at least in part on one or more characteristics of one or more lenses.

Example 14: An apparatus according to any of Examples 10 through 13, wherein the pixel weighting table is based at least in part on one or more measurements performed during a calibration process, wherein the one or more processors are configured to cause the one or more measurements to be performed with respect to different object distances.

Example 15: An apparatus according to any of Examples 12 through 14, wherein to combine the first frame with the second frame to generate the composite frame, the one or more processors are configured to: determine, for the first frame, a first intermediate region of the first frame between the first region of the first frame and a second region of the first frame; apply a high pass filter to the first intermediate region to obtain a first detail map; determine, for the second frame, a second intermediate region of the second frame between a first region of the second frame and the second region of the second frame; apply the high pass filter to the second intermediate region to obtain a second detail map; determine values of the detail weighting table based at least in part on the first detail map and the second detail map; and utilize the detail weighting table when blending the first region of the first frame and the second region of the second frame.

Example 16: An apparatus according to Example 15, wherein to determine values of the detail weighting table, the one or more processors are configured to: compare filtered pixel values from the first detail map to filtered pixel values from the second detail map, wherein the comparison of filtered pixel values is performed for each filtered pixel value from each detail map according to corresponding pixel locations between the first frame and the second frame; and determine the values of the detail weighting table based at least in part on the comparison.

Example 17: An apparatus according to any of Examples 12 through 16, wherein to combine the first frame with the second frame to generate the composite frame, the one or more processors are configured to: determine values of the distance weighting table, wherein to determine the values of the distance weighting table, the one or more processors are configured to: determine, for each pixel of the transition area, a pixel distance value from a center of the composite frame to a location of a respective pixel location; determine a diagonal length of the composite frame; and determine the values of the distance weighting table based at least in part on the diagonal length and the pixel distance values.

Example 18: An apparatus according to any of Examples 12 through 17, wherein to combine the first frame with the second frame to generate the composite frame, the one or more processors are configured to: combine the distance weighting table and the detail weighting table to determine values of the pixel weighting table; and blend the first region of the first frame and the second region of the second frame based at least in part on the values of the pixel weighting table.

Example 19: An apparatus according to Example 18, wherein to combine the distance weighting table and the detail weighting table, the one or more processors are configured to: scale the values of the distance weighting table using a first scaling factor; scale the values of the detail weighting table using a second scaling factor; and combine the scaled values of the distance weighting table and the scaled values of the detail weighting table to determine values of the pixel weighting table.

Example 20: An apparatus according to Example 19, wherein the first scaling value is based at least in part on one or more characteristics of one or more lenses.

Example 21: An apparatus according to any of Examples 19 or 20, wherein the first scaling value is based at least in part on one or more calibration measurements.

Example 22: An apparatus according to any of Examples 10 through 21, wherein to blend the first region of the first frame and the second region of the second frame, the one or more processors are configured to: apply the pixel weighting table to the first frame to scale a contribution of pixel values corresponding to the first frame; and apply the pixel weighting table to the second frame to scale a contribution of pixel values corresponding to the second frame.

Example 23: An apparatus according to any of Examples 1 through 22, wherein the one or more processors are further configured to: receive a third frame of the image data at the second focal length; receive a fourth frame of the image data at a third focal length; and combine the second frame or the third frame with the fourth frame to generate a second composite frame.

Example 24: An apparatus according to Example 23, wherein a second region of the third frame is in focus at the second focal length, and wherein a first region of the fourth frame is in focus at the third focal length.

Example 25: An apparatus according to any of Examples 23 or 24, wherein the first focal length and the third focal length comprise a same focal length.

Example 26: An apparatus according to any of Examples 23 through 25, wherein the one or more processors are further configured to: output the second composite frame to a video encoder.

Example 27: An apparatus according to any of Examples 1 through 26, wherein the one or more processors are configured to: prior to receiving at least the second frame of the image data captured at the second focal length, determine, based at least in part on one or more characteristics of one or more lenses used to capture the image data, frame region information comprising first region boundary information for the first frame and second region boundary information for the second frame; determine first focus values for the image data corresponding to the first region boundary information; and determine first focus values for the image data corresponding to the second region boundary information.

Example 28: A method of camera processing, the method comprising: receiving a first frame of the image data captured at a first focal length, wherein a first region of the first frame is in focus; receiving a second frame of the image data captured at a second focal length, wherein a second region of the second frame is in focus; and combining the first frame with the second frame to generate a composite frame.

Example 29: A method according to Example 28, wherein the method further comprises: prior to receiving the second frame of the image data captured at the second focal length, determining an image depth metric based at least in part on the image data corresponding to the first frame of the image data; comparing the depth metric to a threshold; and when the depth metric is less than or equal to the threshold, receiving the second frame at the second focal length.

Example 30: A method according to any of Examples 28 or 29, wherein the method further comprises: causing an image sensor to capture the first frame at the first focal length; and causing the image sensor to capture the second frame at the second focal length.

Example 31: A method according to Example 30, wherein causing the image sensor to capture the second frame at the second focal length comprises: causing a lens adjustment in order to achieve the second focal length where the second region of the second frame is in focus.

Example 32: A method according to any of Examples 28 through 30, wherein the method further comprises: performing an autofocus process, wherein performing the autofocus process comprises: causing a lens to move to achieve the first focal length so as to capture the first frame having the first region in focus; or causing the lens to move so as to capture the second frame having the second region in focus.

Example 33: A method according to any of Examples 28 through 32, wherein a first region of the composite frame is in focus and a second region of the composite frame is in focus.

Example 34: A method according to any of Examples 31 through 33, wherein the lens or image sensor comprises a characteristic that results in the capture of a single frame of the image data to have some regions of the single frame in focus and other regions of the single frame not in focus.

Example 35: A method according to any of Examples 31 through 34, wherein a dimension of the lens is such that a mismatch in ground truth position at various points of the lens occurs.

Example 36: A method according to any of Examples 28 through 35, wherein combining the first frame with the second frame to generate the composite frame comprises: combining the first region of the first frame with the second region of the second frame, and performing a blending process wherein the first region of the first frame blends with the second region of the second frame.

Example 37: A method according to any of Examples 28 through 36, wherein combining the first frame with the second frame to generate the composite frame comprises: determining values of a pixel weighting table that indicates an extent to which pixels corresponding to the first frame are to contribute to the composite frame relative to an extent to which pixels corresponding to the second frame are to contribute to the composite frame; and blending the first region of the first frame and the second region of the second frame based at least in part on the values of the pixel weighting table.

Example 38: A method according to Example 37, wherein determining values of the pixel weighting table comprises: determining a transition area corresponding to an outer boundary of the first region of the first frame and an inner boundary of the second region of the second frame; applying, to each of the first and second frames, a high pass filter to a plurality of pixel values corresponding to the transition area; and determining, at the transition area, values of the pixel weighting table based at least in part on application of the high pass filter.

Example 39: A method according to any of Examples 37 or 38, wherein the pixel weighting table comprises a detail weighting table, a distance weighting table, or a combination of both the detail weighting table and the distance weighting table.

Example 40: A method according to any of Examples 37 through 39, wherein the pixel weighting table is based at least in part on one or more characteristics of one or more lenses.

Example 41: A method according to any of Examples 37 through 40, wherein the pixel weighting table is based at least in part on one or more measurements performed during a calibration process, wherein the one or more processors are configured to cause the one or more measurements to be performed with respect to different object distances.

Example 42: A method according to any of Examples 39 through 41, wherein combining the first frame with the second frame to generate the composite frame comprises: determining, for the first frame, a first intermediate region of the first frame between the first region of the first frame and a second region of the first frame; applying a high pass filter to the first intermediate region to obtain a first detail map; determining, for the second frame, a second intermediate region of the second frame between a first region of the second frame and the second region of the second frame; applying the high pass filter to the second intermediate region to obtain a second detail map; determining values of the detail weighting table based at least in part on the first detail map and the second detail map; and utilizing the detail weighting table when blending the first region of the first frame and the second region of the second frame.

Example 43: A method according to Example 42, wherein determining values of the detail weighting table further comprises: comparing filtered pixel values from the first detail map to filtered pixel values from the second detail map, wherein the comparison of filtered pixel values is performed for each filtered pixel value from each detail map according to corresponding pixel locations between the first frame and the second frame; and determining the values of the detail weighting table based at least in part on the comparison.

Example 44: A method according to any of Examples 39 through 43, wherein combining the first frame with the second frame to generate the composite frame comprises: determining values of the distance weighting table, wherein determining the values of the distance weighting table comprises: determining, for each pixel of the transition area, a pixel distance value from a center of the composite frame to a location of a respective pixel location; determining a diagonal length of the composite frame; and determining the values of the distance weighting table based at least in part on the diagonal length and the pixel distance values.

Example 45: A method according to any of Examples 39 through 44, wherein combining the first frame with the second frame to generate the composite frame comprises: combining the distance weighting table and the detail weighting table to determine values of the pixel weighting table; and blending the first region of the first frame and the second region of the second frame based at least in part on the values of the pixel weighting table.

Example 46: A method according to Example 45, wherein combining the distance weighting table and the detail weighting table comprises: scaling the values of the distance weighting table using a first scaling factor; scaling the values of the detail weighting table using a second scaling factor; and combining the scaled values of the distance weighting table and the scaled values of the detail weighting table to determine values of the pixel weighting table.

Example 47: A method according to Example 46, wherein the first scaling value is based at least in part on one or more characteristics of one or more lenses.

Example 48: A method according to any of Examples 46 or 47, wherein the first scaling value is based at least in part on one or more calibration measurements.

Example 49: A method according to any of Examples 37 through 48, wherein blending the first region of the first frame and the second region of the second frame comprises: applying the pixel weighting table to the first frame to scale a contribution of pixel values corresponding to the first frame; and applying the pixel weighting table to the second frame to scale a contribution of pixel values corresponding to the second frame.

Example 50: A method according to any of Examples 28 through 49, wherein the method further comprises: receiving a third frame of the image data at the second focal length; receiving a fourth frame of the image data at a third focal length; and combining the second frame or the third frame with the fourth frame to generate a second composite frame.

Example 51: A method according to Example 50, wherein a second region of the third frame is in focus at the second focal length, and wherein a first region of the fourth frame is in focus at the third focal length.

Example 52: A method according to any of Examples 50 or 51, wherein the first focal length and the third focal length comprise a same focal length.

Example 53: A method according to any of Examples 50 through 52, wherein the method further comprises: outputting the second composite frame to a video encoder.

Example 54: A method according to any of Examples 28 through 53, wherein, prior to receiving at least the second frame of the image data captured at the second focal length, the method further comprises: determining, based at least in part on one or more characteristics of one or more lenses used to capture the image data, frame region information comprising first region boundary information for the first frame and second region boundary information for the second frame; determining first focus values for the image data corresponding to the first region boundary information; and determining first focus values for the image data corresponding to the second region boundary information.

In some implementations, the above-described examples can be implemented using an apparatus comprising means for performing some or all of the various operations. As an Example 55, an apparatus configured for camera processing is disclosed, the apparatus comprising: means for receiving a first frame of the image data captured at a first focal length, wherein a first region of the first frame is in focus; means for receiving a second frame of the image data captured at a second focal length, wherein a second region of the second frame is in focus; and means for combining the first frame with the second frame to generate a composite frame.

Example 56: An apparatus according to Example 55, wherein the apparatus further comprises: means for determining an image depth metric based at least in part on the image data corresponding to the first frame of the image data; means for comparing the depth metric to a threshold; and when the depth metric is less than or equal to the threshold, means for causing a lens to automatically adjust to the second focal length to subsequently capture the second frame at the second focal length.

Example 57: An apparatus according to any of Examples 55 or 56, wherein the apparatus further comprises: means for causing an image sensor to capture the first frame at the first focal length; and means for causing the image sensor to capture the second frame at the second focal length.

Example 58: An apparatus according to Examples 57, wherein the apparatus further comprises: means for causing a lens adjustment in order to achieve the second focal length where the second region of the second frame is in focus.

Example 59: An apparatus according to any of Examples 55 through 57, wherein the apparatus further comprises: means for performing an autofocus process, comprising: means for causing a lens to move to achieve the first focal length so as to capture the first frame having the first region in focus; or means for causing the lens to move so as to capture the second frame having the second region in focus.

Example 60: An apparatus according to any of Examples 55 through 59, wherein a first region of the composite frame is in focus and a first region of the composite frame is in focus.

Example 61: An apparatus according to any of Examples 55 through 60, wherein the lens or image sensor comprises a characteristic that results in the capture of a single frame of the image data to have some regions of the single frame in focus and other regions of the single frame not in focus.

Example 62: An apparatus according to any of Examples 58 through 61, wherein a dimension of the lens is such that a mismatch in ground truth position at various points of the lens occurs.

Example 63: An apparatus according to any of Examples 55 through 62, wherein the means for combining the first frame with the second frame to generate the composite frame comprise: means for combining the first region of the first frame with the second region of the second frame, and means for performing a blending process wherein the first region of the first frame blends with the second region of the second frame.

Example 64: An apparatus according to any of Examples 55 through 63, wherein the means for combining the first frame with the second frame to generate the composite frame comprise: means for determining values of a pixel weighting table that indicates an extent to which pixels corresponding to the first frame are to contribute to the composite frame relative to an extent to which pixels corresponding to the second frame are to contribute to the composite frame; and means for blending the first region of the first frame and the second region of the second frame based at least in part on the values of the pixel weighting table.

Example 65: An apparatus according to Example 64, wherein the means for determining values of the pixel weighting table comprises: means for determining a transition area corresponding to an outer boundary of the first region of the first frame and an inner boundary of the second region of the second frame; means for applying, to each of the first and second frames, a high pass filter to a plurality of pixel values corresponding to the transition area; and means for determining, at the transition area, values of the pixel weighting table based at least in part on application of the high pass filter.

Example 66: An apparatus according to any of Examples 64 or 65, wherein the pixel weighting table comprises a detail weighting table, a distance weighting table, or a combination of both the detail weighting table and the distance weighting table.

Example 67: An apparatus according to any of Examples 64 through 66, wherein the pixel weighting table is based at least in part on one or more characteristics of one or more lenses.

Example 68: An apparatus according to any of Examples 64 through 67, wherein the pixel weighting table is based at least in part on one or more measurements performed during a calibration process, wherein the one or more processors are configured to cause the one or more measurements to be performed with respect to different object distances.

Example 69: An apparatus according to any of Examples 66 through 68, wherein the means for combining the first frame with the second frame to generate the composite frame comprise: means for determining, for the first frame, a first intermediate region of the first frame between the first region of the first frame and a second region of the first frame; means for applying a high pass filter to the first intermediate region to obtain a first detail map; means for determining, for the second frame, a second intermediate region of the second frame between a first region of the second frame and the second region of the second frame; means for applying the high pass filter to the second intermediate region to obtain a second detail map; means for determining values of the detail weighting table based at least in part on the first detail map and the second detail map; and means for utilizing the detail weighting table when blending the first region of the first frame and the second region of the second frame.

Example 70: An apparatus according to Example 69, wherein the means for determining values of the detail weighting table comprise: means for comparing filtered pixel values from the first detail map to filtered pixel values from the second detail map, wherein the comparison of filtered pixel values is performed for each filtered pixel value from each detail map according to corresponding pixel locations between the first frame and the second frame; and means for determining the values of the detail weighting table based at least in part on the comparison.

Example 71: An apparatus according to any of Examples 66 through 70, wherein the means for combining the first frame with the second frame to generate the composite frame comprise: means for determining values of the distance weighting table, wherein the means for determining the values of the distance weighting table comprise: means for determining, for each pixel of the transition area, a pixel distance value from a center of the composite frame to a location of a respective pixel location; means for determining a diagonal length of the composite frame; and means for determining the values of the distance weighting table based at least in part on the diagonal length and the pixel distance values.

Example 72: An apparatus according to any of Examples 66 through 71, wherein the means for combining the first frame with the second frame to generate the composite frame comprises: means for combining the distance weighting table and the detail weighting table to determine values of the pixel weighting table; and means for blending the first region of the first frame and the second region of the second frame based at least in part on the values of the pixel weighting table.

Example 73: An apparatus according to Example 72, wherein the means for combining the distance weighting table and the detail weighting table comprises: means for scaling the values of the distance weighting table using a first scaling factor; means for scaling the values of the detail weighting table using a second scaling factor; and means for combining the scaled values of the distance weighting table and the scaled values of the detail weighting table to determine values of the pixel weighting table.

Example 74: An apparatus according to Example 73, wherein the first scaling value is based at least in part on one or more characteristics of one or more lenses.

Example 75: An apparatus according to any of Examples 73 or 74, wherein the first scaling value is based at least in part on one or more calibration measurements.

Example 76: An apparatus according to any of Examples 64 through 75, wherein the means for blending the first region of the first frame and the second region of the second frame comprises: means for applying the pixel weighting table to the first frame to scale a contribution of pixel values corresponding to the first frame; and means for applying the pixel weighting table to the second frame to scale a contribution of pixel values corresponding to the second frame.

Example 77: An apparatus according to any of Examples 55 through 76, further comprising: means for receiving a third frame of the image data at the second focal length; means for receiving a fourth frame of the image data at a third focal length; and means for combining the second frame or the third frame with the fourth frame to generate a second composite frame.

Example 78: An apparatus according to Example 77, wherein a second region of the third frame is in focus at the second focal length, and wherein a first region of the fourth frame is in focus at the third focal length.

Example 79: An apparatus according to any of Examples 77 or 78, wherein the first focal length and the third focal length comprise a same focal length.

Example 80: An apparatus according to any of Examples 77 through 79, further comprising: means for outputting the second composite frame to a video encoder.

Example 81: An apparatus according to any of Examples 55 through 80, further comprising: means for determining, based at least in part on one or more characteristics of one or more lenses used to capture the image data, frame region information comprising first region boundary information for the first frame and second region boundary information for the second frame; means for determining first focus values for the image data corresponding to the first region boundary information; and means for determining first focus values for the image data corresponding to the second region boundary information.

In some implementations, the above-described examples can be implemented using a computer-readable storage medium storing instructions that when executed cause one or more processors of a device to perform some or all of the various operations. As an Example 82, a non-transitory computer-readable storage medium is disclosed that has stored thereon instructions that, when executed, cause one or more processors to: receive a first frame of the image data captured at a first focal length, wherein a first region of the first frame is in focus; receive a second frame of the image data captured at a second focal length, wherein a second region of the second frame is in focus; and combine the first frame with the second frame to generate a composite frame.

Example 83: A non-transitory computer-readable storage medium according to Example 82, wherein the one or more processors are further caused to: determine an image depth metric based at least in part on the image data corresponding to the first frame of the image data; compare the depth metric to a threshold; and when the depth metric is less than or equal to the threshold, cause a lens to automatically adjust to the second focal length to subsequently capture the second frame at the second focal length.

Example 84: A non-transitory computer-readable storage medium according to any of Examples 82 or 83, wherein the one or more processors are further caused to: cause an image sensor to capture the first frame at the first focal length; and cause the image sensor to capture the second frame at the second focal length.

Example 85: A non-transitory computer-readable storage medium according to Example 84, wherein to cause the image sensor to capture the second frame at the second focal length, the one or more processors are caused to: cause a lens adjustment in order to achieve the second focal length where the second region of the second frame is in focus.

Example 86: A non-transitory computer-readable storage medium according to any of Examples 82 through 84, wherein the one or more processors are further caused to: perform an autofocus process, wherein to perform the autofocus process, the one or more processors are caused to: cause a lens to move to achieve the first focal length so as to capture the first frame having the first region in focus; or cause the lens to move so as to capture the second frame having the second region in focus.

Example 87: A non-transitory computer-readable storage medium according to any of Examples 82 through 86, wherein a second region of the composite frame is in focus and a first region of the composite frame is in focus.

Example 88: A non-transitory computer-readable storage medium according to any of Examples 85 through 87, wherein the lens or image sensor comprises a characteristic that results in the capture of a single frame of the image data to have some regions of the single frame in focus and other regions of the single frame not in focus.

Example 89: A non-transitory computer-readable storage medium according to any of Examples 85 through 88, wherein a dimension of the lens is such that a mismatch in ground truth position at various points of the lens occurs.

Example 90: A non-transitory computer-readable storage medium according to any of Examples 82 through 89, wherein to combine the first frame with the second frame to generate the composite frame, the one or more processors are caused to: combine the first region of the first frame with the second region of the second frame, and perform a blending process wherein the first region of the first frame blends with the second region of the second frame.

Example 91: A non-transitory computer-readable storage medium according to any of Examples 82 through 90, wherein to combine the first frame with the second frame to generate the composite frame, the one or more processors are caused to: determine values of a pixel weighting table that indicates an extent to which pixels corresponding to the first frame are to contribute to the composite frame relative to an extent to which pixels corresponding to the second frame are to contribute to the composite frame; and blend the first region of the first frame and the second region of the second frame based at least in part on the values of the pixel weighting table.

Example 92: A non-transitory computer-readable storage medium according to Example 91, wherein to determine values of the pixel weighting table, the one or more processors are caused to: determine a transition area corresponding to an outer boundary of the first region of the first frame and an inner boundary of the second region of the second frame; apply, to each of the first and second frames, a high pass filter to a plurality of pixel values corresponding to the transition area; and determine, at the transition area, values of the pixel weighting table based at least in part on application of the high pass filter.

Example 93: A non-transitory computer-readable storage medium according to any of Examples 91 or 92, wherein the pixel weighting table comprises a detail weighting table, a distance weighting table, or a combination of both the detail weighting table and the distance weighting table.

Example 94: A non-transitory computer-readable storage medium according to any of Examples 91 through 93, wherein the pixel weighting table is based at least in part on one or more characteristics of one or more lenses.

Example 95: A non-transitory computer-readable storage medium according to any of Examples 91 through 94, wherein the pixel weighting table is based at least in part on one or more measurements performed during a calibration process, wherein the one or more processors are configured to cause the one or more measurements to be performed with respect to different object distances.

Example 96: A non-transitory computer-readable storage medium according to any of Examples 93 through 95, wherein to combine the first frame with the second frame to generate the composite frame, the one or more processors are caused to: determine, for the first frame, a first intermediate region of the first frame between the first region of the first frame and a second region of the first frame; apply a high pass filter to the first intermediate region to obtain a first detail map; determine, for the second frame, a second intermediate region of the second frame between a first region of the second frame and the second region of the second frame; apply the high pass filter to the second intermediate region to obtain a second detail map; determine values of the detail weighting table based at least in part on the first detail map and the second detail map; and utilize the detail weighting table when blending the first region of the first frame and the second region of the second frame.

Example 97: A non-transitory computer-readable storage medium according to Example 96, wherein to determine values of the detail weighting table, the one or more processors are caused to: compare filtered pixel values from the first detail map to filtered pixel values from the second detail map, wherein the comparison of filtered pixel values is performed for each filtered pixel value from each detail map according to corresponding pixel locations between the first frame and the second frame; and determine the values of the detail weighting table based at least in part on the comparison.

Example 98: A non-transitory computer-readable storage medium according to any of Examples 93 through 97, wherein to combine the first frame with the second frame to generate the composite frame, the one or more processors are caused to: determine values of the distance weighting table, wherein to determine the values of the distance weighting table, the one or more processors are caused to: determine, for each pixel of the transition area, a pixel distance value from a center of the composite frame to a location of a respective pixel location; determine a diagonal length of the composite frame; and determine the values of the distance weighting table based at least in part on the diagonal length and the pixel distance values.

Example 99: A non-transitory computer-readable storage medium according to any of Examples 93 through 98, wherein to combine the first frame with the second frame to generate the composite frame, the one or more processors are caused to: combine the distance weighting table and the detail weighting table to determine values of the pixel weighting table; and blend the first region of the first frame and the second region of the second frame based at least in part on the values of the pixel weighting table.

Example 100: A non-transitory computer-readable storage medium according to Example 99, wherein to combine the distance weighting table and the detail weighting table, the one or more processors are caused to: scale the values of the distance weighting table using a first scaling factor; scale the values of the detail weighting table using a second scaling factor; and combine the scaled values of the distance weighting table and the scaled values of the detail weighting table to determine values of the pixel weighting table.

Example 101: A non-transitory computer-readable storage medium according to Example 100, wherein the first scaling value is based at least in part on one or more characteristics of one or more lenses.

Example 102: A non-transitory computer-readable storage medium according to any of Examples 100 or 101, wherein the first scaling value is based at least in part on one or more calibration measurements.

Example 103: A non-transitory computer-readable storage medium according to any of Examples 91 through 102, wherein to blend the first region of the first frame and the second region of the second frame, the one or more processors are caused to: apply the pixel weighting table to the first frame to scale a contribution of pixel values corresponding to the first frame; and apply the pixel weighting table to the second frame to scale a contribution of pixel values corresponding to the second frame.

Example 104: A non-transitory computer-readable storage medium according to any of Examples 82 through 103, wherein the one or more processors are further caused to: receive a third frame of the image data at the second focal length; receive a fourth frame of the image data at a third focal length; and combine the second frame or the third frame with the fourth frame to generate a second composite frame.

Example 105: A non-transitory computer-readable storage medium according to Example 104, wherein a second region of the third frame is in focus at the second focal length, and wherein a first region of the fourth frame is in focus at the third focal length.

Example 106: A non-transitory computer-readable storage medium according to any of Examples 104 or 105, wherein the first focal length and the third focal length comprise a same focal length.

Example 107: A non-transitory computer-readable storage medium according to any of Examples 104 through 106, wherein the one or more processors are further caused to: output the second composite frame to a video encoder.

Example 108: A non-transitory computer-readable storage medium according to any of Examples 82 through 107, wherein the one or more processors are further caused to: determine, based at least in part on one or more characteristics of one or more lenses used to capture the image data, frame region information comprising first region boundary information for the first frame and second region boundary information for the second frame; determine first focus values for the image data corresponding to the first region boundary information; and determine first focus values for the image data corresponding to the second region boundary information.

Example 109: An apparatus configured for camera processing, the apparatus comprising: a memory configured to store a plurality of frames of image data, wherein each frame includes a first region that comprises a first set of pixels, and a second region that is outside the first region and comprises a second set of pixels; and one or more processors in communication with the memory, the one or more processors configured to: receive a first frame of the image data captured at a first focal length, wherein the first frame is captured via a lens, wherein, due to a characteristic of the lens, the first frame is captured to include a first focus level corresponding to the first region of the first frame, and a second focus level corresponding to the second region of the first frame, wherein the first focus level differs from the second focus level; receive a second frame of the image data captured at a second focal length, wherein the second frame is captured via the lens, wherein, due to the characteristic of the lens, the second frame is captured to include a third focus level corresponding to the first region of the second frame, and a fourth focus level corresponding to the second region of the second frame, wherein the third focus level differs from the fourth focus level and the first focus level; and combine the first frame with the second frame to generate a composite frame, the composite frame comprising a transition area corresponding to an outer boundary of the first region of the first frame and an inner boundary of the second region of the second frame, wherein the transition area represents pixels from the first set of pixels of the first frame, pixels from the second set of pixels of the second frame, or pixels from both the first set of pixels of the first frame and pixels from the second set of pixels of the second frame.

Example 110: An apparatus according to Example 109, wherein, prior to receiving the second frame of the image data captured at the second focal length, the one or more processors are configured to: determine an image depth metric based at least in part on the first frame of the image data; compare the depth metric to a threshold; and when the depth metric is less than or equal to the threshold, cause the lens to automatically adjust to the second focal length to subsequently capture the second frame at the second focal length.

Example 111: An apparatus according to any of Examples 109 or 110, wherein the one or more processors are further configured to: perform an autofocus process, wherein to perform the autofocus process, the one or more processors are configured to: cause the lens to move to achieve the first focal length so as to capture the first frame having the first region in focus; or cause the lens to move so as to capture the second frame having the second region in focus.

Example 112: An apparatus according to any of Examples 109 through 111, wherein the characteristic of the lens results in the capture of a single frame of the image data to have some regions of the single frame in focus and other regions of the single frame not in focus.

Example 113: An apparatus according to any of Examples 109 through 112, wherein to combine the first frame with the second frame to generate the composite frame, the one or more processors are configured to: combine the first region of the first frame with the second region of the second frame, and perform a blending process wherein the first region of the first frame blends with the second region of the second frame.

Example 114: An apparatus according to any of Examples 109 through 113, wherein to combine the first frame with the second frame to generate the composite frame, the one or more processors are configured to: determine values of a pixel weighting table that indicates an extent to which pixels corresponding to the first frame are to contribute to the composite frame relative to an extent to which pixels corresponding to the second frame are to contribute to the composite frame; and blend the first region of the first frame and the second region of the second frame based at least in part on the values of the pixel weighting table.

Example 115: An apparatus according to Example 114, wherein to determine values of the pixel weighting table, the one or more processors are configured to: determine the transition area corresponding to the outer boundary of the first region of the first frame and the inner boundary of the second region of the second frame; apply, to each of the first and second frames, a high pass filter to a plurality of pixel values corresponding to the transition area; and determine, at the transition area, values of the pixel weighting table based at least in part on application of the high pass filter.

Example 116: An apparatus according to any of Examples 114 or 115, wherein to combine the first frame with the second frame to generate the composite frame, the one or more processors are configured to: combine a distance weighting table and a detail weighting table to determine values of the pixel weighting table; and blend the first region of the first frame and the second region of the second frame based at least in part on the values of the pixel weighting table.

Example 117: An apparatus of Example 116, wherein the one or more processors are further configured to: compare filtered pixel values from a first detail map to filtered pixel values from a second detail map, wherein the comparison of filtered pixel values is performed for each filtered pixel value from each detail map according to corresponding pixel locations between the first frame and the second frame; and determine the values of the detail weighting table based at least in part on the comparison.

Example 118: A method of camera processing, the method comprising: receiving a first frame of the image data captured at a first focal length, wherein the first frame is captured via a lens, wherein, due to a characteristic of the lens, the first frame is captured to include a first focus level corresponding to a first region of the first frame that comprises a first set of pixels, and a second focus level corresponding to a second region of the first frame that is outside the first region and comprises a second set of pixels, wherein the first focus level differs from the second focus level; receiving a second frame of the image data captured at a second focal length, wherein the second frame is captured via the lens, wherein, due to the characteristic of the lens, the second frame is captured to include a third focus level corresponding to a third region of the second frame that comprises a third set of pixels, and a fourth focus level corresponding to a fourth region of the second frame that is outside the third region and comprises a third set of pixels, wherein the third focus level differs from the fourth focus level and the first focus level; and combining the first frame with the second frame to generate a composite frame, the composite frame comprising a transition area corresponding to an outer boundary of the first region of the first frame and an inner boundary of the fourth region of the second frame, wherein the transition area represents pixels from the first frame, pixels from the second frame, or pixels from both the first frame and the second frame.

Example 119: A method according to Example 118, wherein, prior to receiving the second frame of the image data captured at the second focal length, the method further comprises: determining an image depth metric based at least in part on the first frame of the image data; comparing the depth metric to a threshold; and when the depth metric is less than or equal to the threshold, causing the lens to automatically adjust to the second focal length to subsequently capture the second frame at the second focal length.

Example 120: A method according to any of Examples 118 or 119, wherein the method further comprises: performing an autofocus process, wherein performing the autofocus process comprises: causing the lens to move to achieve the first focal length so as to capture the first frame having the first region in focus; or causing the lens to move so as to capture the second frame having the fourth region in focus.

Example 121: A method according to any of Examples 118 through 120, wherein the characteristic of the lens results in the capture of a single frame of the image data to have some regions of the single frame in focus and other regions of the single frame not in focus.

Example 122: A method according to any of Examples 118 through 121, wherein combining the first frame with the second frame to generate the composite frame comprises: combining the first region of the first frame with the fourth region of the second frame, and performing a blending process wherein the first region of the first frame blends with the fourth region of the second frame.

Example 123: A method according to any of Examples 118 through 122, wherein combining the first frame with the second frame to generate the composite frame comprises: determining values of a pixel weighting table that indicates an extent to which pixels corresponding to the first frame are to contribute to the composite frame relative to an extent to which pixels corresponding to the second frame are to contribute to the composite frame; and blending the first region of the first frame and the fourth region of the second frame based at least in part on the values of the pixel weighting table.

Example 124: A method according to Example 123, wherein the pixel weighting table comprises a detail weighting table, a distance weighting table, or a combination of both the detail weighting table and the distance weighting table.

Example 125: A method according to Example 124, wherein combining the first frame with the second frame to generate the composite frame comprises: combining the distance weighting table and the detail weighting table to determine values of the pixel weighting table; and blending the first region of the first frame and the fourth region of the second frame based at least in part on the values of the pixel weighting table.

Example 126: A method according to any of Examples 123 through 125, wherein blending the first region of the first frame and the fourth region of the second frame comprises: applying the pixel weighting table to the first frame to scale a contribution of pixel values corresponding to the first frame; and applying the pixel weighting table to the second frame to scale a contribution of pixel values corresponding to the second frame.

In some implementations, the above-described examples 1-27, 28-54, 109-117, or 118-126 can be implemented using an apparatus comprising means for performing some or all of the various operations. As an Example 127, an apparatus configured for camera processing is disclosed, the apparatus comprising: means for receiving a first frame of image data captured at a first focal length, wherein the first frame is captured via a lens, wherein, due to a characteristic of the lens, the first frame is captured to include a first focus level corresponding to a first region of the first frame comprising a central region of the first frame, and a second focus level corresponding to a second region of the first frame comprising an outer region of the first frame that is outside the first region relative to one or more sides of the first frame and the center of the first frame, wherein the first focus level differs from the second focus level; means for receiving a second frame of image data captured at a second focal length, wherein the second frame is captured via the lens, wherein, due to the characteristic of the lens, the second frame is captured to include a third focus level corresponding to a third region of the second frame comprising a central region of the second frame, and a fourth focus level corresponding to a fourth region of the second frame, wherein the third region comprises an inner region of the second frame that is inside the fourth region relative to one or more sides of the second frame and the center of the second frame, wherein the third focus level differs from the fourth focus level and the first focus level; and means for combining the first frame with the second frame to generate a composite frame, the composite frame comprising a transition area corresponding to an outer boundary of the first region of the first frame and an inner boundary of the fourth region of the second frame.

Example 128: An apparatus according to Example 127, wherein the apparatus further comprises: means for causing an image sensor to capture the first frame at the first focal length; and means for causing the image sensor to capture the second frame at the second focal length.

Example 129: An apparatus according to any of Examples 127 or 128, wherein the apparatus further comprises: means for performing an autofocus process, wherein the means for performing the autofocus process comprise: means for causing a lens to move to achieve the first focal length so as to capture the first frame having the first region in focus; or means for causing the lens to move so as to capture the second frame having the second region in focus.

Example 130: An apparatus according to any of Examples 127 through 129, wherein the means for combining the first frame with the second frame to generate the composite frame comprise: means for combining the first region of the first frame with the fourth region of the second frame, and means for performing a blending process wherein the first region of the first frame blends with the fourth region of the second frame.

In some implementations, the above-described examples 1-27, 28-54, 109-117, 118-126, or 127-130 can be implemented using a computer-readable storage medium storing instructions that when executed cause one or more processors of a device to perform some or all of the various operations. As an Example 131, a non-transitory computer-readable storage medium is disclosed that has stored thereon instructions that, when executed, cause one or more processors to: receive a first frame of image data captured at a first focal length, wherein the first frame includes a first region comprising a center of the first frame, and a second region comprising an outer region of the first frame relative to the center of the first frame and the first region of the second frame, wherein the first frame is captured via a lens, that, due to a characteristic of the lens, results in a capture of the first region and the second region to include different focus levels; receive a second frame of image data captured at a second focal length, wherein the second frame includes a third region comprising a center of the second frame, and a fourth region comprising an outer region of the second frame relative to the center of the second frame and the third region of the second frame, wherein the second frame is captured via the lens, wherein, due to the characteristic of the lens, the second frame is captured to include different focus levels relative to the third region and the fourth region of the second frame; and combine the first frame with the second frame to generate a composite frame, the composite frame comprising a transition area corresponding to an outer boundary of the first region of the first frame and an inner boundary of the fourth region of the second frame.

Example 132: A non-transitory computer-readable storage medium according to Example 131, wherein the one or more processors are further caused to: determine an image depth metric based at least in part on the first frame of the image data; compare the depth metric to a threshold; and when the depth metric is less than or equal to the threshold, cause the lens to automatically adjust to the second focal length to subsequently capture the second frame at the second focal length.

Example 133: A non-transitory computer-readable storage medium according to any of Examples 131 or 132, wherein the one or more processors are further caused to: cause an image sensor to capture the first frame at the first focal length; and cause the image sensor to capture the second frame at the second focal length.

Example 134: A non-transitory computer-readable storage medium according to any of Examples 131 through 133, wherein to combine the first frame with the second frame to generate the composite frame, the one or more processors are caused to: determine values of a pixel weighting table that indicates an extent to which pixels corresponding to the first frame are to contribute to the composite frame relative to an extent to which pixels corresponding to the second frame are to contribute to the composite frame; and blend the first region of the first frame and the fourth region of the second frame based at least in part on the values of the pixel weighting table.

Example 135: A non-transitory computer-readable storage medium according to Example 134, wherein to determine values of the pixel weighting table, the one or more processors are caused to: determine the transition area corresponding to the outer boundary of the first region of the first frame and the inner boundary of the fourth region of the second frame; apply, to each of the first and second frames, a high pass filter to a plurality of pixel values corresponding to the transition area; and determine, at the transition area, values of the pixel weighting table based at least in part on application of the high pass filter.

Example 136: A non-transitory computer-readable storage medium according to any of Examples 134 or 135, wherein to blend the first region of the first frame and the fourth region of the second frame, the one or more processors are caused to: apply the pixel weighting table to the first frame to scale a contribution of pixel values corresponding to the first frame; and apply the pixel weighting table to the second frame to scale a contribution of pixel values corresponding to the second frame.

Example 137: A non-transitory computer-readable storage medium according to any of Examples 131 through 136, wherein to combine the first frame with the second frame to generate the composite frame, the one or more processors are caused to: determine values of a distance weighting table, wherein to determine the values of the distance weighting table, the one or more processors are caused to: determine the transition area corresponding to the outer boundary of the first region of the first frame and the inner boundary of the fourth region of the second frame; determine, for each pixel of the transition area, a pixel distance value from a location of a respective pixel location to a reference center location of the composite frame being generated, the first frame, or the second frame; determine a diagonal frame length of the composite frame being generated, the first frame, or the second frame; and determine the values of the distance weighting table based at least in part on the diagonal length and the pixel distance values.

Example 138: A non-transitory computer-readable storage medium according to any of Examples 131 through 133, wherein to combine the first frame with the second frame to generate the composite frame, the one or more processors are caused to: combine a distance weighting table and a detail weighting table to determine values of a pixel weighting table; and blend the first region of the first frame and the fourth region of the second frame based at least in part on the values of the pixel weighting table.

Example 139: A non-transitory computer-readable storage medium according to any of Examples 131 through 138, wherein the one or more processors are further caused to: receive a third frame of the image data at the second focal length; receive a fourth frame of the image data at a third focal length; combine the third frame or the second frame with the fourth frame to generate a second composite frame; and output the second composite frame to a video encoder.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where discs usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Various examples have been described. These and other examples are within the scope of the following claims.

What is claimed is:

1. An apparatus configured for camera processing, the apparatus comprising:
   a memory configured to store a plurality of frames of image data, wherein each frame includes a first region that comprises a first set of pixels, and a second region that is outside the first region and comprises a second set of pixels; and
   one or more processors in communication with the memory, the one or more processors configured to:
      receive a first frame of image data captured at a first focal length, wherein the first frame is captured via a lens, wherein, due to a characteristic of the lens, the first frame is captured to include a first focus level corresponding to the first region of the first frame, and a second focus level corresponding to the second region of the first frame, wherein the first focus level differs from the second focus level;
      receive a second frame of image data captured at a second focal length, wherein the second frame is captured via the lens, wherein, due to the characteristic of the lens, the second frame is captured to include a third focus level corresponding to the first region of the second frame, and a fourth focus level corresponding to the second region of the second frame, wherein the third focus level differs from the fourth focus level and the first focus level; and
      combine the first frame with the second frame to generate a composite frame, wherein to generate the composite frame the one or more processors are configured to determine a transition area corresponding to an outer boundary of the first region of the first frame and an inner boundary of the second region of the second frame, wherein the transition area of the composite frame comprises a two-dimensional area of pixels defining a two-dimensional space between the outer boundary of the first region of the first frame the inner boundary of the second region of the second frame, and wherein to generate the composite frame the one or more processors are configured to generate the transition area based on pixel values of the first frame and the second frame.

2. The apparatus of claim 1, wherein, prior to receiving the second frame of the image data captured at the second focal length, the one or more processors are configured to:
   determine an image depth metric based at least in part on the first frame of the image data;
   compare the depth metric to a threshold; and
   when the depth metric is less than or equal to the threshold, cause the lens to automatically adjust to the second focal length to subsequently capture the second frame at the second focal length.

3. The apparatus of claim 1, wherein the one or more processors are further configured to:
   perform an autofocus process, wherein to perform the autofocus process, the one or more processors are configured to:
      cause the lens to move to achieve the first focal length so as to capture the first frame having the first region in focus; or
      cause the lens to move so as to capture the second frame having the second region in focus.

4. The apparatus of claim 1, wherein the characteristic of the lens results in the capture of a single frame of the image data to have some regions of the single frame in focus and other regions of the single frame not in focus.

5. The apparatus of claim 1, wherein to combine the first frame with the second frame to generate the composite frame, the one or more processors are configured to:
combine the first region of the first frame with the second region of the second frame in the transition area, and
perform a blending process wherein the first region of the first frame blends with the second region of the second frame in the transition area.

6. The apparatus of claim 1, wherein to combine the first frame with the second frame to generate the composite frame, the one or more processors are configured to:
determine values of a pixel weighting table that indicates an extent to which pixels corresponding to the first frame are to contribute to the composite frame relative to an extent to which pixels corresponding to the second frame are to contribute to the composite frame; and
blend the first region of the first frame and the second region of the second frame based at least in part on the values of the pixel weighting table.

7. The apparatus of claim 6, wherein to determine values of the pixel weighting table, the one or more processors are configured to:
determine the transition area corresponding to the outer boundary of the first region of the first frame and the inner boundary of the second region of the second frame;
apply, to each of the first and second frames, a high pass filter to a plurality of pixel values corresponding to the transition area; and
determine, at the transition area, values of the pixel weighting table based at least in part on application of the high pass filter.

8. The apparatus of claim 6, wherein to combine the first frame with the second frame to generate the composite frame, the one or more processors are configured to:
combine a distance weighting table and a detail weighting table to determine values of the pixel weighting table; and
blend the first region of the first frame and the second region of the second frame based at least in part on the values of the pixel weighting table.

9. The apparatus of claim 8, wherein the one or more processors are further configured to:
compare filtered pixel values from a first detail map to filtered pixel values from a second detail map, wherein the comparison of filtered pixel values is performed for each filtered pixel value from each detail map according to corresponding pixel locations between the first frame and the second frame; and
determine the values of the detail weighting table based at least in part on the comparison.

10. The apparatus of claim 1, wherein the transition area represents pixels from both the first set of pixels of the first frame and pixels from the second set of pixels of the second frame.

11. A method of camera processing, the method comprising:
receiving a first frame of image data captured at a first focal length, wherein the first frame is captured via a lens, wherein, due to a characteristic of the lens, the first frame is captured to include a first focus level corresponding to a first region of the first frame that comprises a first set of pixels, and a second focus level corresponding to a second region of the first frame that is outside the first region and comprises a second set of pixels, wherein the first focus level differs from the second focus level;
receiving a second frame of image data captured at a second focal length, wherein the second frame is captured via the lens, wherein, due to the characteristic of the lens, the second frame is captured to include a third focus level corresponding to a third region of the second frame that comprises a third set of pixels, and a fourth focus level corresponding to a fourth region of the second frame that is outside the third region and comprises a third set of pixels, wherein the third focus level differs from the fourth focus level and the first focus level; and
combining the first frame with the second frame to generate a composite frame, wherein generating the composite frame comprises determining a transition area corresponding to an outer boundary of the first region of the first frame and an inner boundary of the fourth region of the second frame, wherein the transition area of the composite frame comprises a two-dimensional area of pixels defining a two-dimensional space between the outer boundary of the first region of the first frame the inner boundary of the second region of the second frame, and wherein to generate the composite frame the one or more processors are configured to generate the transition area based on pixel values of the first frame and the second frame.

12. The method of claim 11, wherein, prior to receiving the second frame of the image data captured at the second focal length, the method further comprises:
determining an image depth metric based at least in part on the first frame of the image data;
comparing the depth metric to a threshold; and
when the depth metric is less than or equal to the threshold, causing the lens to automatically adjust to the second focal length to subsequently capture the second frame at the second focal length.

13. The method of claim 11, wherein the method further comprises:
performing an autofocus process, wherein performing the autofocus process comprises:
causing the lens to move to achieve the first focal length so as to capture the first frame having the first region in focus; or
causing the lens to move so as to capture the second frame having the fourth region in focus.

14. The method of claim 11, wherein the characteristic of the lens results in the capture of a single frame of the image data to have some regions of the single frame in focus and other regions of the single frame not in focus.

15. The method of claim 11, wherein combining the first frame with the second frame to generate the composite frame comprises:
combining the first region of the first frame with the fourth region of the second frame in the transition area, and
performing a blending process wherein the first region of the first frame blends with the fourth region of the second frame in the transition area.

16. The method of claim 11, wherein combining the first frame with the second frame to generate the composite frame comprises:
determining values of a pixel weighting table that indicates an extent to which pixels corresponding to the first frame are to contribute to the composite frame relative to an extent to which pixels corresponding to the second frame are to contribute to the composite frame; and blending the first region of the first frame and the fourth region of the second frame based at least in part on the values of the pixel weighting table.

17. The method of claim 16, wherein the pixel weighting table comprises a detail weighting table, a distance weighting table, or a combination of both the detail weighting table and the distance weighting table.

18. The method of claim 17, wherein combining the first frame with the second frame to generate the composite frame comprises:

combining the distance weighting table and the detail weighting table to determine values of the pixel weighting table; and blending the first region of the first frame and the fourth region of the second frame based at least in part on the values of the pixel weighting table.

19. The method of claim 16, wherein blending the first region of the first frame and the fourth region of the second frame comprises:

applying the pixel weighting table to the first frame to scale a contribution of pixel values corresponding to the first frame; and applying the pixel weighting table to the second frame to scale a contribution of pixel values corresponding to the second frame.

20. An apparatus configured for camera processing, the apparatus comprising:

means for receiving a first frame of image data captured at a first focal length, wherein the first frame is captured via a lens, wherein, due to a characteristic of the lens, the first frame is captured to include a first focus level corresponding to a first region of the first frame comprising a central region of the first frame, and a second focus level corresponding to a second region of the first frame comprising an outer region of the first frame that is outside the first region relative to one or more sides of the first frame and the center of the first frame, wherein the first focus level differs from the second focus level;

means for receiving a second frame of image data captured at a second focal length, wherein the second frame is captured via the lens, wherein, due to the characteristic of the lens, the second frame is captured to include a third focus level corresponding to a third region of the second frame comprising a central region of the second frame, and a fourth focus level corresponding to a fourth region of the second frame, wherein the third region comprises an inner region of the second frame that is inside the fourth region relative to one or more sides of the second frame and the center of the second frame, wherein the third focus level differs from the fourth focus level and the first focus level; and means for combining the first frame with the second frame to generate a composite frame, wherein to generate the composite frame the means for combining determines a transition area corresponding to an outer boundary of the first region of the first frame and an inner boundary of the fourth region of the second frame, wherein the transition area of the composite frame comprises a two-dimensional area of pixels defining a two-dimensional space between the outer boundary of the first region of the first frame the inner boundary of the second region of the second frame and wherein to generate the composite frame, the means for combining generates the transition area based on pixel values of the first frame and the second frame.

21. The apparatus of claim 20, wherein the apparatus further comprises:

means for causing an image sensor to capture the first frame at the first focal length; and means for causing the image sensor to capture the second frame at the second focal length.

22. The apparatus of claim 20, wherein the means for combining the first frame with the second frame to generate the composite frame comprise:

means for combining the first region of the first frame with the fourth region of the second frame, and means for performing a blending process wherein the first region of the first frame blends with the fourth region of the second frame.

23. A non-transitory computer-readable storage medium having stored thereon instructions that, when executed, cause one or more processors to:

receive a first frame of image data captured at a first focal length, wherein the first frame includes a first region comprising a center of the first frame, and a second region comprising an outer region of the first frame relative to the center of the first frame and the first region of the second frame, wherein the first frame is captured via a lens, that, due to a characteristic of the lens, results in a capture of the first region and the second region to include different focus levels;

receive a second frame of image data captured at a second focal length, wherein the second frame includes a third region comprising a center of the second frame, and a fourth region comprising an outer region of the second frame relative to the center of the second frame and the third region of the second frame, wherein the second frame is captured via the lens, wherein, due to the characteristic of the lens, the second frame is captured to include different focus levels relative to the third region and the fourth region of the second frame; and combine the first frame with the second frame to generate a composite frame, wherein to generate the composite frame the instructions cause the one or more processors to determine a transition area corresponding to an outer boundary of the first region of the first frame and an inner boundary of the fourth region of the second frame, wherein the transition area of the composite frame comprises a two-dimensional area of pixels defining a two-dimensional space between the outer boundary of the first region of the first frame the inner boundary of the second region of the second frame, and wherein to generate the composite frame, the one or more processors generate the transition area based on pixel values of the first frame and the second frame.

24. The non-transitory computer-readable storage medium of claim 23, wherein the one or more processors are further caused to:

determine an image depth metric based at least in part on the first frame of the image data;

compare the depth metric to a threshold; and when the depth metric is less than or equal to the threshold, cause the lens to automatically adjust to the second focal length to subsequently capture the second frame at the second focal length.

25. The non-transitory computer-readable storage medium of claim 23, wherein the one or more processors are further caused to:
cause an image sensor to capture the first frame at the first focal length; and
cause the image sensor to capture the second frame at the second focal length.

26. The non-transitory computer-readable storage medium of claim 23, wherein to combine the first frame with the second frame to generate the composite frame, the one or more processors are caused to:
determine values of a pixel weighting table that indicates an extent to which pixels corresponding to the first frame are to contribute to the composite frame relative to an extent to which pixels corresponding to the second frame are to contribute to the composite frame; and
blend the first region of the first frame and the fourth region of the second frame based at least in part on the values of the pixel weighting table.

27. The non-transitory computer-readable storage medium of claim 26, wherein to determine values of the pixel weighting table, the one or more processors are caused to:
determine the transition area corresponding to the outer boundary of the first region of the first frame and the inner boundary of the fourth region of the second frame;
apply, to each of the first and second frames, a high pass filter to a plurality of pixel values corresponding to the transition area; and
determine, at the transition area, values of the pixel weighting table based at least in part on application of the high pass filter.

28. The non-transitory computer-readable storage medium of claim 26, wherein to blend the first region of the first frame and the fourth region of the second frame, the one or more processors are caused to:
apply the pixel weighting table to the first frame to scale a contribution of pixel values corresponding to the first frame; and
apply the pixel weighting table to the second frame to scale a contribution of pixel values corresponding to the second frame.

29. The non-transitory computer-readable storage medium of claim 23, wherein to combine the first frame with the second frame to generate the composite frame, the one or more processors are caused to:
determine values of a distance weighting table, wherein to determine the values of the distance weighting table, the one or more processors are caused to:
determine the transition area corresponding to the outer boundary of the first region of the first frame and the inner boundary of the fourth region of the second frame;
determine, for each pixel of the transition area, a pixel distance value from a location of a respective pixel location to a reference center location of the composite frame being generated, the first frame, or the second frame;
determine a diagonal frame length of the composite frame being generated, the first frame, or the second frame; and
determine the values of the distance weighting table based at least in part on the diagonal length and the pixel distance values.

30. The non-transitory computer-readable storage medium of claim 23, wherein to combine the first frame with the second frame to generate the composite frame, the one or more processors are caused to:
combine a distance weighting table and a detail weighting table to determine values of a pixel weighting table; and
blend the first region of the first frame and the fourth region of the second frame based at least in part on the values of the pixel weighting table.

31. The non-transitory computer-readable storage medium of claim 23, wherein the one or more processors are further caused to:
receive a third frame of the image data at the second focal length;
receive a fourth frame of the image data at a third focal length;
combine the third frame or the second frame with the fourth frame to generate a second composite frame; and
output the second composite frame to a video encoder.

* * * * *